(12) United States Patent
Ohwa

(10) Patent No.: US 7,191,220 B2
(45) Date of Patent: Mar. 13, 2007

(54) INFORMATION PROCESSING DEVICE AND METHOD, AND PROGRAM

(75) Inventor: Tsunayuki Ohwa, Tokyo (JP)

(73) Assignee: Sony Corporation, Tokyo (JP)

( * ) Notice: Subject to any disclaimer, the term of this patent is extended or adjusted under 35 U.S.C. 154(b) by 814 days.

(21) Appl. No.: 10/347,796

(22) Filed: Jan. 22, 2003

(65) Prior Publication Data

US 2003/0149731 A1 Aug. 7, 2003

(30) Foreign Application Priority Data

Jan. 23, 2002 (JP) ............................. 2002-013775

(51) Int. Cl.
*G06F 15/16* (2006.01)
*G06F 15/173* (2006.01)
(52) U.S. Cl. ........................ 709/206; 709/223; 709/238
(58) Field of Classification Search ........ 709/205–206, 709/231, 238, 217
See application file for complete search history.

(56) References Cited

U.S. PATENT DOCUMENTS

| | | | | |
|---|---|---|---|---|
| 6,014,688 | A * | 1/2000 | Venkatraman et al. ...... | 709/206 |
| 6,430,177 | B1 * | 8/2002 | Luzeski et al. ............. | 370/356 |
| 6,570,563 | B1 * | 5/2003 | Honda ........................ | 345/419 |
| 6,816,904 | B1 * | 11/2004 | Ludwig et al. ............. | 709/226 |
| 6,879,665 | B1 * | 4/2005 | Cook et al. ................. | 379/67.1 |
| 6,907,112 | B1 * | 6/2005 | Guedalia et al. .......... | 379/88.17 |
| 6,965,926 | B1 * | 11/2005 | Shapiro et al. ............. | 709/219 |
| 7,007,065 | B2 * | 2/2006 | Matsuda ...................... | 709/205 |

OTHER PUBLICATIONS

Patent Abstracts of Japan, JP 2001-357291, Dec. 26, 2001.
Patent Abstracts of Japan, JP 2001-285756, Oct. 12, 2001.
Patent Abstracts of Japan, JP 2002-007630, Jan. 11, 2002.
Patent Abstracts of Japan, JP 2001-309158, Nov. 2, 2001.
Patent Abstracts of Japan, JP 2001-351026, Dec. 21, 2001.

* cited by examiner

*Primary Examiner*—Ario Etienne
*Assistant Examiner*—Hussein El-chanti
(74) *Attorney, Agent, or Firm*—Oblon, Spivak, McClelland, Maier & Neustadt, P.C.

(57) ABSTRACT

A user operates a digital camera so as to attach a photographed image to an e-mail describing a user ID and space ID, and transmit the e-mail to a mail server. The mail server reads out the user ID, space ID, and attached image data from the received e-mail. After setting a frame ID for a frame to exhibit the image data in a shared virtual space, the mail server transmits the image data, space ID, and frame ID to an AO server. The AO server stores the received data and also transmits the data to a CP server. The CP server transmits the received data to multiple client computers. The client computers display the received image at a predetermined location in the shared virtual space, specified by the frame ID. This allows the user to easily upload information.

17 Claims, 39 Drawing Sheets

FIG. 14

| SERVER NO. | ROOM NO. | FRAME NO. | USER ID | SIZE | VALID PERIOD | URL | IMAGE TITLE | POSITION | SCALE | ROTATION | CREDIT CARD INFORMATION |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |

FIG. 15

| SIZE OF IMAGE | CHARGES |
|---|---|
| ~10 KB | 100 |
| 11 ~ 50 KB | 150 |
| 51 ~ 100 KB | 200 |

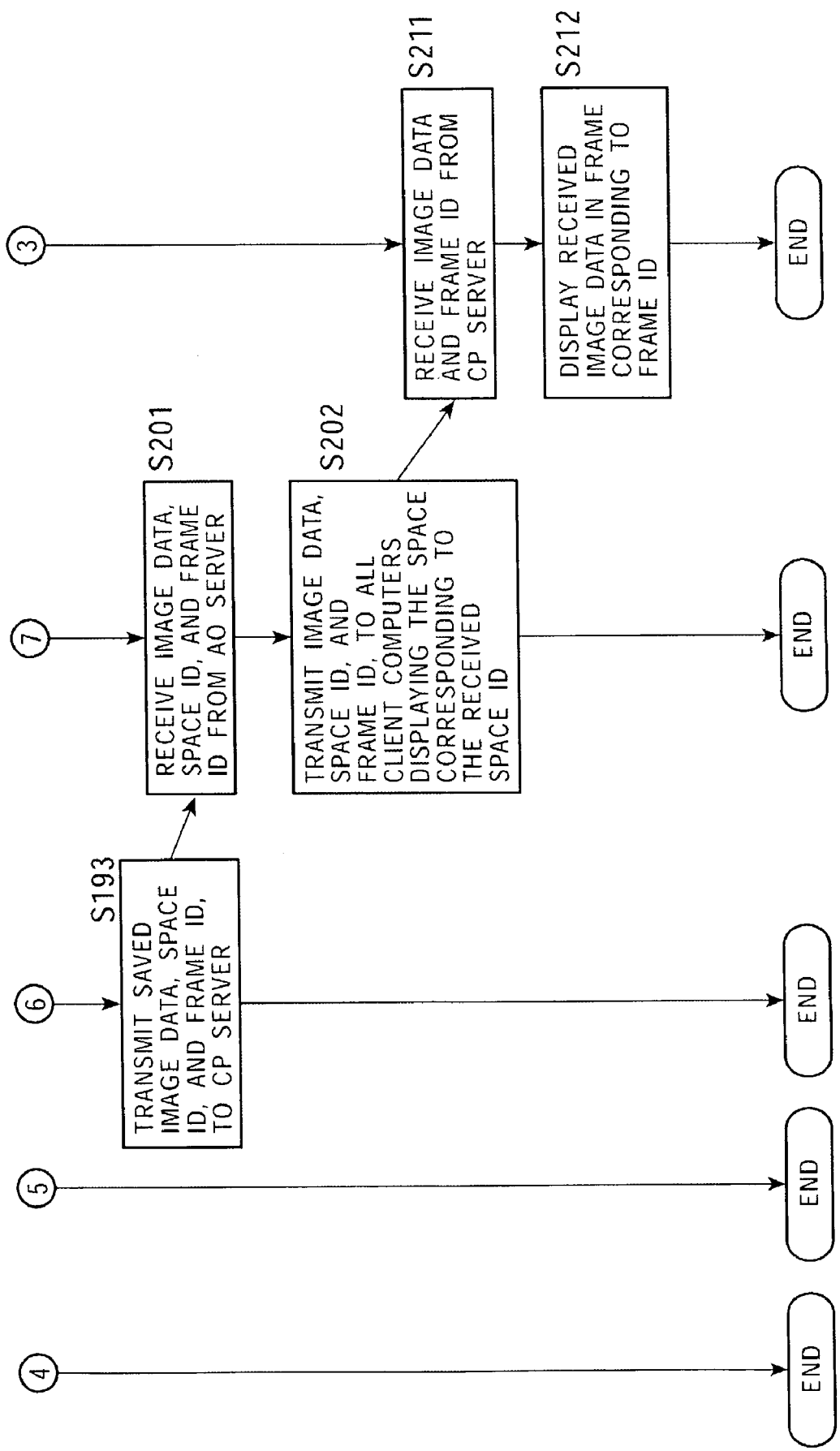

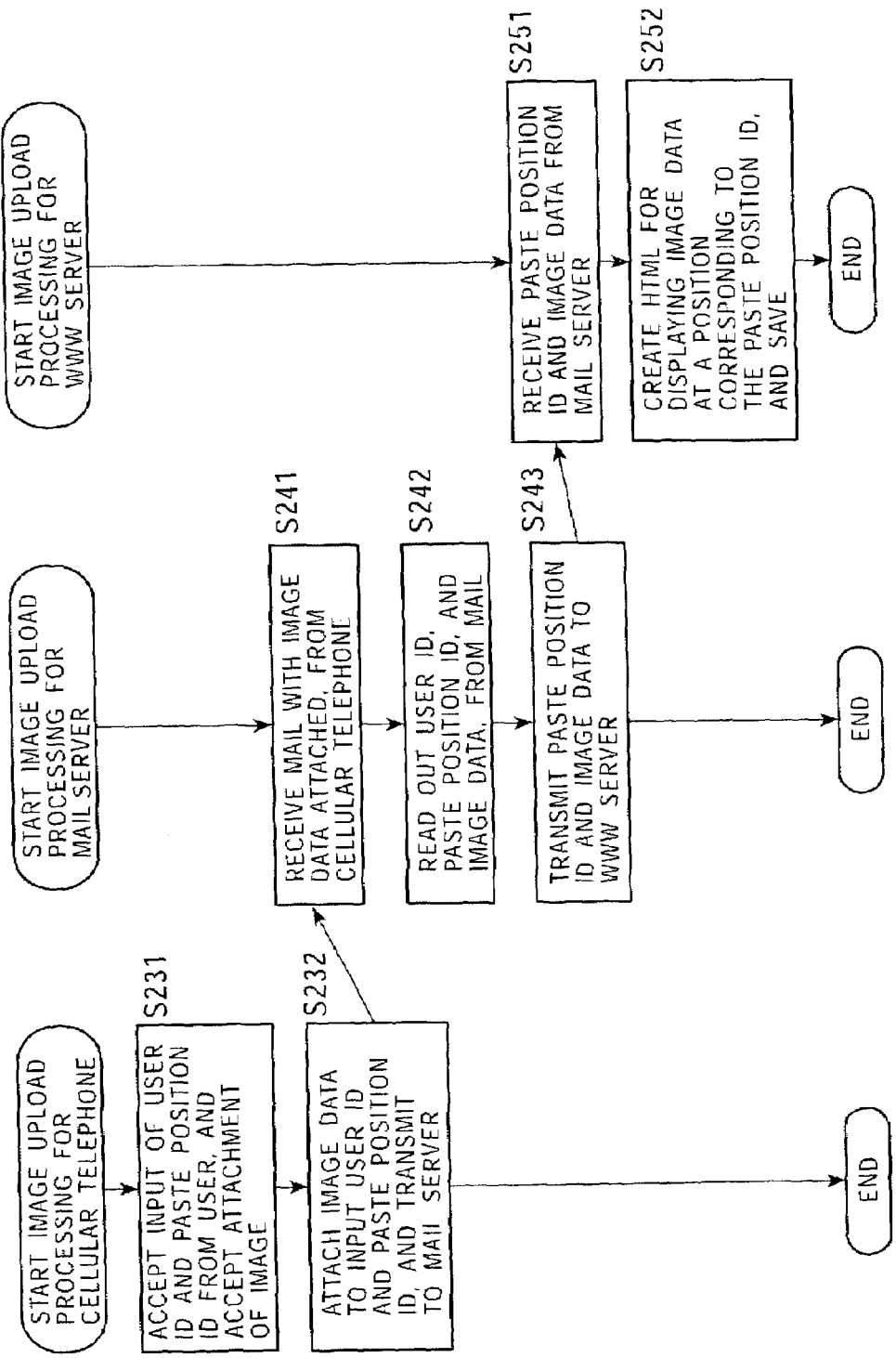

INFORMATION PROCESSING DEVICE AND METHOD, AND PROGRAM

BACKGROUND OF THE INVENTION

1. Field of the Invention

The present invention relates to an information processing device and method and a program, and particularly relates to an information processing device and method and a program wherein information can be uploaded to an information presenting region with little labor.

2. Description of the Related Art

Among businesses which provide services wherein multiple users can share the same shared virtual space, there conventionally have been businesses which provide services wherein users can display images which they desire in the shared virtual space so as to be viewable by other users.

In the event of exhibiting an image in a shared virtual space provided by such a business, a user logs into the shared virtual space, and then performs predetermined operations to exhibit the image in the shared virtual space.

However, in the event that a user desires to exhibit a photograph taken with a portable device such as a cellular telephone with digital camera functions for example, in the shared virtual space, the user needs to first save the taken image in a general-purpose personal computer or the like, and then login to the shared virtual space from the personal computer to exhibit the image, which has been a problem since the procedures are so troublesome.

SUMMARY OF THE INVENTION

The present invention has been made in the light of such problems with the conventional art, and accordingly, it is an object thereof to allow image data to be easily uploaded using portable devices.

According to a first aspect of the present invention, an information processing device which receives information provided from a portable terminal via electronic mail and presents the information to user terminal of a plurality of users which desire to view the information comprises: reception means for receiving the electronic mail with the information attached thereto from the portable terminal; first storage means for storing the information attached to the electronic mail received by the reception means; and presenting means for presenting the information stored in the first storage means on an information presenting region.

According to a second aspect of the present invention, an information processing method for an information processing device which receives information provided from a portable terminal via electronic mail and presents the information to user terminal of a plurality of users which desire to view the information comprises: a reception step for receiving the electronic mail with the information attached thereto from the portable terminal; a storage step for storing the information attached to the electronic mail received by the processing in the reception step; and a presenting step for presenting the information stored by the processing in the storage step on an information presenting region.

According to a third aspect of the present invention, a program causes a computer, which controls an information processing device which receives information provided from a portable terminal via electronic mail and presents the information to user terminal of a plurality of users which desire to view the information, to execute: a reception step for receiving the electronic mail with the information attached thereto from the portable terminal; a storage control step for controlling storing of the information attached to the electronic mail received by the processing in the reception step; and a presenting step for presenting the information of which storage is controlled by the processing in the storage step on an information presenting region.

According to another aspect of the present invention, an information processing device which receives information provided from a portable terminal via a predetermined Web page specified beforehand and presents the information to user terminal of a plurality of users which desire to view the information comprises: first storage means for storing an information transmission Web page used in the event of the portable terminal transmitting the information; transmission means for transmitting to the portable terminal the information transmission Web page stored in the first storage means following a request from the portable terminal; reception means for receiving the information supplied from the portable terminal via the information transmission Web page; second storage means for storing the information received by the reception means; and presenting means for presenting the information stored in the second storage means on an information presenting region for viewing the information.

According to another aspect of the present invention, an information processing method for an information processing device which receives information provided from a portable terminal via a predetermined Web page specified beforehand and presents the information to user terminal of a plurality of users which desire to view the information comprises: a first storage step for storing an information transmission Web page used in the event of the portable terminal transmitting the information; a transmission step for transmitting to the portable terminal the information transmission Web page stored by the processing in the first storage step following a request from the portable terminal; a reception step for receiving the information supplied from the portable terminal via the information transmission Web page; a second storage step for storing the information received by the processing in the reception step; and a presenting step for presenting the information stored by the processing in the second storage step on an information presenting region for viewing the information.

According to another aspect of the present invention, a program causes a computer, which controls an information processing device which receives information provided from a portable terminal via a predetermined Web page specified beforehand and presents the information to user terminal of a plurality of users which desire to view the information, to execute: a first storage control step for controlling storing of an information transmission Web page used in the event of the portable terminal transmitting the information; a transmission step for transmitting to the portable terminal the information transmission Web page of which storage is controlled by the processing in the first storage control step following a request from the portable terminal; a reception step for receiving the information supplied from the portable terminal via the information transmission Web page; a second storage control step for controlling storing of the information received by the processing in the reception step; and a presenting step for presenting the information of which storage is controlled by the processing in the second storage control step on an information presenting region for viewing the information.

According to yet another aspect of the present invention, an information processing device having a second server, which is different from a first server for providing information to a plurality of users of user terminals which desire to view the information, comprises: reception means for receiving presenting information from a terminal device operated by a user via the second server, to be provided to the user terminals via the first server; and transfer means for transferring the presenting information received by the reception means to a device having a storage device where information provided by the first server is stored, and registering the presenting information in the storage device.

BRIEF DESCRIPTION OF THE DRAWINGS

FIG. 14 is a diagram illustrating a configuration example of an image information table;

FIG. 15 is a diagram illustrating a configuration example of a billing information table;

FIG. 37 is a continuation from FIG. 36;

FIG. 39 is a flowchart describing the processing for uploading an image from a cellular telephone to a two-dimensional Web page via electronic mail.

DESCRIPTION OF THE PREFERRED EMBODIMENTS

Figure 1:
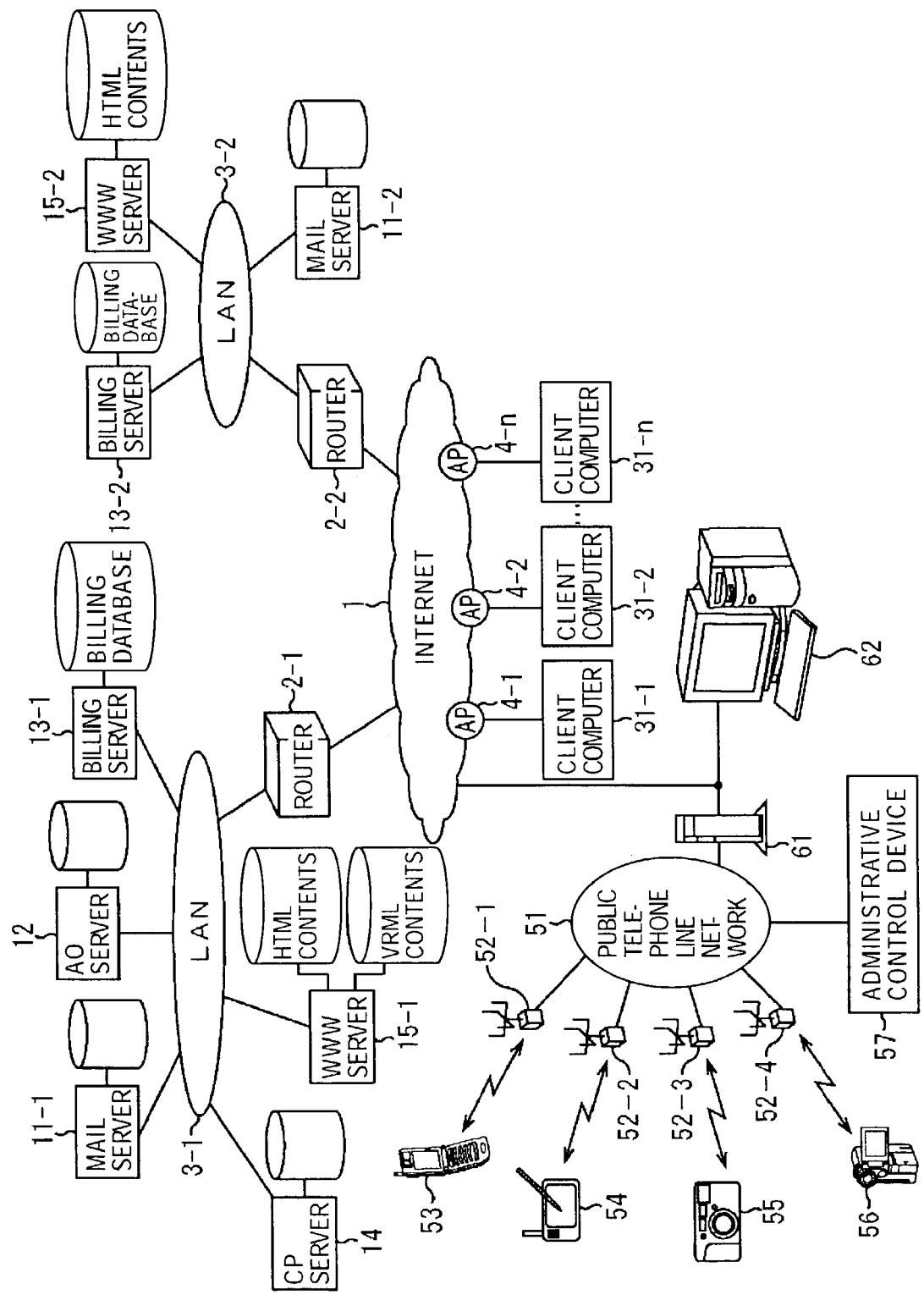
FIG. 1 is a diagram illustrating the configuration of a community system to which the present invention has been applied.

FIG. 1 schematically illustrates the configuration of a network computing system containing a community system capable of providing a shared virtual space (also known as a "community place") suited for realizing the present invention. The term "shared virtual space" as used here means a virtual space formed on network server devices, capable of simultaneous login by multiple users.

As shown in FIG. 1, the network computing system includes the Internet 1, LANs (Local Area Networks) 3-1 and 3-2, a public telephone line network 51, and so forth. Note that the LANs 3-1 and 3-2 may be a single network segment or may be of a configuration wherein multiple segments are connected by routers.

The Internet 1 and the LANs 3-1 and 3-2 are connected one to another by routers 2-1 and 2-2. Also, servers on the Internet 1 and the LANs 3-1 and 3-2 are capable of mutually accessing one another by a predetermined communication protocol, such as TCP/IP (Transmission Control Protocol/Internet Protocol), for example.

With the network computing system shown in FIG. 1, the Internet Service Provider (ISP) operating the LAN 3-1 provides the community system based on chat, according to the present embodiment. Now, a community system is a system providing services wherein communication can be carried out in real-time between users via the Internet 1. The community system according to the present embodiment is a system which provides an environment wherein multiple login users send in "avatars" ("avatar" is an Indian term meaning an "incarnation of God"), which are duplicated selves of the users, to a three-dimensional shared virtual space drawn using three-dimensional computer graphics, thereby carrying out real-time communication.

This three-dimensional shared virtual space is configured of multiple different three-dimensional spaces, including a shared space to which avatars of all users logged into the three-dimensional shared virtual space may enter, and private spaces which are equivalent to private rooms of the users.

Space IDs for identifying spaces are appropriated to each of the three-dimensional spaces in the three-dimensional space divided thus, so that specifying a space ID allows the corresponding three-dimensional space to be uniquely defined.

The community system has a mail server 11-1 for managing exhibiting of images in the shared virtual space by electronic mail (hereafter referred to as "e-mail"), a CP server 14 which manages the shared virtual space, an application object server 12 (hereafter referred to as an "AO server") for controlling the operations of shard applications, a WWW server 15-1 which provides HTTP (Hyper-Text Transfer Protocol) resource objects such as HTML (Hyper-Text Markup Language) contents, a billing server 13-1 for managing billing information in the community system, and client computers 31-1 through 31-n for logging into the three-dimensional shared virtual space and displaying the displaying the shared virtual space.

Note that while FIG. 1 shows one each of the mail server 11-1, AO server 12, billing server 13-1, CP server 14, and WWW server 15-1 being connected to the LAN 3-1, in practice, multiple units may be installed for any or all of the mail server 11-1, AO server 12, billing server 13-1, CP server 14, and WWW server 15-1.

The WWW server 15-1 provides VRML (Virtual Reality Modeling Language) contents describing the three-dimensional shared virtual space, besides HTML contents. Included in the VRML contents are descriptions of the shared virtual space, objects shared between the users logged into the shared virtual space, and descriptions of shared applications which express the actions of these objects.

The data contained in these VRML contents is image data, and also is "shared data" which is shared by each of the login users in the shared virtual space. The three-dimensional shared virtual space on the network can be described by VRML 97, for example. Further, the actions thereof can be described with Java (a registered trademark).

Further, the WWW server 15-1 stores the addresses for multiple CP servers 14, which are called URLs (Uniform Resource Locators).

The client computers 31-1 through 31-n each connect to the Internet 1 via access points 4-1 through 4-n, respectively. The client computers 31-1 through 31-n have both an HTML browser for browsing HTML contents which the WWW server 15-1 provides, and a VRML browser for handling VRML contents. The VRML browser used with the present embodiment in particular will hereafter referred to as a "CP browser", since it displays and navigates through the shared virtual space (i.e., the Community Place). Note that both the HTML browser and CP browser can operate on the same platform provided by the "Windows (a registered trademark) 95/98/NT/2000" operating system from Microsoft Corporation of the USA.

AOs (Application Objects) are stored in the AO server 12, for managing shared applications. Development environments for AOs primarily include Java (a registered trademark) language, C++ language, and so forth. AOs provide access to the CP server 14 and APIs (Application Programming Interfaces) for controlling shared objects (shared applications) which the AOs manage. Here, the term "shared object" means objects which appear on the CP browsers of the client computers 31-1 through 31-n (and accordingly are shared), specific examples including an avatar which is a duplicated self of the user, a virtual pet kept by the avatar, the room which the avatar owns, items and functions which the avatar obtains and keeps, and so forth.

Also, with the present embodiment, objects which move through the shared virtual space based on instructions from client computers 31 such as avatars, and objects which autonomously move through the shared virtual space such as virtual pets, will be referred to as "agents".

Further, the AO server 12 may be a stand-alone server device, or may be contained in the CP server 14.

In FIG. 1, the Internet Service Provider (ISP) which runs the LAN 3-2 connected to the Internet via the router 2-2 provides services for uploading image data received from the mail server 11-2 to the WWW server 15-2. The basic processing executed by the mail server 11-2, billing server 13-2, and WWW server 15-2 is the same as the processing executed by the mail server 11-1, billing server 13-1, and WWW server 15-1. However, unlike the WWW server 15-1, the WWW server 15-2 does not handle VRML contents.

At the left side of FIG. 1, base stations 52-1 through 52-4 which are each fixed wireless stations, are provided to the network system to which the cellular telephone 53, portable terminal 54, digital camera 55, and video camera 56 are connected, within a cell formed by dividing the area for providing communication services into desired sizes.

Connected to the base stations 52-1 through 52-4 are the cellular telephone 53, portable terminal 54, digital camera 55, and video camera 56, which are mobile wireless stations, this connection being made wireless by a code division multiple access method called W-CDMA (Wideband Code Division Multiple Access), for example, so that great amounts of data can be communicated at data transfer speeds as high as 2 Mbps using a 2 GHz band.

In this way, the cellular telephone 53, portable terminal 54, digital camera 55, and video camera 56, which are mobile wireless stations, are capable of communicating great amounts of data at high speeds by W-CDMA, and accordingly can execute various types of data communication in addition to simple audio communication, such as exchanging e-mail, viewing simple home pages, exchanging images, and much more.

Also, the base stations 52-1 through 52-4 are connected to a public telephone network 51 by cable, with a great number of unshown subscriber cable terminals, computer networks, networks within businesses such as LANs and Intranets, and so forth, being connected thereto.

Also, an access server 61 of the ISP is also connected to the public telephone network 51, so that the cellular telephone 53, portable terminal 54, digital camera 55, and video camera 56 can connect to the Internet 1 via the access server 61. Further, a contents server 62 which the ISP has is connected to the access server 61.

The contents server 62 is arranged so as to provide the contents of a simple home page or the like as a compact HTML format file, for example, if requested by a subscriber cable terminal, cellular telephone 53, portable terminal 54, digital camera 55, or video camera 56.

The cellular telephone 53, portable terminal 54, digital camera 55, and video camera 56 are arranged to communicate up to the base stations 52-1 through 52-4 with a 2 Mbps simple transport protocol, and communicate from the base stations 52-1 through 52-4 to the servers via the Internet 1 with TCP/IP protocol.

An administrative control device 57 is connected via the public telephone network 51 to the subscriber cable terminal, cellular telephone 53, portable terminal 54, digital camera 55, and video camera 56, so as to perform authentication processing, billing processing, etc., for the cellular telephone 53, portable terminal 54, digital camera 55, and video camera 56.

Note that in the following description, in the event that there is no need to distinguish the individual base stations 52-1 through 52-4 one from another, these will be collectively referred to as "base station 52", in the event that there is no need to distinguish the individual client computers 31-1 through 31-n one from another, these will be collectively referred to as "client computer 31", in the event that there is no need to distinguish the individual access points 4-1 through 4-n one from another, these will be collectively referred to as "access point 4", in the event that there is no need to distinguish the individual routers 2-1 and 2-2 one from another, these will be collectively referred to as "router 2", in the event that there is no need to distinguish the individual LANs 3-1 and 3-2 one from another, these will be collectively referred to as "LAN 3", in the event that there is no need to distinguish the individual mail servers 11-1 and 11-2 one from another, these will be collectively referred to as "mail server 11", in the event that there is no need to distinguish the individual billing servers 13-1 and 13-2 one from another, these will be collectively referred to as "billing server 13", and in the event that there is no need to distinguish the individual WWW servers 15-1 and 15-2 one from another, these will be collectively referred to as "WWW server 15".

Figure 2:
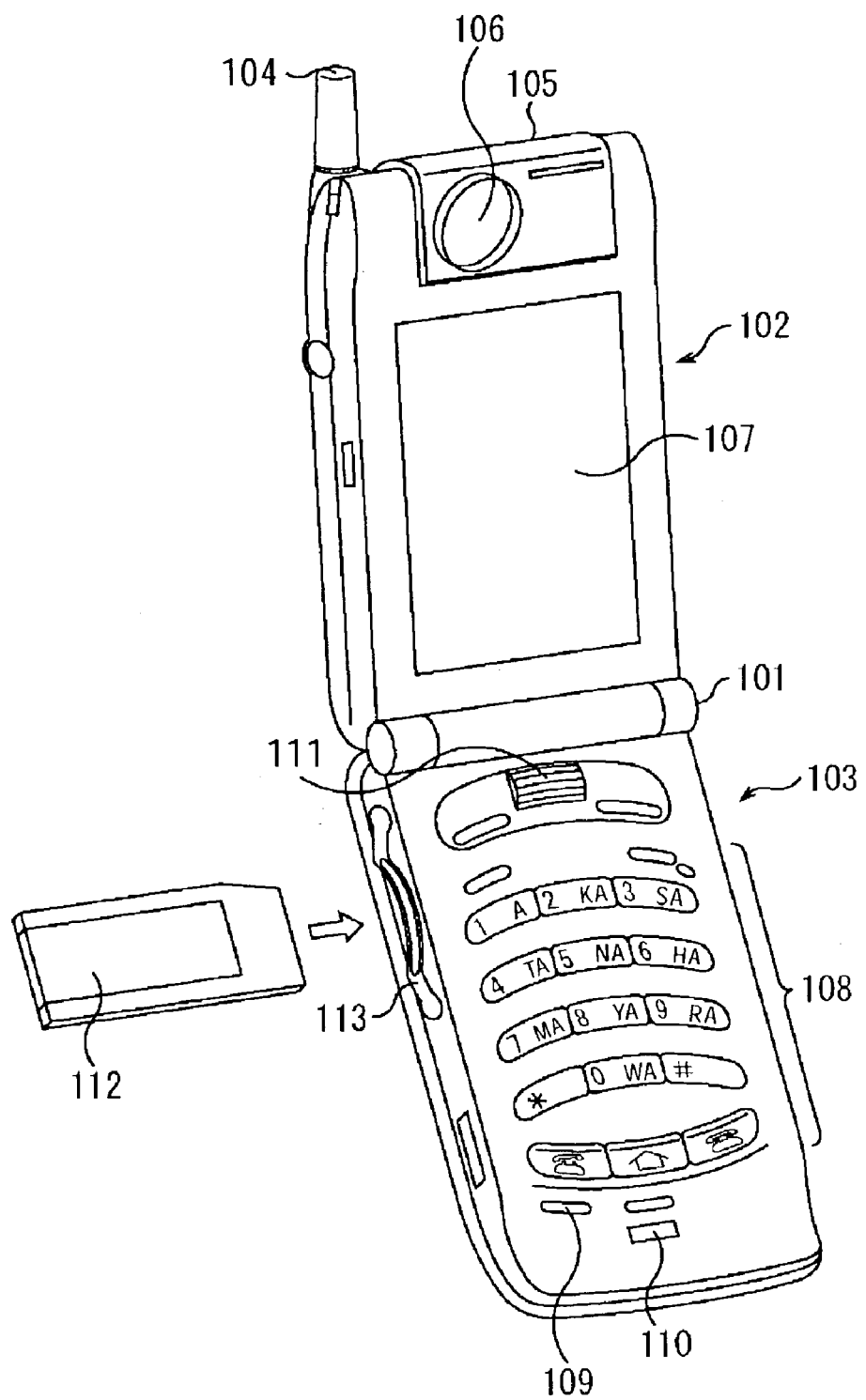
FIG. 2 is a perspective view illustrating an external view of the cellular telephone shown in FIG. 1.

Next, description will be made regarding the external configuration of the cellular telephone 53. As shown in FIG. 2, the cellular telephone 53 is divided into a display unit 102 and main unit 103 by a center hinge unit 101, and is formed so as to be folded on the hinge unit 101.

The display unit 102 has a transmission/reception antenna 104 stored at the upper left portion thereof in an extendable manner, so that airwaves can be exchanged with a base station 52 through the antenna 104.

Also, the display unit 102 has a camera unit 105 disposed at the upper center portion thereof which is capable of rotating over an angular range of approximately 180°, and can take images of desired objects with a CCD (Charge-Coupled Device) camera 106 built into the camera unit 105.

Figure 3:
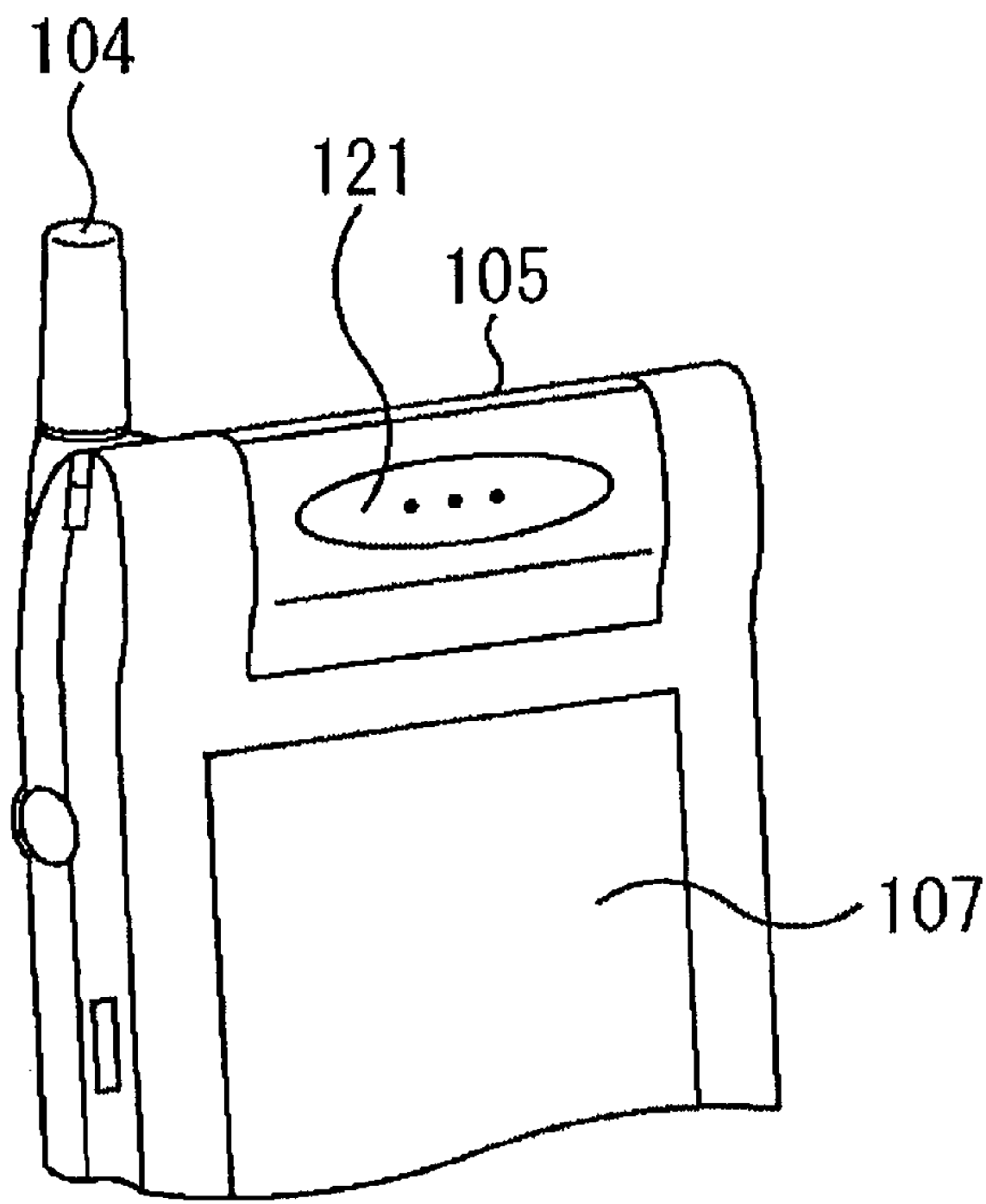
FIG. 3 is a perspective view of the display unit of the cellular telephone shown in FIG. 2 with the camera unit thereof rotated.

Now, in the event that the camera unit 105 has been rotated approximately 180° by the user and positioned, the display unit 102 then has a speaker 121 provided at the center of the rear side of the camera 105 positioned so as to face the front side as shown in FIG. 3, and this arrangement switches the state to that of normal audio communication.

Further, a liquid crystal display 107 is disposed on the front side of the display unit 102, so as to display the reception status of airwaves, the amount of remaining battery power, names and telephone numbers registered in phone books within the cellular telephone, history of calls made and received and the like, contents of e-mail, simple home pages, images taken with the CCD camera 106 of the camera unit 105, and images transmitted through the public telephone network 51 from servers, portable terminals 54, digital cameras 55, and video cameras 56, or other cellular telephones 53.

On the other hand, the main unit 103 has thereupon numerical keys "0" through "9", and operating keys 108 including a call key, a redial key, a call-end and power key, a clear key, a mail key, and so forth. Various types of instructions can be input using these operating keys 108. Also, a memo button 109 and microphone 110 are provided on the main unit 103 below the operating keys 108, whereby the voice of the other party with which a call is being made can be recorded with the memo button 109 and the voice of the user can be recorded during the call with the microphone 110.

Figure 4:
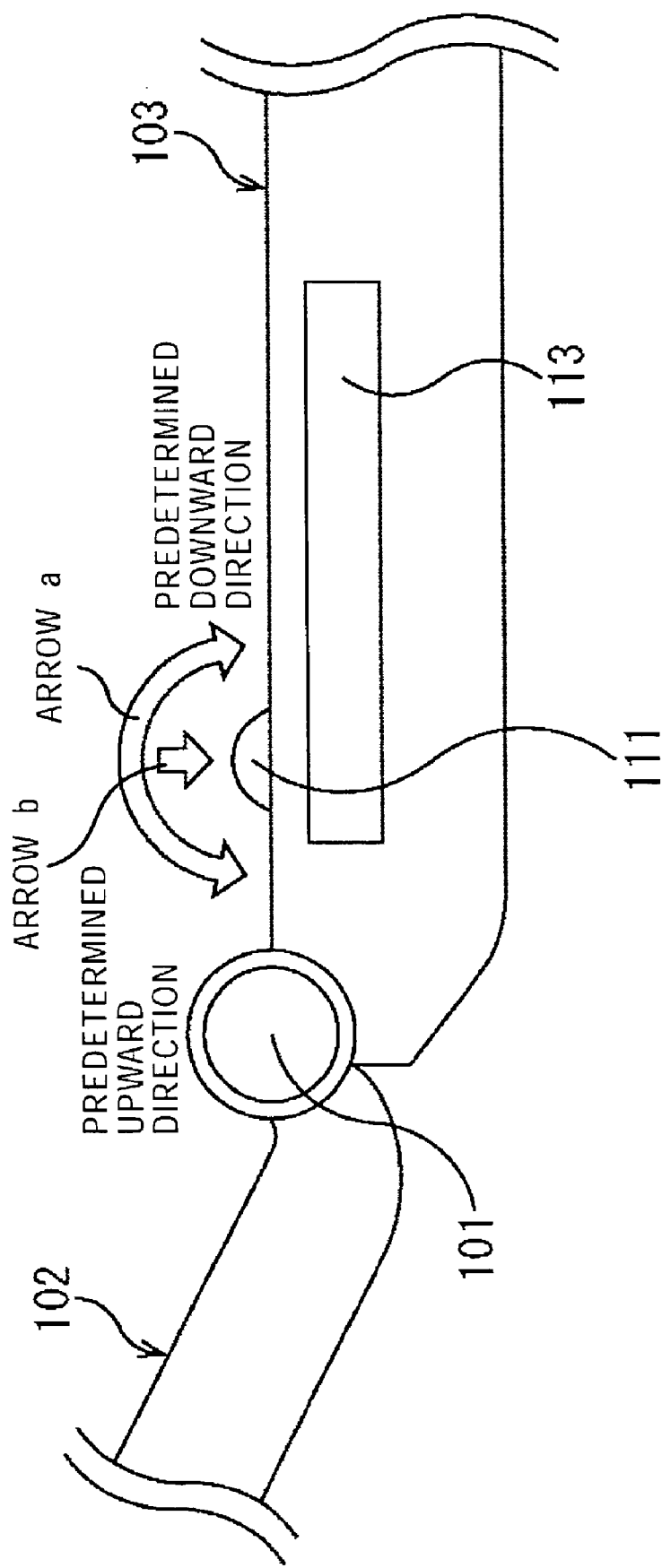
FIG. 4 is a side view of the cellular telephone shown in FIG. 2.

Further, a jog dial 111 arranged to rotate is provided on the main unit 103 at the upper portion of the operating keys 108, protruding slightly from the surface of the main unit 103, and as can be seen in FIG. 4 which is a drawing wherein the main unit 103 is viewed from the side direction, the jog dial 111 can be rotated in the directions indicated by the arrow "a", and also can be pressed in the direction indicated by the arrow "b" (which is a direction of pressing toward the main unit 103 itself).

The cellular telephone 53 executes various actions according to rotational operations of the jog dial 111, such as scrolling telephone book lists and e-mail displayed on the liquid crystal display 107, operations for flipping pages on simple home pates and sending images, selecting various items, moving cursors, and so forth. Also, the cellular telephone 53 is arranged so as to execute selected operations decided by pressing the jog dial 111. For example, in the event that the user selects a desired telephone number from multiple telephone numbers in a telephone book list displayed on the liquid crystal display 107, and presses the jog dial 111, the main unit 103 sets the selected telephone number and automatically calls this telephone number according to the rotating operations which the user makes on the jog dial 111.

Note that in the following description, rotations of the jog dial 111 made in the direction of the hinge unit 101 will be referred to as rotations in a predetermined upwards direction, and rotations in the direction opposite to the predetermined upwards direction will be referred to as rotations in a predetermined downwards direction.

Now, returning to FIG. 2, in the event that an unshown battery pack is mounted to the rear side of the main unit 103 and the call-end and power key is turned on, electric power is supplied from the battery pack to each of the circuits, thus initiating an operable state. The main unit 103 has a memory stick slot 113 provided at the upper left side of the main unit 103 for detachably inserting a memory stick (Memory Stick™ is a registered trademark of Sony Corporation) 112, and upon the memo button 109 being pressed, the voice of the other part with which a call is being made can be recorded in the memory stick 112, or e-mail, simple home pages, images taken with the CCD camera 106, and images received by wireless communication, can be recorded in the memory stick 112.

Now, the memory stick 112 is a type of flash memory card developed by Sony Corporation which is the present Assignee. This memory stick 112 stores a flash memory device which is a type of EEPROM (Electrically Erasable and Programmable Read Only Memory) which is non-volatile memory which allows electric rewriting and erasing, stored within a small and thin 21.5 mm long by 50 mm wide by 2.8 mm thick boxed-shaped plastic case, and allows various types of data such as images, voice, music, etc., to be written and read via a 10-pin terminal.

Also, the memory stick 112 uses a unique serial protocol capable of securing compatibility among devices with which it is used to handle changes in internal flash memory specifications due to increased capacity, realizing a maximum write speed of 1.5 MB/s and a maximum read speed of 2.45 MB/s, while also ensuring high reliability with a switch for preventing accidental erasing of data.

Accordingly, the cellular telephone 53 being arranged so that such a memory stick 112 can be inserted means that the cellular telephone 53 can share data with other electronic devices through the memory stick 112.

Figure 5:
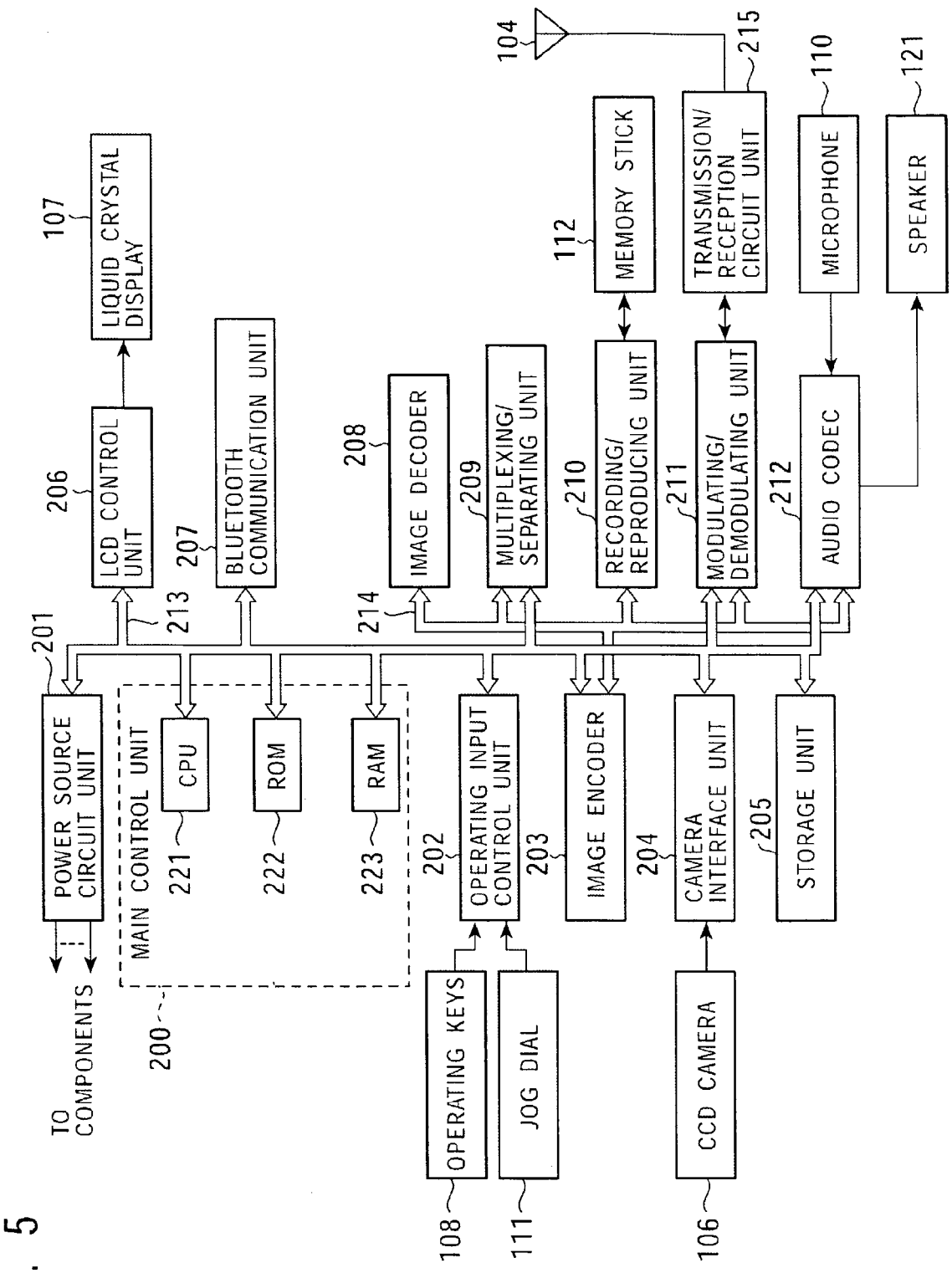
FIG. 5 is a block diagram illustrating the configuration of the cellular telephone shown in FIG. 2.

Next, FIG. 5 shows the internal configuration of the cellular telephone 53 shown in FIG. 2. As shown in FIG. 5, the cellular telephone 53 has a power source circuit unit 201, an operating input control unit 202, an image encoder 203, a camera interface unit 204, a storage unit 205, an LCD control unit 206, a Bluetooth communication unit 207, an image decoder 208, a multiplexing/separating unit 209, a recording/reproducing unit 210, a modulating/demodulating circuit unit 211, and an audio CODEC 212, mutually connected via the main bus 213 to a main control unit 200 arranged so as to centrally control the components of the display unit 102 and main unit 103, with the image encoder 203, image decoder 208, multiplexing/separating unit 209, modulating/demodulating circuit unit 211, and audio CODEC 212 being mutually connected by a synchronous bus 214.

Upon the user turning on the call-end and power key, the power source circuit unit 201 supplies electric power to the component from the battery pack, thus placing the cellular telephone 53 in an operable state.

The cellular telephone 53 converts audio signals collected by the microphone 110 in the audio call mode into digital audio data with the audio CODEC 212, under the control of the main control unit 200 made up of a CPU (Central Processing Unit) 221, ROM (Read-Only Memory) 222, RAM (Random-Access Memory) 223, etc., subjects the digital audio data to spread spectrum processing with the modulating/demodulating circuit unit 211, and digital/analog conversion processing and frequency conversion processing at the transmission/reception circuit unit 215, before transmitting from the antenna 104.

Also, the cellular telephone 53 amplifies reception signals received by the antenna 104 in the audio call mode and subjects these to frequency conversion processing and analog/digital conversion processing, inverse spread spectrum processing with the modulating/demodulating circuit unit 211, and outputs to the audio CODEC 212.

Further, in the event of transmitting e-mail in the data communication mode, the cellular telephone 53 sends e-mail text data input by the user operating the operating keys 108 and the jog dial 111 to the main control unit 200 via the operating input control unit 202. The main control unit 200 subjects the text data to spread spectrum processing with the modulating/demodulating circuit unit 211, and digital/analog conversion processing and frequency conversion processing at the transmission/reception circuit unit 215, before transmitting to a base station 52 (FIG. 1) from the antenna 104.

Conversely, in the event of receiving e-mail in the data communication mode, the cellular telephone 53 subjects the reception signals received from the base station 52 through the antenna 104 to inverse spread spectrum processing with the modulating/demodulating circuit unit 211 and restores the data to the original text data, following which it is displayed as e-mail on the liquid crystal display 107 through the LCD control unit 206. Subsequently, the cellular telephone 53 can also stored the e-mail that has been received in the memory stick 112 via the recording/reproducing unit 210, in accordance with operations made by the user.

On the other hand, in the event of transmitting image data in the data communication mode, the cellular telephone 53 supplies image data taken with the CCD camera 106 to the image encoder 203 via the camera interface unit 204. In the event of not transmitting image data, the cellular telephone 53 may directly display the image data taken with the CCD camera 106 on the liquid crystal display 107, via the camera interface unit 204 and the LCD control unit 206.

The image encoder 203 converts image data supplied from the CCD camera 106 into encoded image data by performing compression encoding according to a predetermined encoding method such as MPEG (Moving Picture Experts Group) 2 or MPEG4 for example, and sends the encoded image data to the multiplexing/separating unit 209. At the same time, the cellular telephone 53 sends the audio collected by the microphone 110 while taking pictures with the CCD camera 106 to the multiplexing/separating unit 209 via the audio CODEC 212, as digital audio data.

The multiplexing/separating unit 209 multiplexes the encoded image data supplied from the image encoder 203 and the audio data supplied from the audio CODEC 212 according to a predetermined method, subjects the multiplexed data obtained thereby to spread spectrum processing with the modulating/demodulating circuit unit 211, and digital/analog conversion processing and frequency conversion processing at the transmission/reception circuit unit 215, before transmitting from the antenna 104.

Conversely, in the event of receiving data of a moving picture file linked to from a simple home page for example, while in the data communication mode, the cellular telephone 53 subjects the reception signals received from the base station 52 through the antenna 104 to inverse spread spectrum processing with the modulating/demodulating circuit unit 211, and sends the consequently-obtained multiplexed data to the multiplexing/separating unit 209.

The multiplexing/separating unit 209 separates the multiplexed data into encoded image data and audio data, and supplies the encoded image data to the image decoder 208 while supplying the audio data to the audio CODEC 212 via the synchronous bus 214.

The image decoder 208 reproduces playback moving picture data by decoding the encoded image data with a decoding method corresponding to the predetermined encoding method, such as MPEG2 or MPEG4 for example, and supplies this to the liquid crystal display 107 via the LCD control unit 206, thus displaying the moving picture data contained in the moving picture file linked to on the simple home page.

At the same time, the audio CODEC 212 converts the audio data into analog audio signals following which these are supplied to the speaker 121, thereby reproducing audio data contained in the moving picture file linked to on the simple home page.

In this case as well, the cellular telephone 53 can record data linked to on the simple home page that has been received in the memory stick 112 through the recording/reproducing unit 210, following operations made by the user, as with the case of e-mail.

The storage unit 205 stores programs for controlling the cellular telephone 53 that are received from various servers via the base station 52, image data, etc., as suitable.

The Bluetooth communication unit 207 performs communication processing through Bluetooth technology.

The CPU 221 executes various types of processing following programs stored in the ROM 222 or programs loaded to the RAM 223 from the storage unit 205. Data necessary for the CPU 221 to execute various types of processing is also stored in the RAM 223 as suitable.

Figure 6:
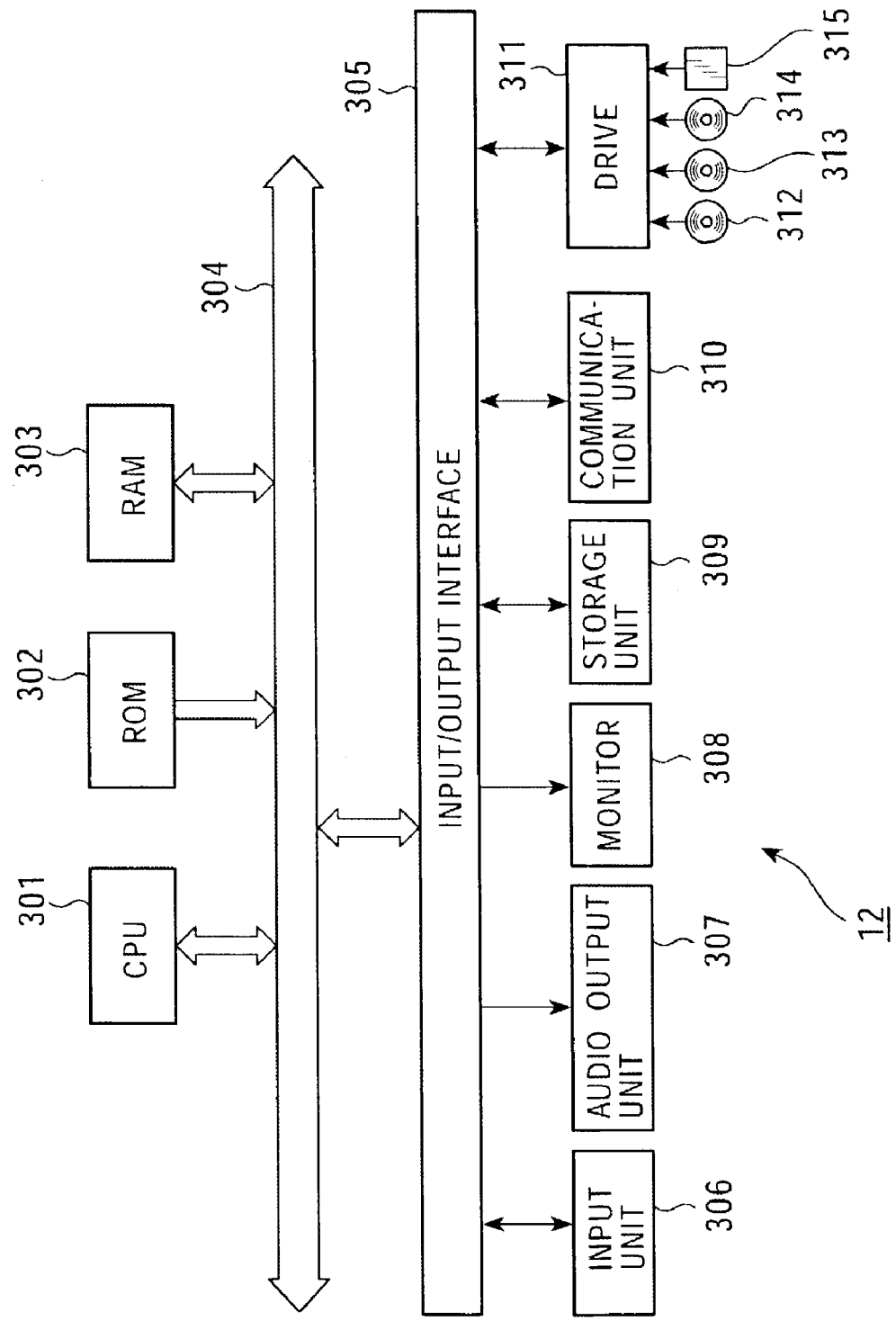
FIG. 6 is a block diagram illustrating the configuration of the AO server shown in FIG. 1.

Next, FIG. 6 is a block diagram representing a configuration example of the AO server 12. In FIG. 6, the CPU 301 executes program stored in the ROM 302 or programs loaded to the RAM 303. Data necessary for the CPU 301 to execute various types of processing is also stored in the RAM 303 as suitable.

The CPU 301, ROM 302, and RAM 303 are mutually connected through a bus 304. The bus 304 also has an input/output interface 305 connected thereto.

Connected to the input/output interface 305 are an input unit 306 formed of a keyboard, mouse, and so forth, an audio output unit 307 formed of a speaker and so forth, a monitor 308 formed of a CRT (Cathode-Ray Tube) or LCD (Liquid Crystal Display) or the like, a storage unit 309 configured of a hard disk or the like, and a communication unit 310 configured of a modem and/or terminal adapter or the like. The communication unit 310 performs communication processing through networks including the Internet 1.

If necessary, a drive 311 is also connected to the input/output interface 305, to which a magnetic disk 312, optical disk 313, magneto-optical disk 314, semiconductor memory 315, or the like can be mounted as necessary. Computer programs read out from these media are installed in the storage unit 309 as necessary.

Figure 7:
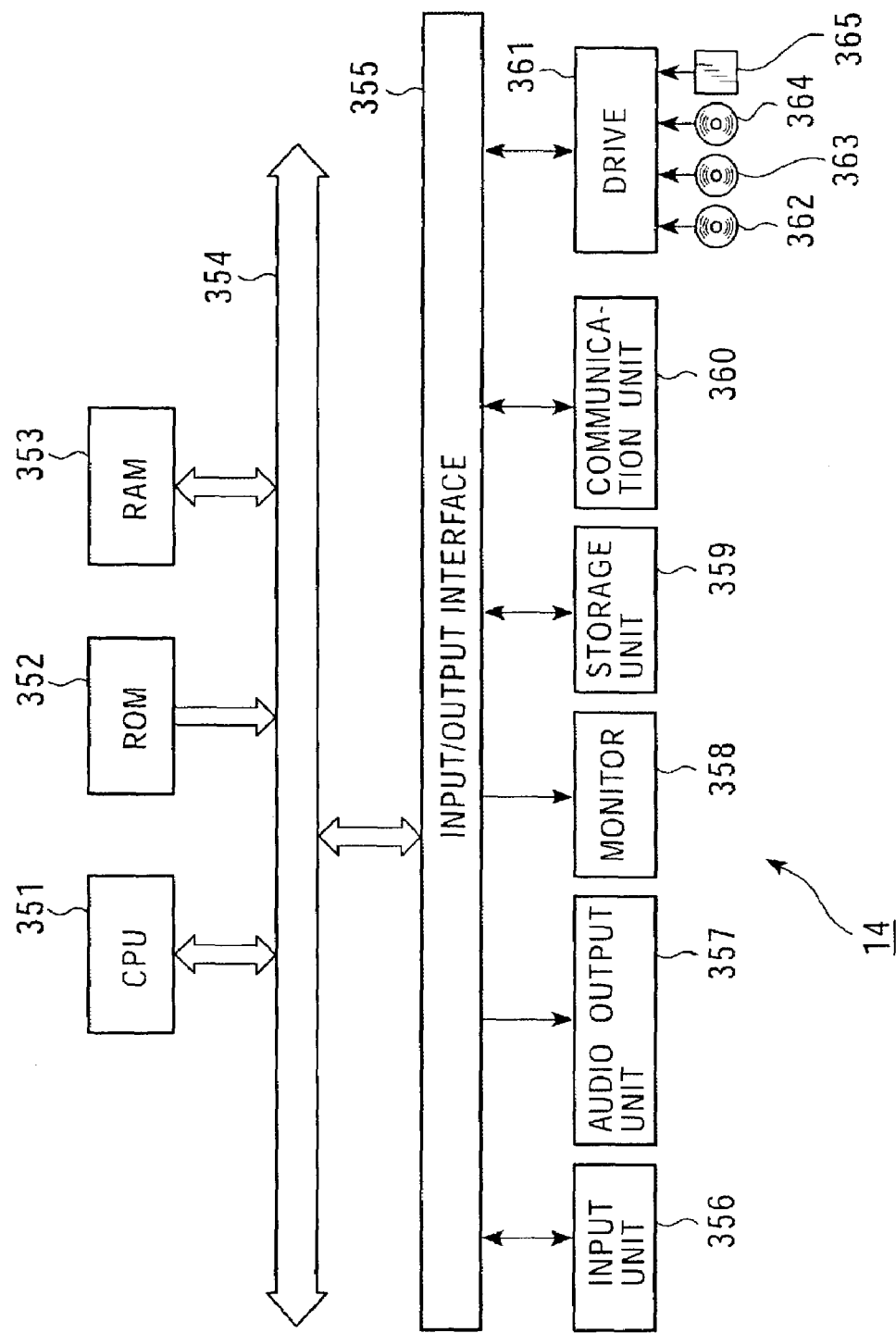
FIG. 7 is a block diagram illustrating the configuration of the CP server shown in FIG. 1.

Next, FIG. 7 illustrates a configuration example of the CP server 14. The components CPU 351 through semiconductor memory 365 making up the CP server 14 are basically of the same configuration as the components CPU 301 through semiconductor memory 315 making up the AO server 12 shown in FIG. 6, and the components with corresponding names have corresponding functions. Accordingly, description of such components will be omitted here, since the description would be unnecessarily redundant.

Figure 8:
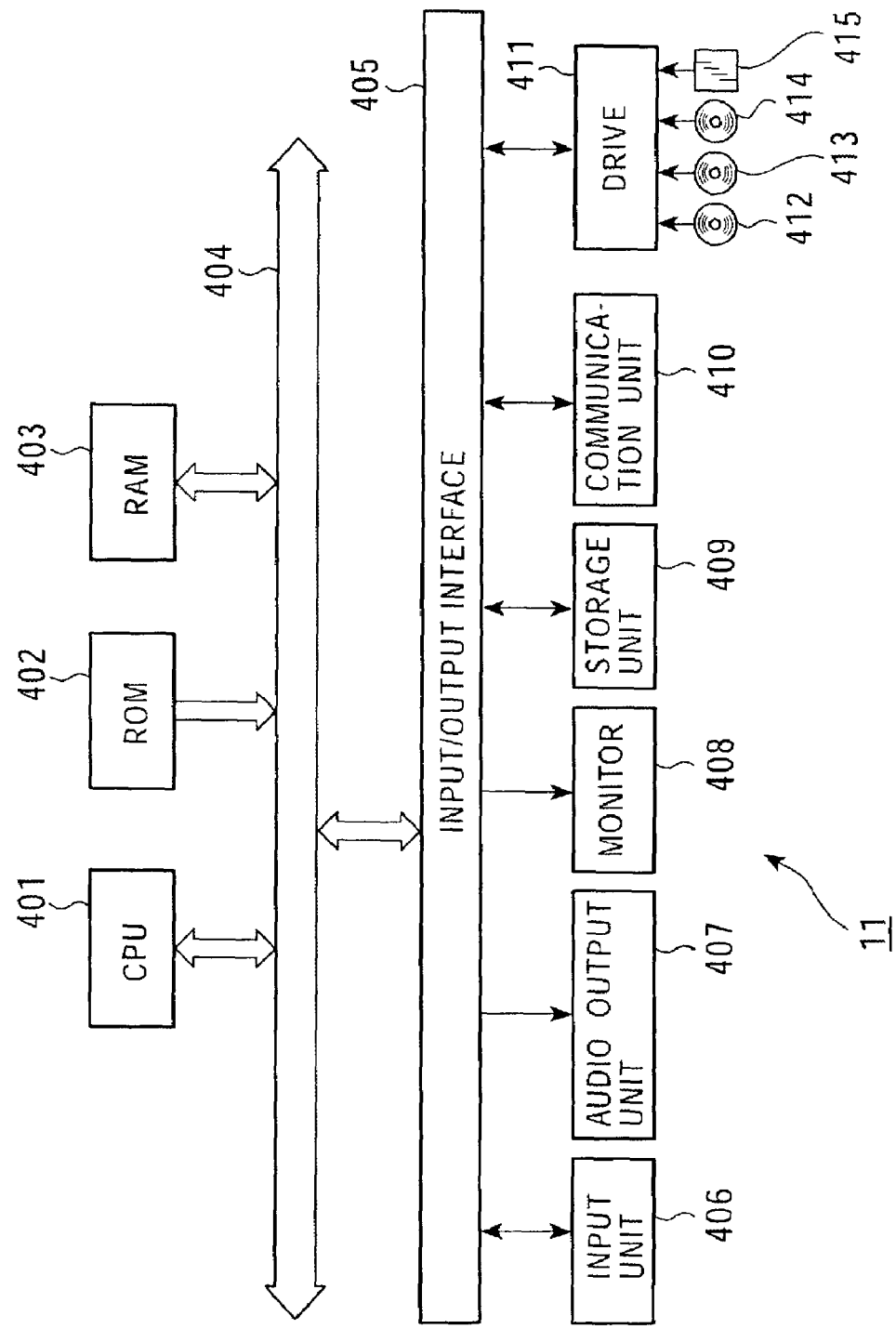
FIG. 8 is a block diagram illustrating the configuration of the mail server shown in FIG. 1.

Also, FIG. 8 illustrates a configuration example of the mail server 11. The components CPU 401 through semiconductor memory 415 making up the mail server 11 are also basically of the same configuration as the components CPU 301 through semiconductor memory 315 making up the AO server 12 shown in FIG. 6, and the components with corresponding names have corresponding functions. Accordingly, description of such components will be omitted here, since the description would be unnecessarily redundant.

Figure 9:
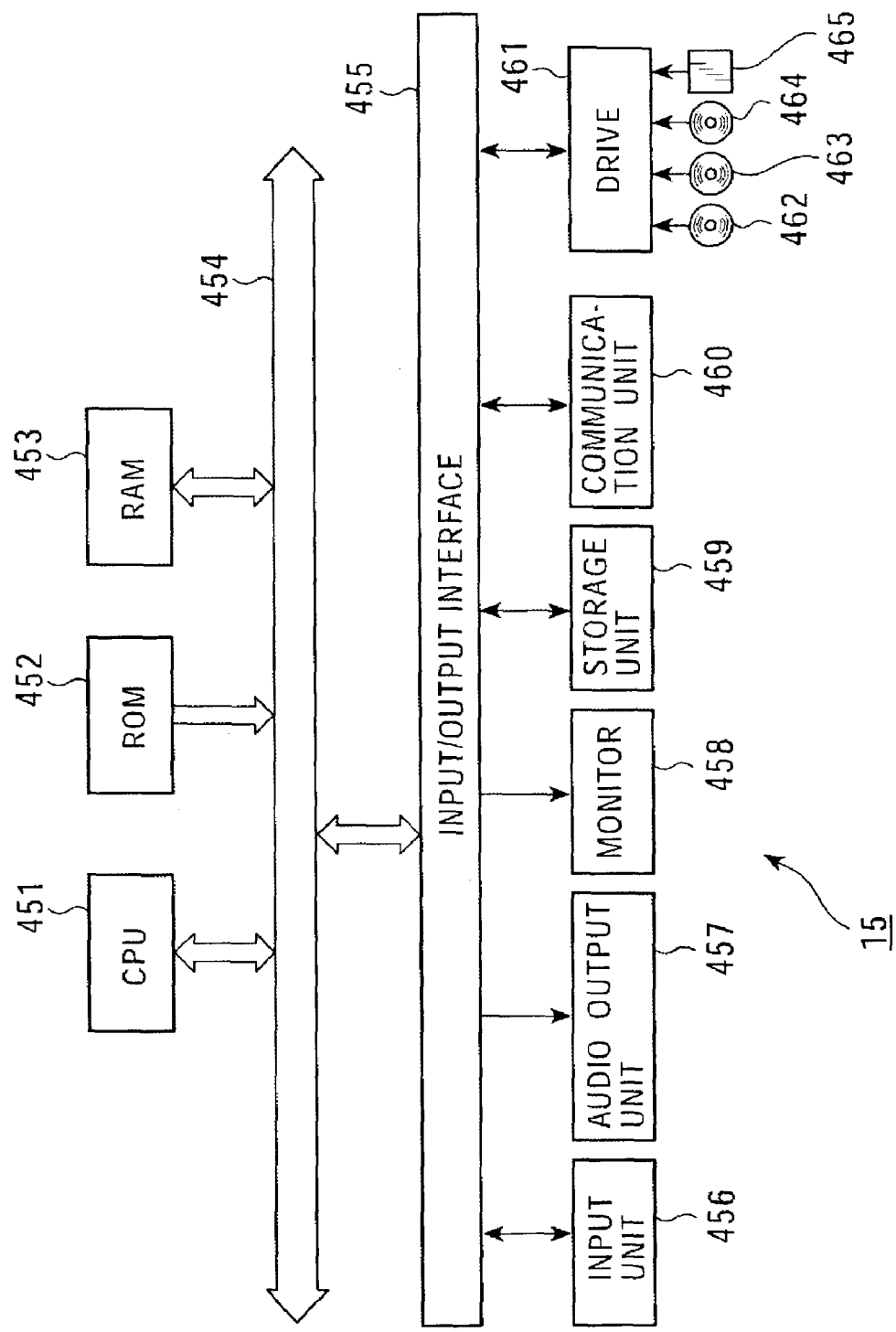
FIG. 9 is a block diagram illustrating the configuration of the WWW server shown in FIG. 1.

Further, FIG. 9 illustrates a configuration example of the WWW server 15. The components CPU 451 through semiconductor memory 465 making up the WWW server 15 are also basically of the same configuration as the components CPU 301 through semiconductor memory 315 making up the AO server 12 shown in FIG. 6, and the components with corresponding names have corresponding functions. Accordingly, description of such components will be omitted here, since the description would be unnecessarily redundant.

Figure 10:
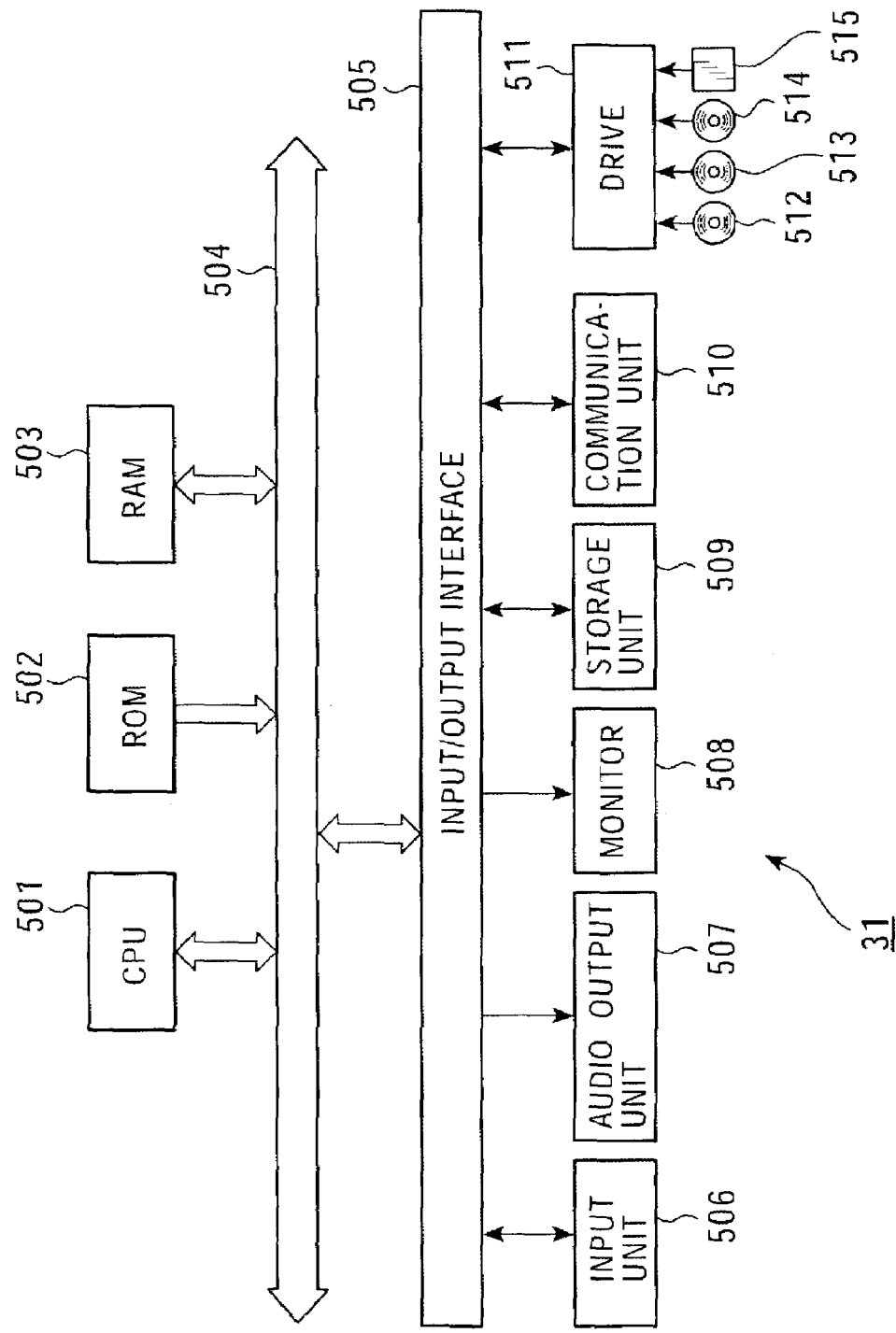
FIG. 10 is a block diagram illustrating the configuration of the client computer shown in FIG. 1.

Moreover, FIG. 10 illustrates a configuration example of a client computer 31. The components CPU 501 through semiconductor memory 515 making up the client computer 31 are also basically of the same configuration as the components CPU 301 through semiconductor memory 315 making up the AO server 12 shown in FIG. 6, and the components with corresponding names have corresponding functions. Accordingly, description of such components will be omitted here, since the description would be unnecessarily redundant.

While not shown in the drawings, the billing server 13 is also basically of the same configuration as the AO server 12 shown in FIG. 6.

Figure 11:
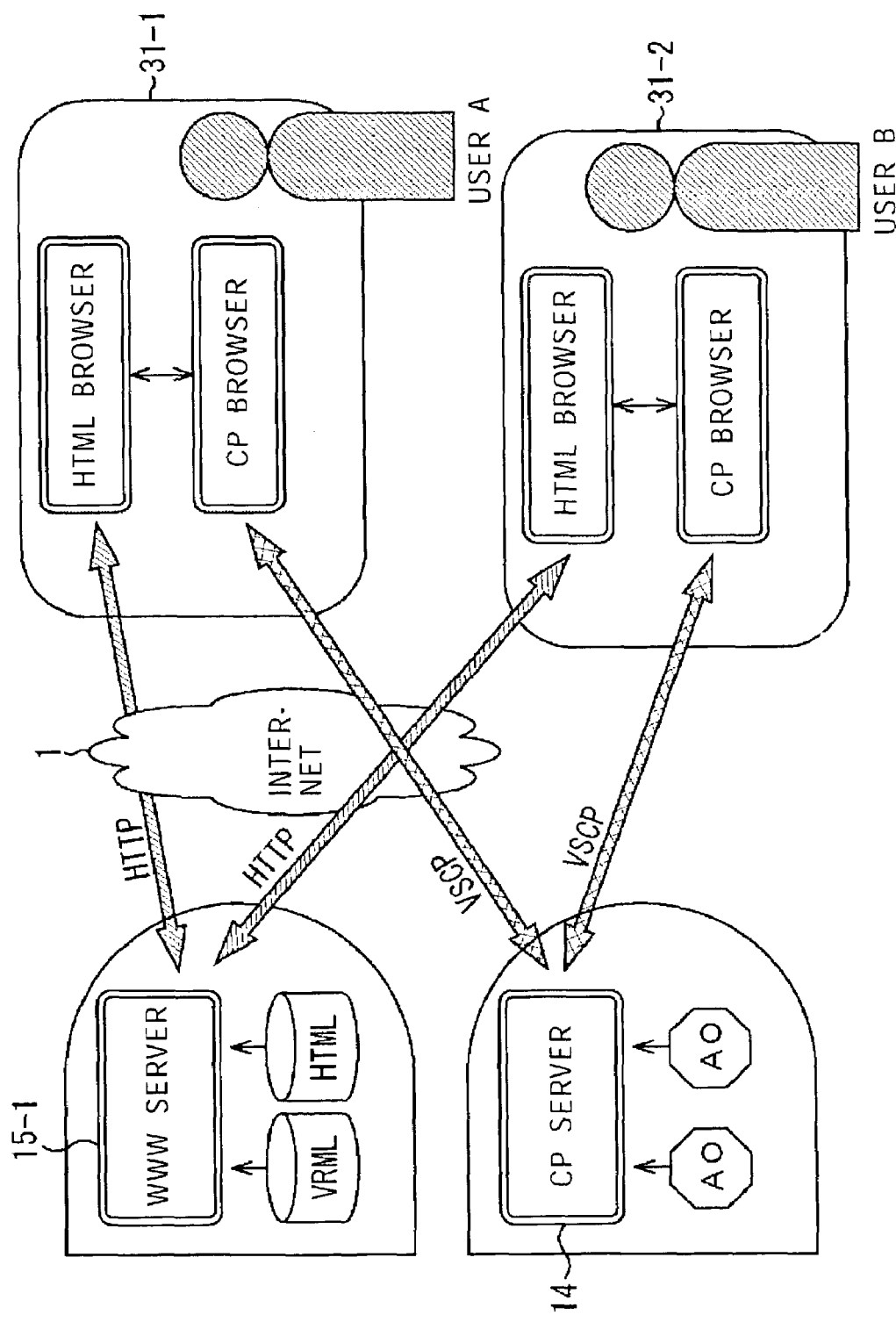
FIG. 11 is a diagram describing an action architecture for displaying and navigating a shared virtual space on a client computer logged into the shared virtual space.

Next, FIG. 11 schematically illustrates the actions for displaying and navigating a shared virtual space with a client computer 31-1 of a user logged into a shared virtual space according to the present embodiment, i.e., a community system. In the following description, we shall refer to a user which operates the client computer 31-1 as user A, and a user which operates the client computer 31-2 as user B.

As described earlier, running on the client computer 31-1 of the user A and the client computer 31-2 of the user B are CP browsers capable of interpreting VRML contents, besides the HTML browsers running on these computers. Examples of the HTML browsers include "Netscape Navigator" from Netscape Communications of USA, and "Internet Explorer" from Microsoft Corporation of USA.

The client computers 31-1 and 31-2 are connected to the Internet 1 by connecting to a nearby Access Point (AP) 4 through predetermined procedures such as a dialup IP connection, for example. Further, the client computers 31-1 and 31-2 access the WWW server 15-1 with the HTTP protocol using their HTML browsers. Upon receiving VRML contents describing the shared virtual space from the WWW server 15-1, the client computers 31-1 and 31-2 output the VRML contents to their CP browsers.

The CP browsers analyze the obtained VRML contents and display the shared virtual space on the display screens of their respective client computers. Also, the CP browsers connect to (i.e., login to) the CP server 14 corresponding to the address specified in the obtained VRML contents.

Upon success in connection to the CP server 14, i.e., login to the shared virtual space, subsequent communication carried out between the CP server 14 and the CP browsers is performed using a predetermined server-client protocol (hereafter referred to as "VSCP" (Virtual Society Server Client Protocol). The VSCP has functions for notifying the CP server 14 of changes made by a user through a CP browser (e.g., an avatar getting or discarding items), and functions for the CP server 14 to notify CP browsers of other client computers 31 of the information that has been notified thereto.

Now, note that the CP browsers of the client computer 31-1 and the client computers 31-2 which have obtained the same VRML contents are connected to the same CP server 14. Accordingly, the client computer 31-1 and the client computers 31-2 can share a VRML scene described in the VRML contents, i.e., a three-dimensional shared virtual space.

The CP server 14 is capable of restricting distribution of information necessary for each CP browser to recognize (i.e., information which should be transmitted to each CP browser) using an "aura algorithm". An "aura" as used here means a region around the avatar, or more precisely, a region in which the user is assumed to have interest in, so incidents outside the aura are judged to be of no interest to the user and information pertaining to these is not transmitted. Applying an aura algorithm allows the amount of information to be distributed to be restricted, thereby enabling the network traffic for each login user to be kept within a stipulated communication capacity.

Avatars, which are duplicated selves of users, pets kept by the avatars (i.e., virtual creatures), and various objects exist on the shared virtual space provided by the CP server 14. These objects and the actions of the objects are expressed by shared applications stored in the WWW server 15-1.

AOs (Application Objects) in the AO server 12 manage shared applications. Development languages for AOs primarily include Java (a registered trademark), C++, and so forth. AOs provide APIs (Application Programming Interfaces) for controlling shared objects which the AOs manage. "Shared objects" are objects which appear on the CP browsers of the client computers 31 (and accordingly are shared), specific examples including avatars which are duplicated selves of the login users, virtual pets kept by the avatars, rooms which the avatars own, items and functions which the login users obtain and keep, and so forth.

Figure 12:
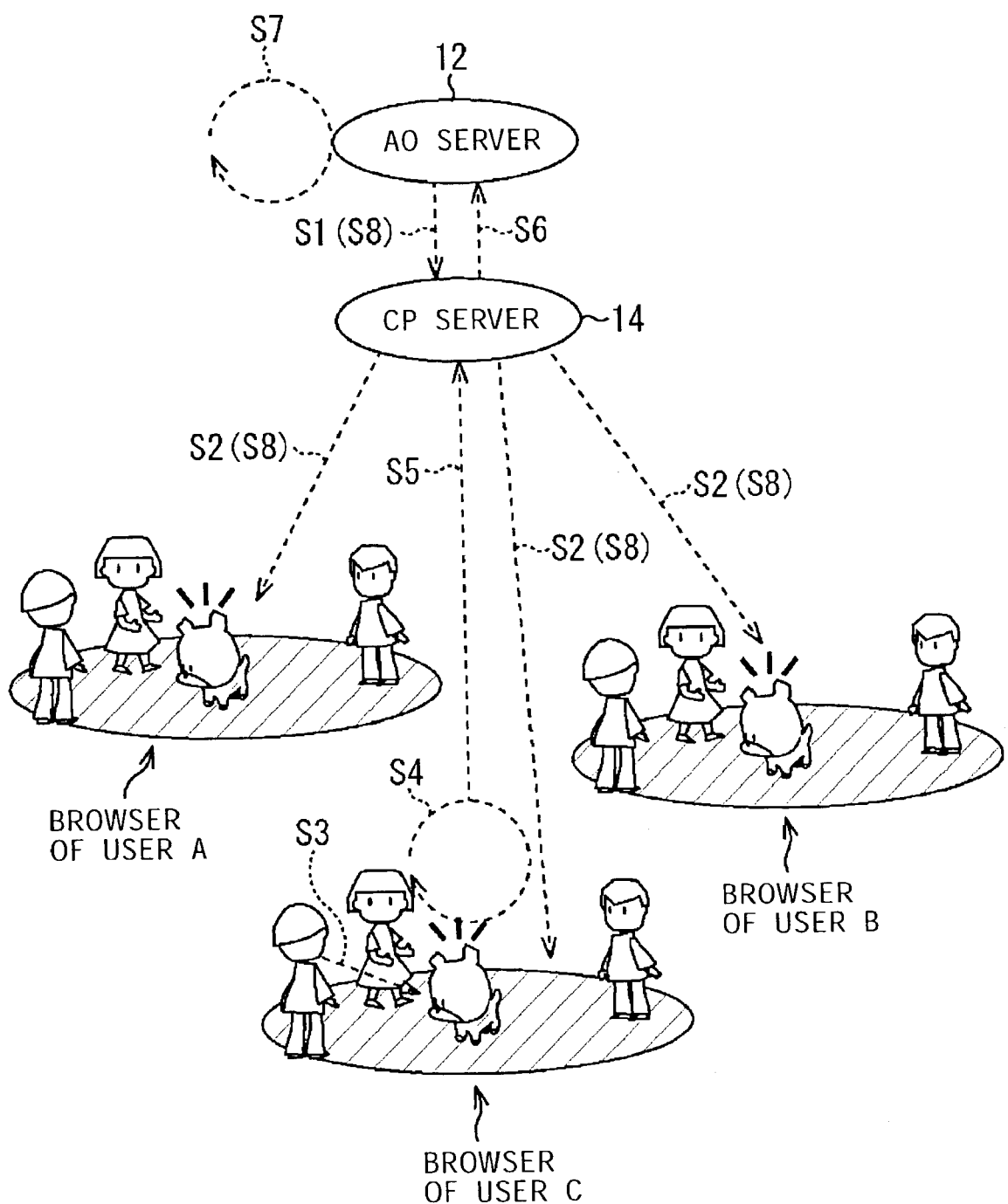
FIG. 12 is a diagram describing the mechanism of AO actions.
Figure 13:
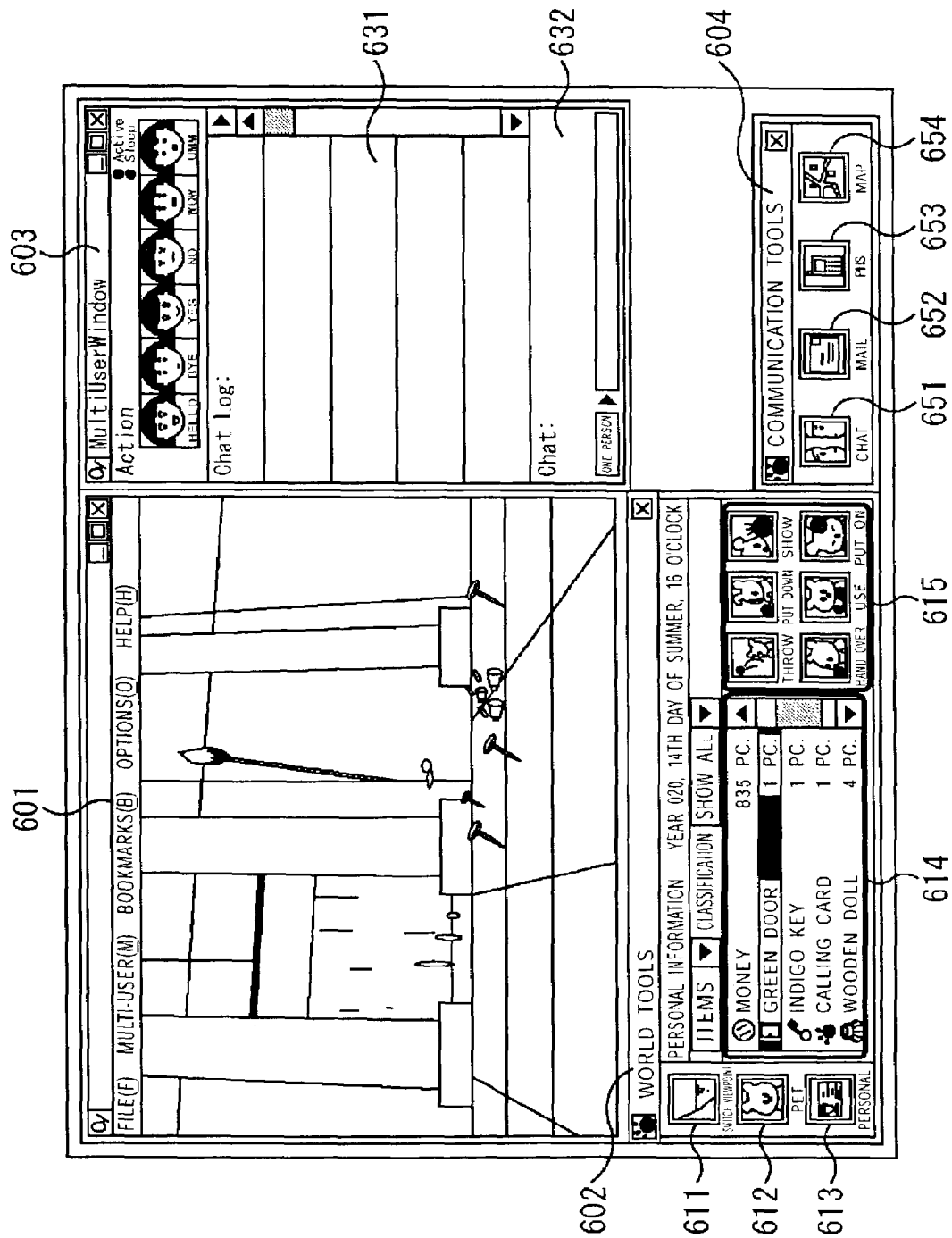
FIG. 13 is a diagram illustrating an example of a display on the monitor of the client computer.

Next, FIG. 12 illustrates the mechanism of actions of AOs according to the present embodiment. Also, FIG. 13 shows an example of a basic operation screen displayed on the monitor 508 of a client computer 31 under management of an AO. As shown in FIG. 13, the basic operation screen is generally divided into a landscape display area 601 for displaying the landscape as viewed through the eyes of the avatar (which is a duplicate self of the user) or the like, a tool area 602 for displaying information relating to avatars and pets, a communication tool area 604, and a communication display area 603 for displaying a dialogue window corresponding to the buttons set in the communication tool area 604.

The tool area 602 contains a viewpoint switch button 611 for switching the landscape displayed in the landscape display area 601 between the landscape as viewed from the eyes of the avatar and the landscape as viewed from the eyes of the pet, a pet button 612 for displaying information relating to the pet (such as name and markings), and a personal button 613 for displaying information relating to the avatar (possessions of the avatar and so forth).

Also, the tool area 602 shown in FIG. 13 displays a screen showing personal information, as an example. The screen indicating personal information contains a possession display area 614 for displaying information relating to possessions of the avatar, and a button display area 615 displaying multiple buttons for instructing how to handle the possessions displayed in the possession display area 614. Examples of buttons displayed in the button display area 615 include a button for throwing a selected possession, a button for putting down a selected possession, a button for showing a selected possession to someone else, a button for handing a selected possession to someone else, a button for using a selected possession, and a button for putting a selected possession on.

Also, the communication tool area 604 contains a chat button 651 for displaying a chat dialogue window used for carrying out chat on the communication display area 603, a mail button 652 for displaying mail dialog used for exchanging mail with other avatars, a PHS button 653 for calling up a particular other party and holding a chat-style conversation, and a map button 654 for displaying the current position on a map.

Further, the communication display area 603 shown in FIG. 13 shows a chat dialogue window as an example. The chat dialog window has a conversation display area 631 for displaying conversation with other avatars and pets, and a conversation input area 632 for inputting conversation text with other avatars and pets.

In the example shown in FIG. 12, a user which has logged into the shared virtual space displayed on the landscape display area 601 described above clicks on a pet (shared application) of the avatar which is a duplicate self of him/herself, and an action of the pet barking in response to the click operation is shared among the login users.

First, upon a user logging into the shared virtual space, the AO server 12 issues a request to the CP server 14 so s to add a shared object (the avatar corresponding to the user which has logged in) managed by the AO server 12 to the shared virtual space displayed in the landscape display area 601 (step S1).

The CP server 14 transfers this request to all CP browsers connected to the CP server 14 (step S2). As a result, the new shared object (the avatar corresponding to the user which has logged in) appears on the landscape display area 601 of the CP browsers, i.e., the landscape display area 601 displayed on the monitors of the client computers 31 currently logged in. The information of the shared object transferred to the CP browsers of each of the login users may be restricted to the range of the above-described aura of the avatar which is a duplicate self of the user or that of a virtual pet thereof.

Also, upon a shared object (pet) being selected (i.e., clicked on) on the CP browser of a client computer 31 being operated by a user C (step S3), a script corresponding thereto is activated on the CP browser (step S4). This script transmits a message based on VSCP to the CP server 14 (step S5).

The CP server 14 transmits this message to the AO server 12 managing the selected shared object (step S6). The AO server 12 performs processing corresponding to the received message, and repeats the same message to all other CP browsers via the CP server 14 (step S7). As a result, this message is handed to the corresponding shared object (pet) on each of the CP browsers, and processing the same as that executed upon this shared object being selected (i.e., the pet barking in response to being clicked on) is executed (step S8).

Also, while not shown in FIG. 12, processing for the avatar or a virtual pet thereof obtaining or discarding items or functions is realized in the same manner. That is to say, in the event that a certain login user performs actions for obtaining or discarding an item on the CP browser, a script corresponding thereto is activated on the CP browser. This script transmits a message based on VSCP to the CP server 14. The CP server 14, which has received this message, transmits this message to the AO server 12 managing the selected shared object. The AO server 12 performs processing corresponding to the received message, and repeats the same message to all other CP browsers via the CP server 14. As a result, this message is handed to the corresponding shared object (pet) on each of the CP browsers, and the same processing (i.e., the item being obtained or discarded) is executed.

Login to this community system in itself is not billed, in order to gather enough users to form a community, and the above-described participation in the community can be made free of charge. With the present embodiment, the user is billed only for privileges provided to the user within the community services. Now, in the present embodiment, "privileges provided to the user" means privileges for decorating the shared virtual space with images which the user desires.

With the present embodiment, the monetary amount billed differs according to the size of images used for decorating the shared virtual space. Note that images as used here include still images, text images, and moving images as well.

The concept of billing the act of decorating this shared virtual space with images is the same as the concept of charging money for placing advertisement billboards or displaying objects at an exhibition, in real society. Also, the concept of setting different charges for different image sizes is the same as the concept in real society wherein different charges are set according to the size of the advertisement billboards or the size of the exhibition space. Accordingly, users can readily grasp the concept of billing, and users will pay the fees with sufficient understanding of the meaning of the pay services.

Also, making logging into the community service itself free enables users to participate in the community without hesitation, and situations wherein the number of participants decreases can be avoided. In this way, the community itself can be established by maintaining the number of participants. From a different perspective, even non-paying users who login and participate in the community enable the community to continue and attract paying users and new users to the community. That is to say, non-paying users generate a value equivalent to the act of paying by participating in the community, and it is reasonable that they be rewarded with the permission to log in.

On the other hand, the act of decoding the shared virtual space with images is not indispensable for normal communication in the shared virtual space. That is, decorating with images is not a standard act carried out by the users, bur rather is an arbitrary act of users, with a rather privileged nature. Accordingly, users should not feel that the arrangement is irregular, and there should be no dissention with regard to paying.

The WWW server 15-1 manages various types of information relating to the images decorating the shared virtual space. FIG. 14 shows a configuration example of an image information table stored in the WWW server 15-1. The image information table generates a record each time an item is purchased for exhibiting images as described later. Items here are possessions such as money or food that the avatar (which is a duplicate self of the login user) or a virtual pet thereof has, or means for exhibiting the images, within a three-dimensional community system for example, that is, the three-dimensional shared virtual space. The items may be arrayed on shelves in stores in the community system, i.e., the shared virtual space, or lying about. The login users can intentionally obtain such items by having the avatar or the pet of the avatar to purchase or pick up the item.

As shown in FIG. 14, each record in the image information table has fields for storing a server No. for identifying the CP server 14, a room No. for identifying the room which is to be decorated with the image (the room No. and the space ID may be made to be the same), a frame No. for identifying the frame used for decorating the image (the frame No. and the frame ID may be made to be the same), a user ID for identifying the user, the size of the image, a valid period through which the image can be exhibited, the URL pointing to the image title of the exhibited image, position information of the virtual space wherein the image is exhibited, scale information of the exhibited image, rotation information of the exhibited image, and credit card information such as the credit card No. and the expiration date, from the left to right in the table.

The billing server 13-1 manages a billing information table upon which billing for images decorating the shared virtual space is based. FIG. 15 shows a configuration example of a billing information table stored in the billing server 13-1. The billing information table stores the usage fees for one week according to the size of the image exhibited.

For example, in the event that the size of the image is between 51 to 100 KB the usage fees are ¥200 per week, in the event that the size of the image is between 11 to 50 KB the usage fees are ¥150 per week, and in the event that the size of the image is between 1 to 10 KB the usage fees are ¥100 per week. In this way, the larger the size of the image to be exhibited is, the more expensive the charges are. The user ID and image size are stored in the records in the image information table, so searching the billing information table with the image size as a key allows the billing information for the user ID to be extracted.

Figure 16:
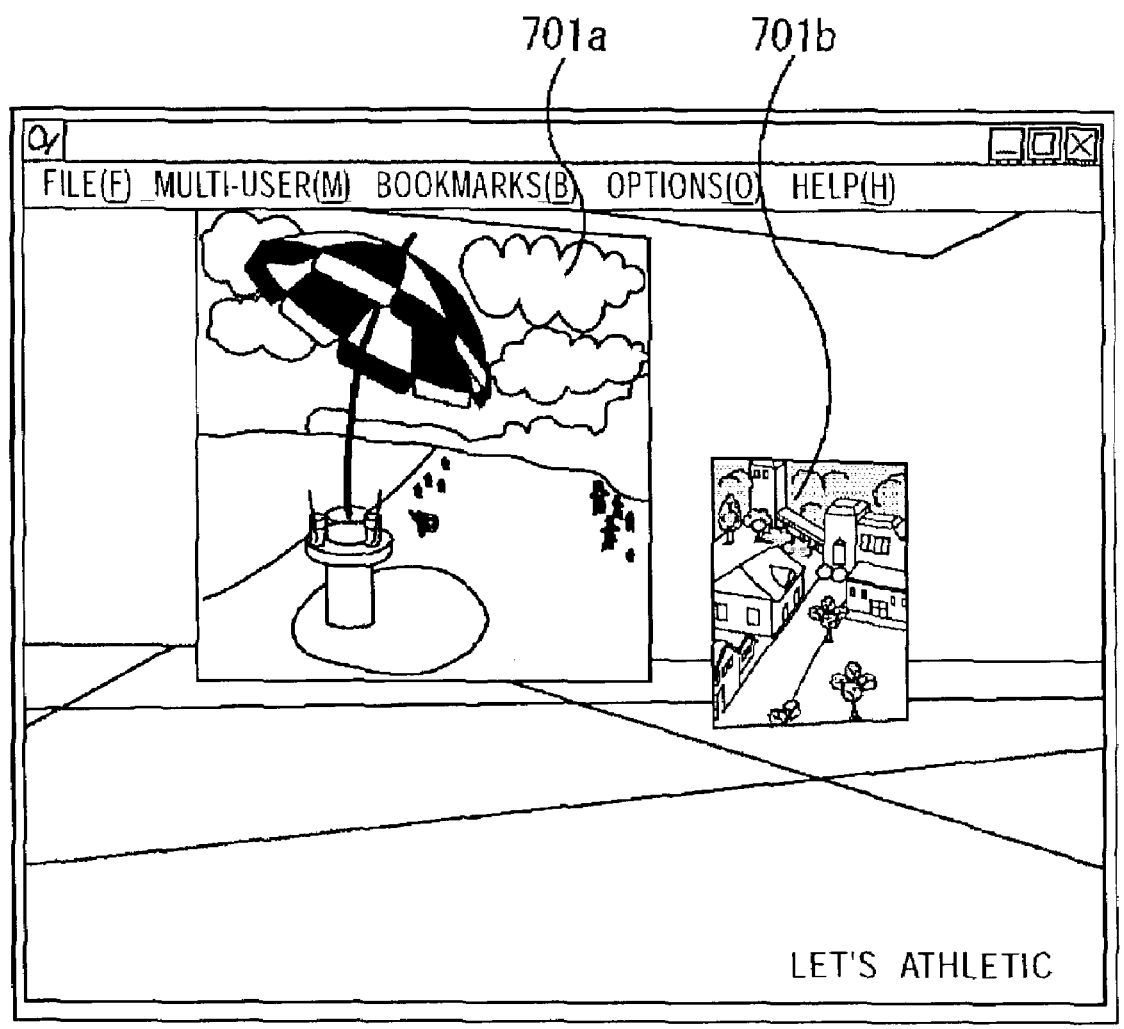
FIG. 16 is another diagram illustrating an example of a display on the monitor of the client computer.

Next, setting usage fees which differ according to the image size will be described in detail with reference to FIG. 16. FIG. 16 shows images of different size, with the usage fees being set such that the larger the image is, the higher the charges are. For example, the user is billed ¥200 per week as usage fees for the larger image 701a, and ¥100 per week as usage fees for the smaller image 701b. Thus, usage fees for billing users according to the size of the image exhibited in the shared virtual space can be set.

Figure 17:
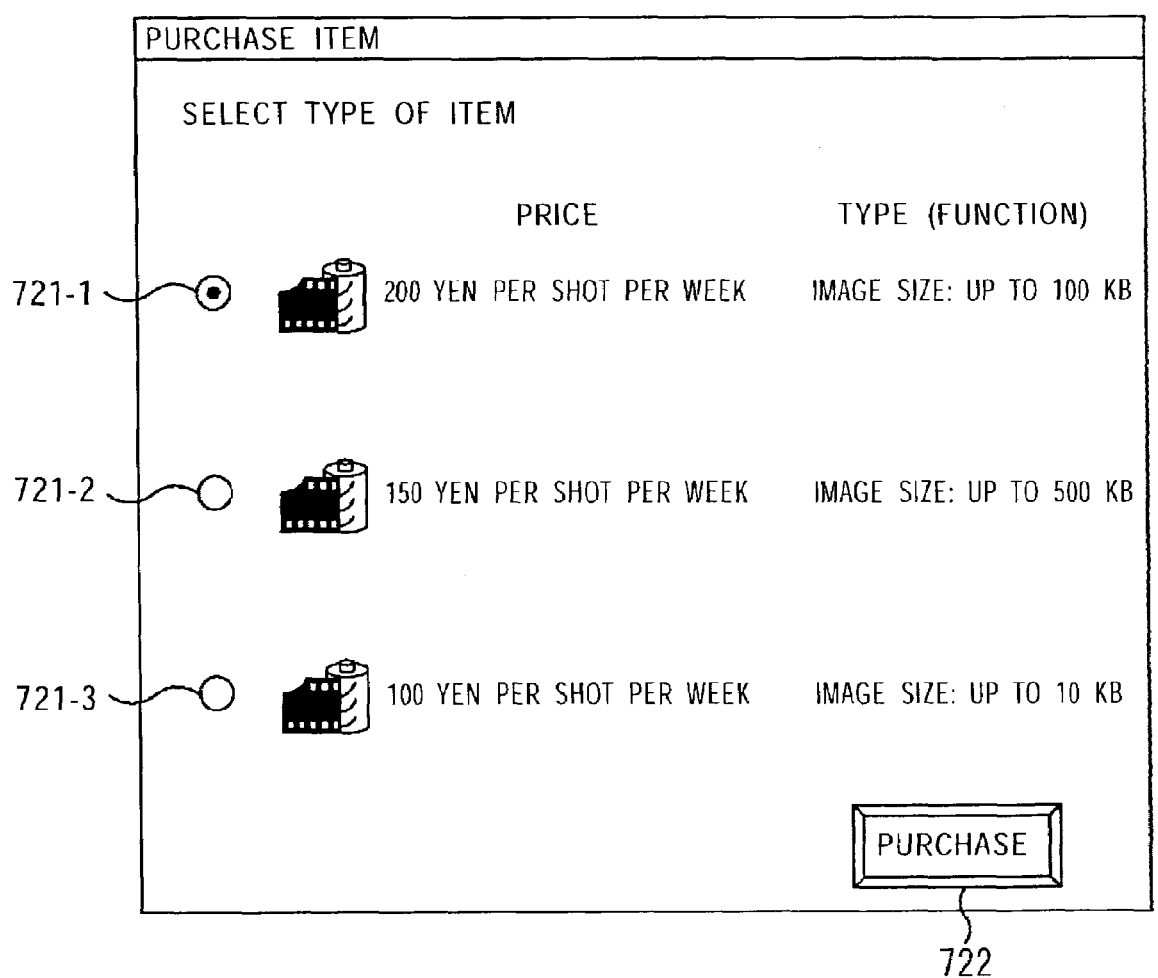
FIG. 17 is a diagram illustrating an example of a screen for purchasing items.

Next, the item purchasing screen used for purchasing items for the user to exhibit images is shown in FIG. 17. Items for exhibiting the image are provided corresponding to the usage fees set for the three types of image sizes, and are displayed on the monitor 508 of the client computer 31 when suitable.

As shown in FIG. 17, types of image sizes provided here are for image sizes up to 10 KB, images exceeding 10 KB on up to 50 KB, and images exceeding 50 KB on up to 100 KB, for example. The usage fees for one week for each image corresponding to each type are set to ¥100, ¥150, and ¥200, respectively. Also, selection spaces 721-1 through 721-3 for selecting items to purchase are displayed at the left edge of the purchasing screen for each image corresponding to the types.

The user clicks on the selection space corresponding to the desired image size from the selection spaces 721-1 through 721-3 shown in FIG. 17, and subsequently clicks on the purchase button 722, thereby purchasing the selected item.

Next, the management procedures for the billing information carried out following the purchase button 722 on the item purchasing screen shown in FIG. 17 being pressed will be described with reference to FIG. 18.

First, an item for exhibiting an image is selected from the item purchasing screen displayed on the display of the client computer 31, and upon the purchase button 722 being clicked, item purchase information is generated. At the same time, an input screen for inputting credit card information (not shown in the drawings) necessary for setting the usage fees for the item for exhibiting the image is displayed on the monitor 508 of the client computer 31. Upon the user inputting credit card information for the credit card for settling the usage charges, including the credit card No. the name of the cardholder, and the expiration date of the credit card, and clicking the OK button, the generated item purchasing information and the credit card information are transmitted to the WWW server 15-1 (step S11).

The WWW server 15-1 transmits the received item purchasing information and credit card information to the billing server 13-1. The billing server 13-1 generates image information stored in the image information table based on the received item purchasing information and credit card information, and registers the generated image information in the image information table (step S12).

Next, the billing server 13-1 searches the billing information table with the size of the image contained in the registered image information as a key, and extracts billing information. The billing server 13-1 then transmits the extracted billing information to the CP server 14 (step S13).

Upon the user logging into the community system the next time, the client computer 31 will receive from the CP server 14 a purchase completion notification and billing information thereof for the item for exhibiting the image (step S14).

Thus, the payment for the item which the user has purchased is billed.

Figure 19:
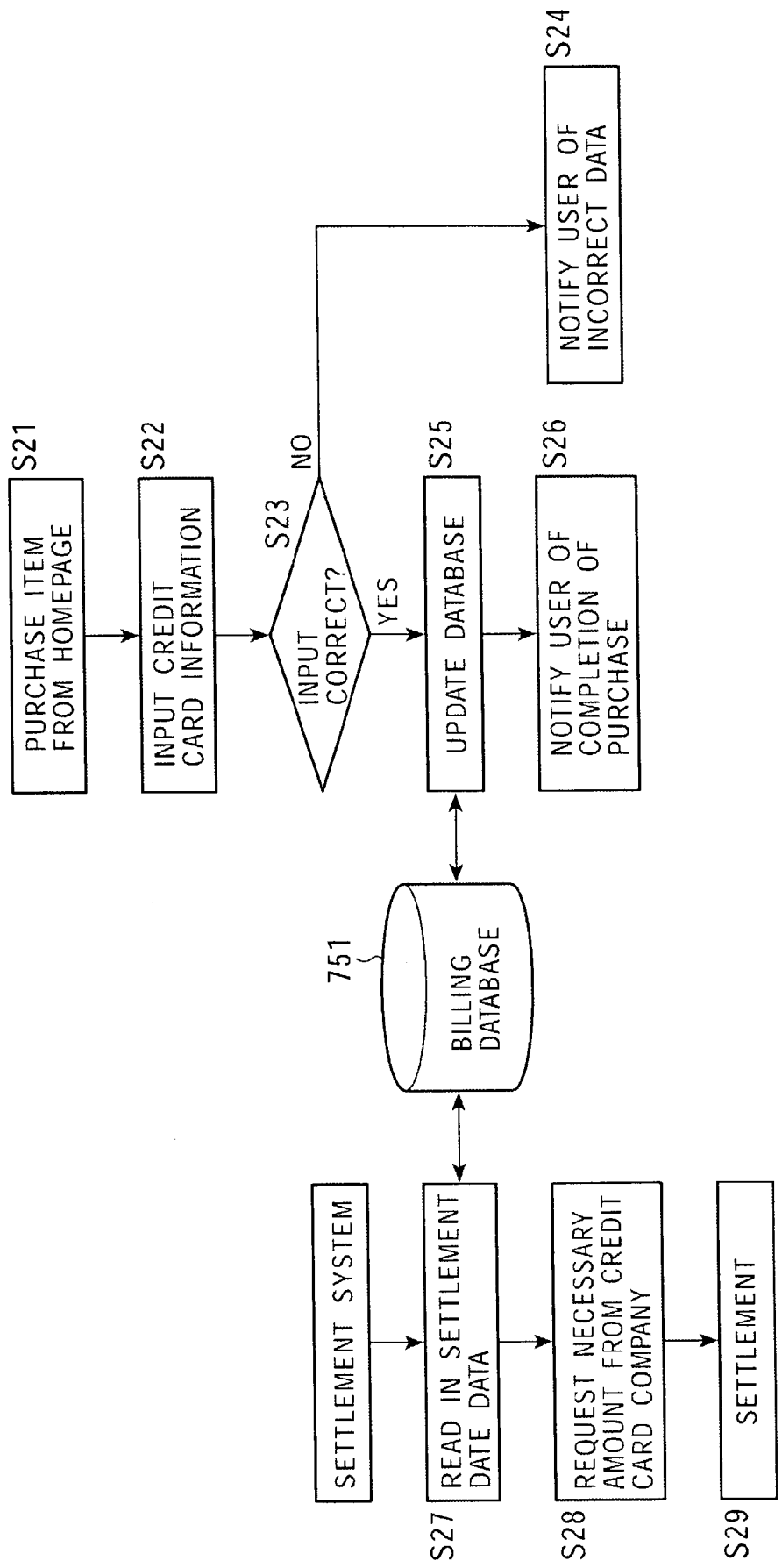
FIG. 19 is a flowchart describing the billing processing from the point of the user purchasing an item up to the point of the fees for using the item being settled.

Next, the contents of the billing processing in billing management will be described in detail. FIG. 19 is a flowchart illustrating the procedures for billing processing carried out from the point of the user purchasing an item up to the point of the usage fees of the item being settled.

In step S21, the client computer 31 accepts input of instructions from the user to purchase an item. The user selects the desired item from the input screen shown in FIG. 17, and purchases the item.

Next, in step S22, the client computer 31 accepts input from the input unit 506, which is input of credit card information such as the credit card No. and name of the cardholder, necessary for setting the usage fees for the purchased item. This input is made by the user.

In step S23, the WWW server 15-1 which has received the credit card information input by the user from the client computer 31 judges whether or not the credit card information is valid information, and in the event that the credit card information is not valid information, the flow proceeds to step S24. In step S24, the WWW server 15-1 transmits a message to the client computer 31 which the user is using, to the effect that the data is invalid.

In step S23, in the event that the WWW server 15-1 judges that credit card information is valid information, the flow proceeds to step S25, and the WWW server 15-1 transmits the item information and credit card information input by the user to the billing server 13-1 so as to update the billing database 751 stored in the billing server 13-1.

Upon the user logging into the community system the next time, in step S26 the client computer 31 presents the billing information containing the results of purchasing a room and so forth, to the user.

Next, in step S27, the billing server 13-1 searches and reads billing data from the billing database 751 wherein the date of billing processing is the settlement date.

In step S28, the billing server 13-1 which has read in the billing data generates invoice data to the credit card company based on the credit card information contained in the billing data and the charges of the items stored in the billing information table (see FIG. 15), and transmits the generated invoice data to the host computer of the credit card company.

In step S29, the host computer of the credit card company which has received the request data collects the invoice amount from the bank or savings account which the user has specified, based on the invoice data. Thus, the payment for the item which the user has purchased is collected from the account by the credit card company.

Next, the actions taken at the time of purchasing an item for exhibiting an image, and using this item to exhibit the image, will be described with reference to FIG. 20.

Figure 20:
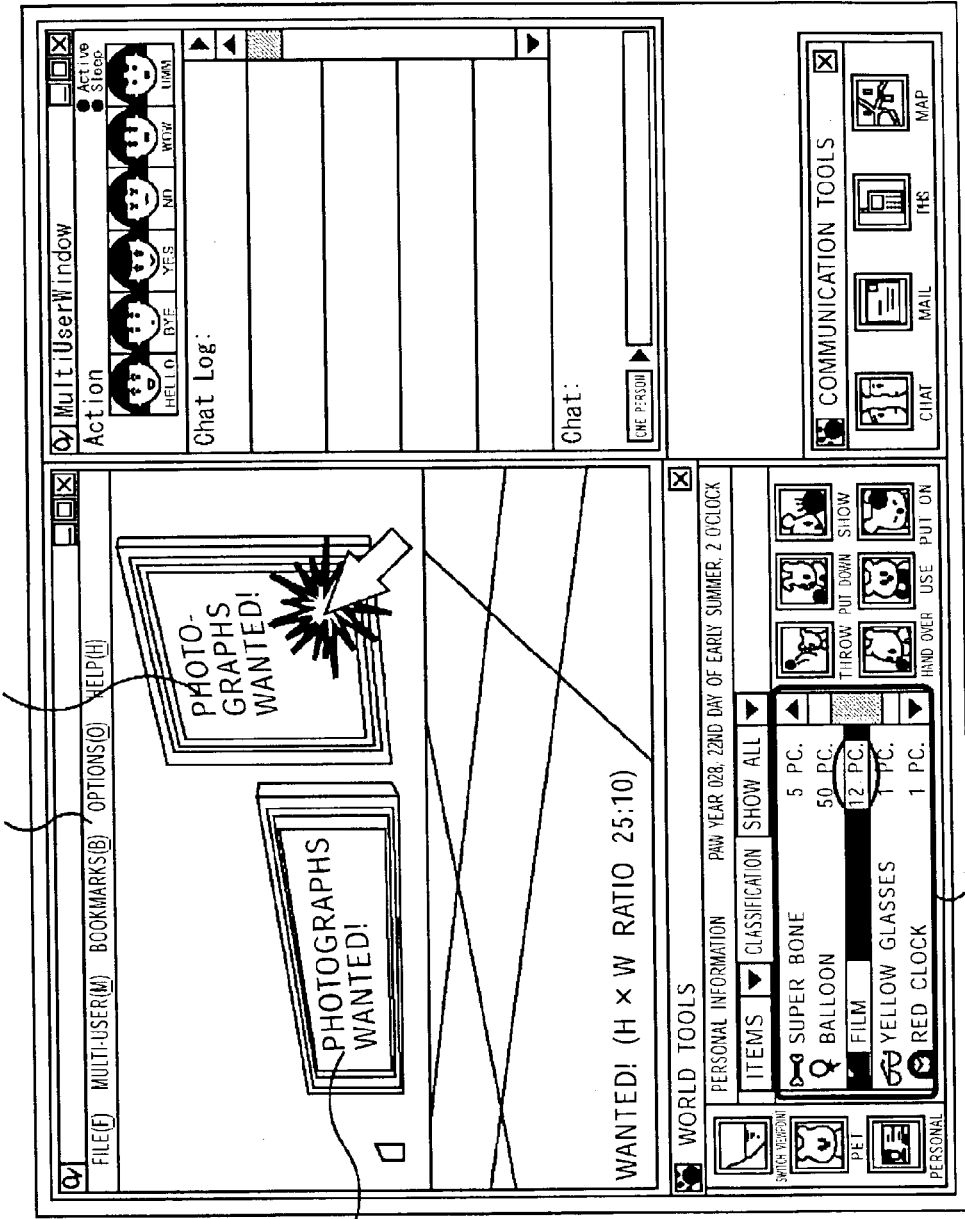
FIG. 20 is yet another diagram illustrating an example of a display on the monitor of the client computer.

In FIG. 20, a frame 761-1 and frame 761-2 are displayed in the landscape display area 601. Frame IDs are set for these frames for identifying the individual frames.

First, the actions for exhibiting the image in the frame 761-1 displayed in the landscape display area 601 of the basic operation screen shown in FIG. 20 will be described. The user selects "film", which is the item for exhibiting an image, from the list of possessions displayed in the possession display area 614 in FIG. 20, and from the frames displayed in the landscape display area 601 clicks on the frame 761-1 which the user desires. Note that the "frame" which the user is selecting here does not refer to a particular design of frame but to a certain location in virtual space to exhibit an image.

Figure 18:
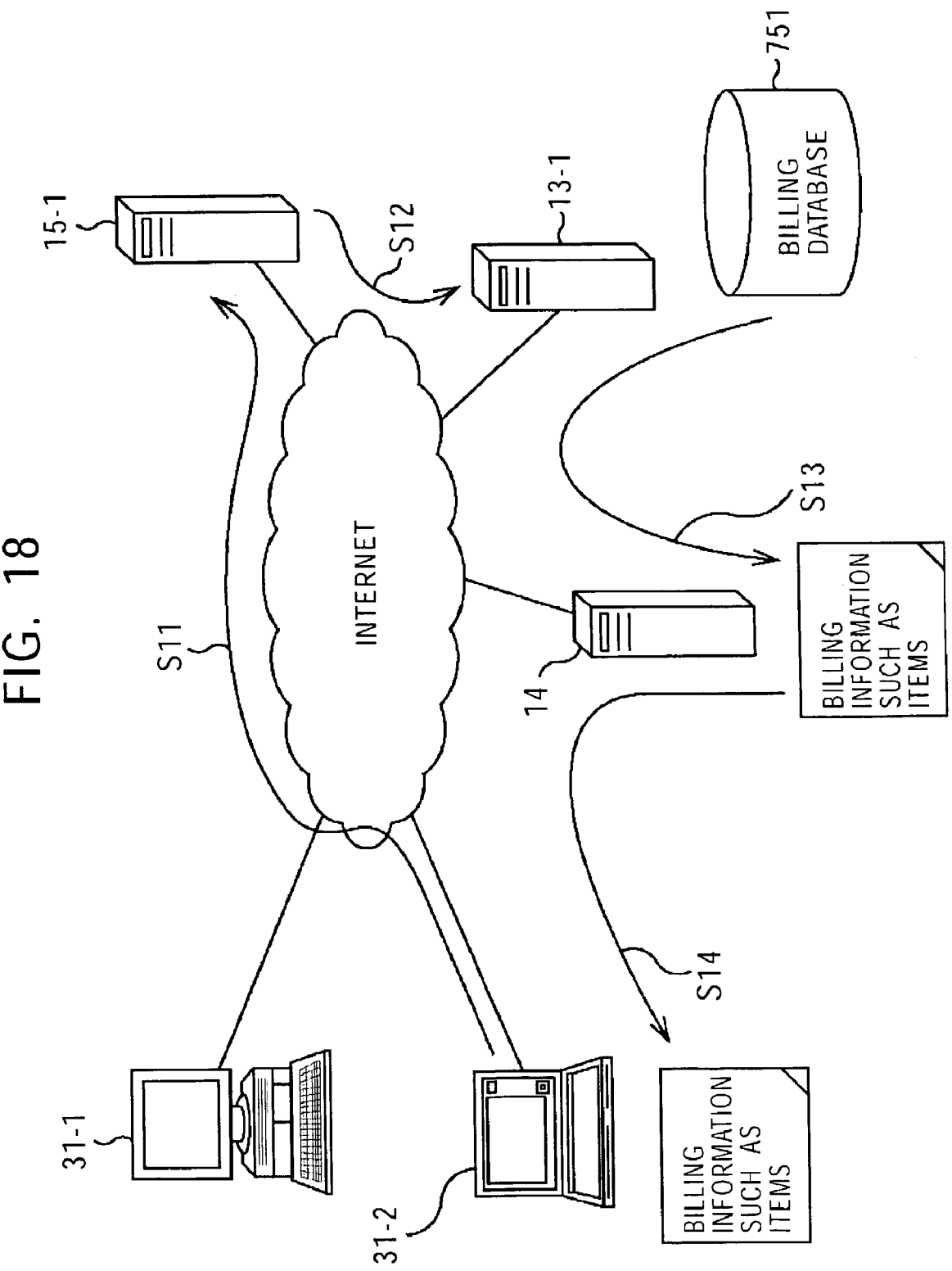
FIG. 18 is a diagram schematically illustrating procedures for managing billing information of a user.

Now, "film" is added to the list of possessions in the event of displaying the basic operation screen following obtaining the purchase completion notification for exhibiting the image in step S14 shown in FIG. 18, as described above.

Figure 21:
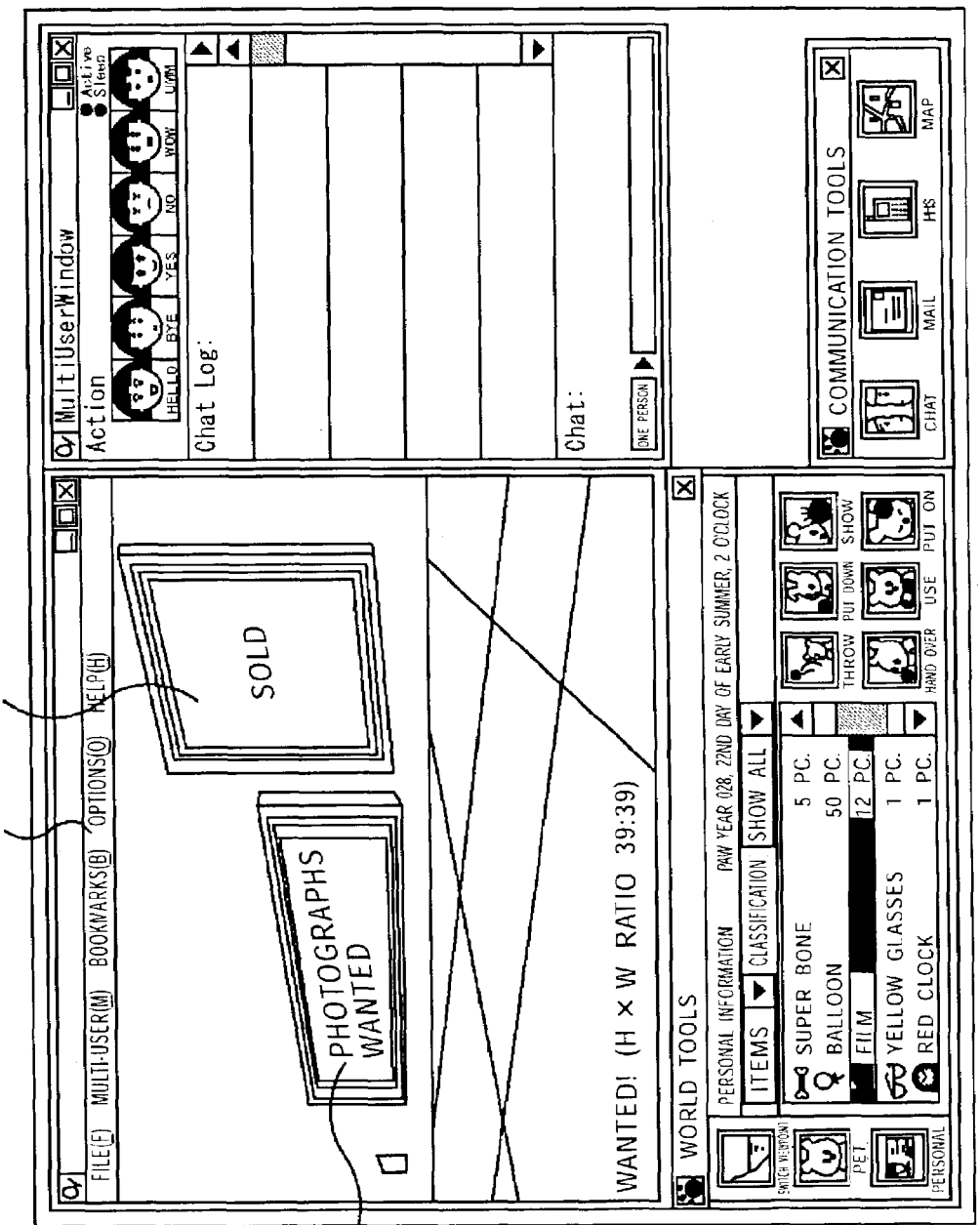
FIG. 21 is a diagram illustrating a an example of a display on the monitor of the client computer following that shown in FIG. 20.
Figure 22:
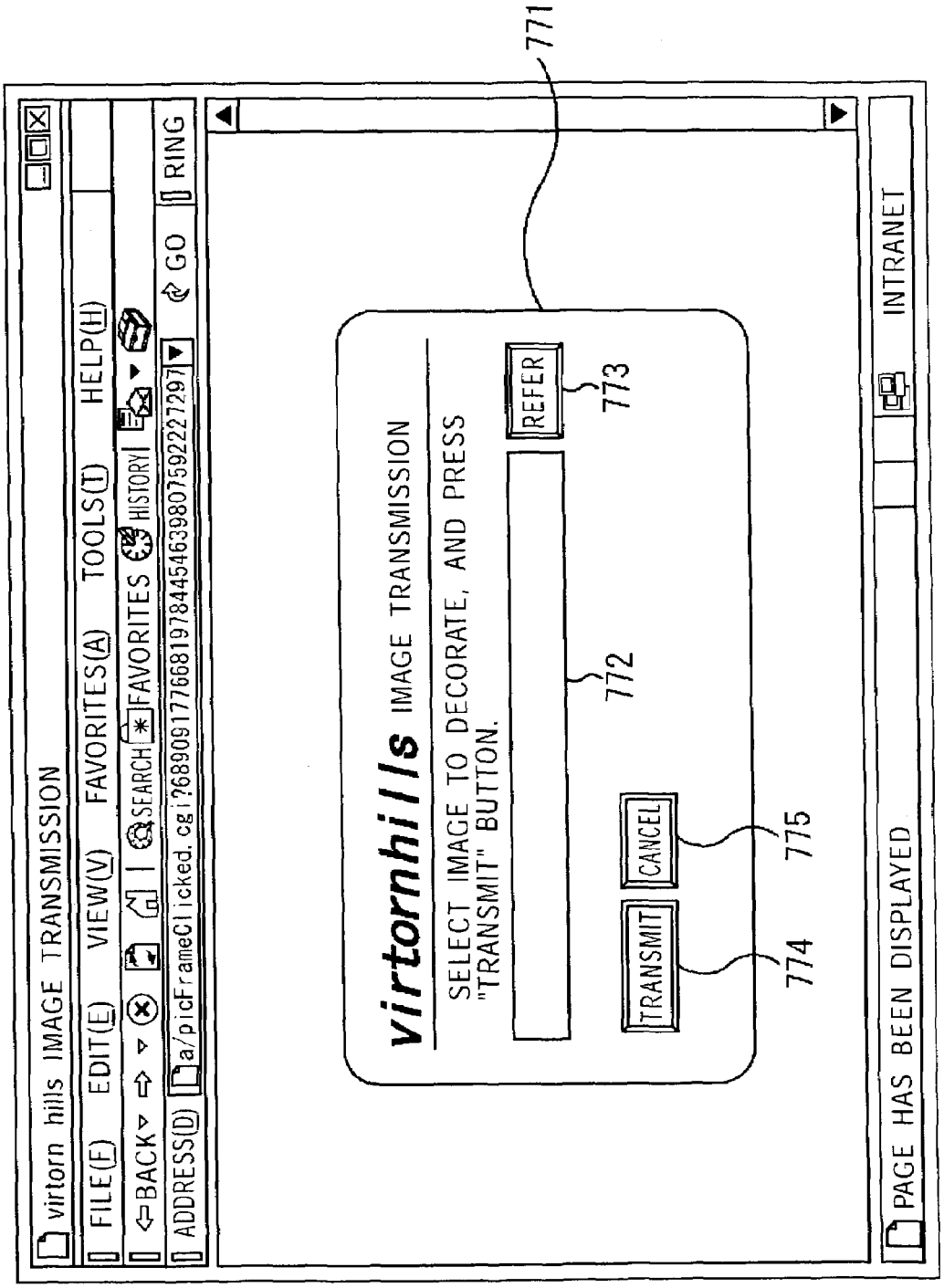
FIG. 22 is a diagram illustrating a an example of a display on the monitor of the client computer following that shown in FIG. 21.

In the basic operation screen shown in FIG. 20, upon the desired frame 761-1 being clicked, the basic operation screen shown in FIG. 21 comes up. Here, the landscape display area 601 in the basic operation screen shown in FIG. 21 shows the frame 761-1 with the word "sold", and subsequent users cannot purchase this frame. Then, the image transfer screen shown in FIG. 22 is displayed. In the event that a user who does not have "film" shown in the list of possession clicks on the frame 761-1 displayed in the landscape display area 601, this click is judged to be invalid, so nothing happens to the displayed contents. Note that the phrase "virtornhills" displayed in FIG. 22 and other drawings is a registered trademark.

Now, the image transfer screen 771 will be described. Reference numeral 772 denotes a display item displaying the storage location of the image file stored in the client computer 31. The reference button 773 is a button for displaying a "file selection" screen (not shown) for selecting the storage location of the image file to be displayed in the display item 772. The transfer button 774 is a button for uploading the image file selected at the display item 772 to the CP server. The cancel button 775 is a button for canceling the operations for exhibiting the image.

Figure 23:
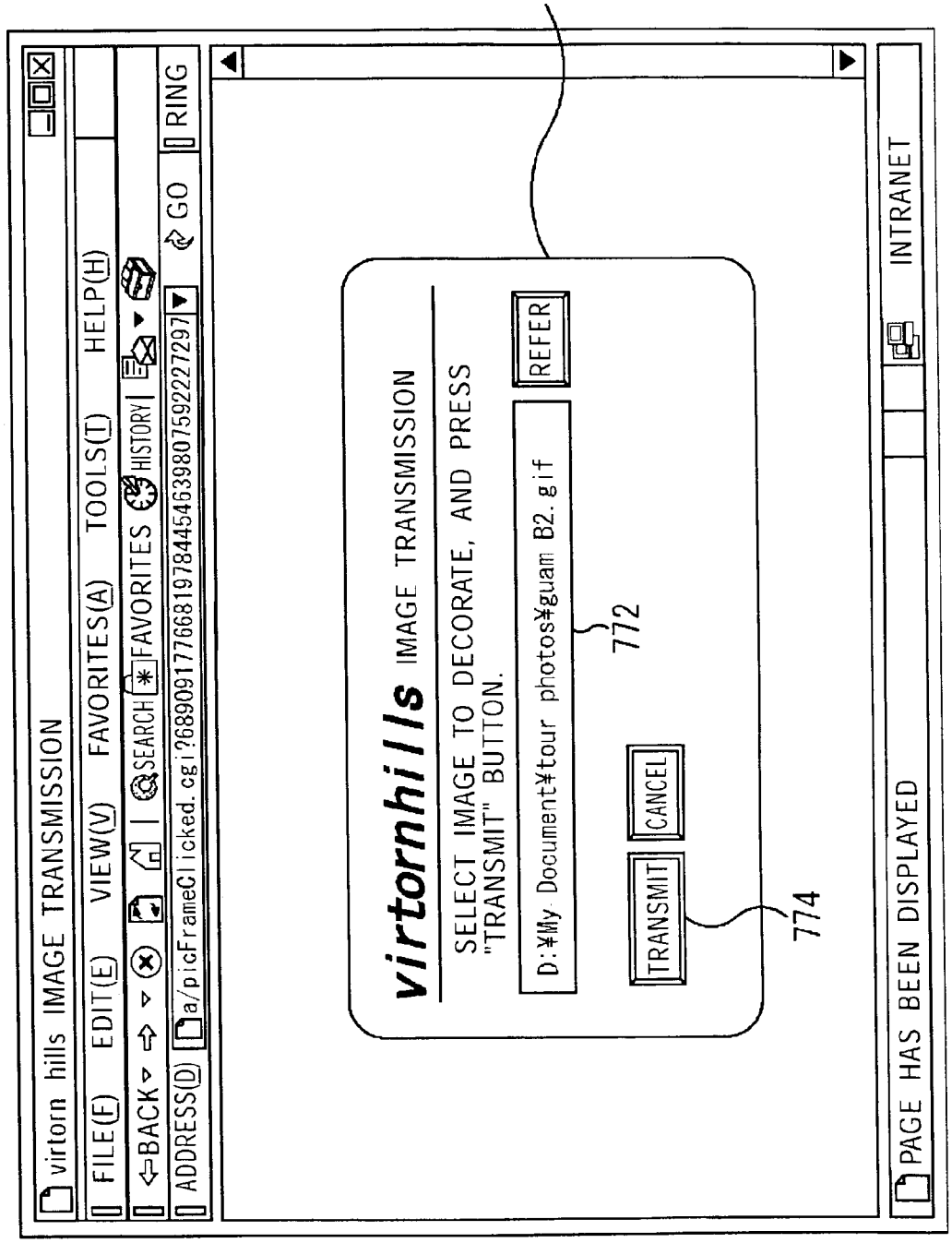
FIG. 23 is a diagram illustrating a an example of a display on the monitor of the client computer following that shown in FIG. 22.
Figure 24:
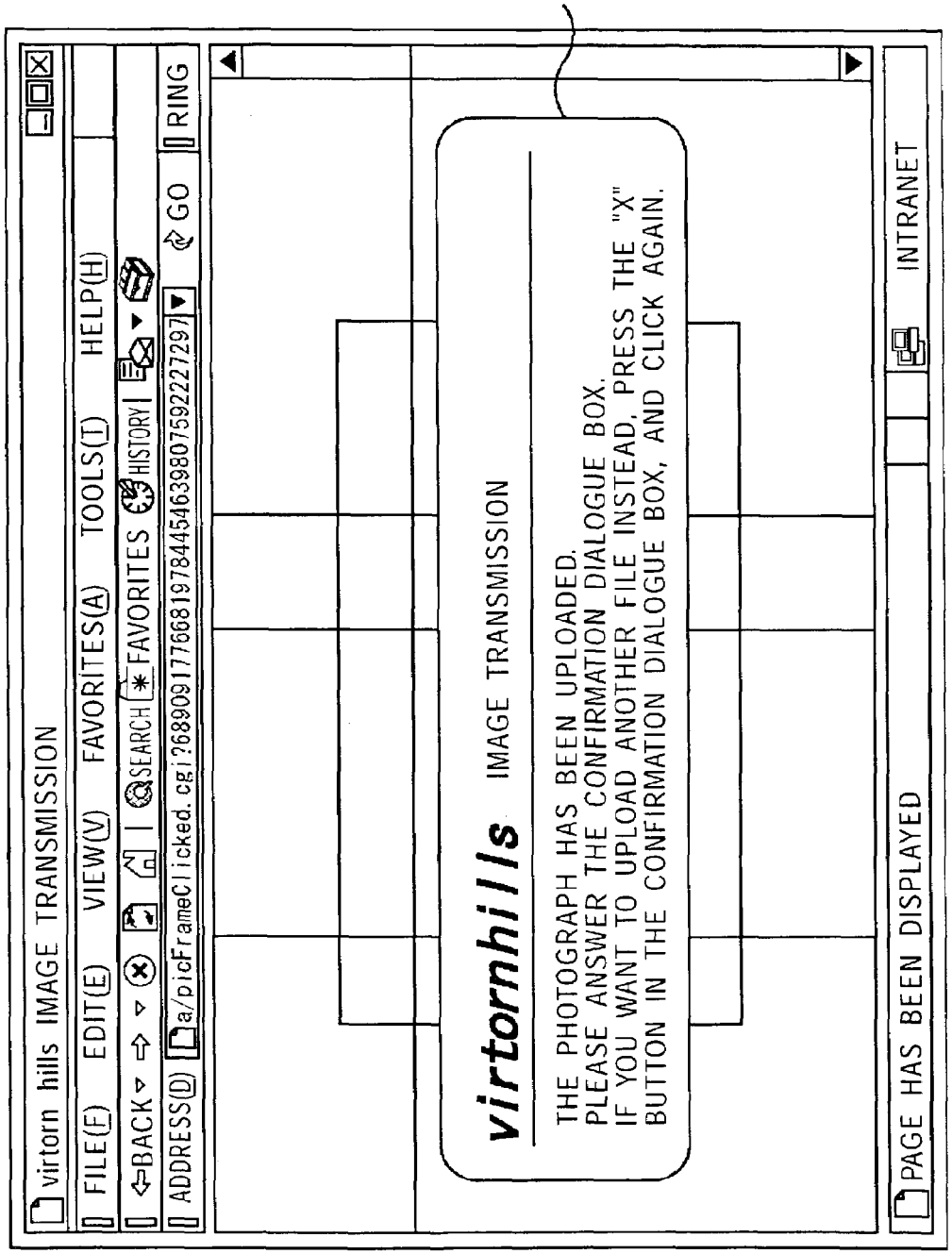
FIG. 24 is a diagram illustrating a an example of a display on the monitor of the client computer following that shown in FIG. 23.

As shown in FIG. 23, upon displaying the storage location of the image file in the display item 772 of the image transfer screen 771 and then pressing the transfer button 774, the image file stored at the storage location displayed in the display item 772 is uploaded to the CP server 14. Upon upload to the CP server 14 starting, the message screen 781 shown in FIG. 24 is displayed.

Now, the CP server 14 judges whether or not the capacity of the image file uploaded thereto is within the range permitted by the item for exhibiting the image which the user has purchased, and in the event that judgment is made that the capacity of the image file is within this capacity range, the uploaded image is exhibited in the frame 761-1. On the other hand, in the event that judgment is made that the capacity of the image file is not within this capacity range, a message to that effect is transmitted to the user, and upload of an image within the capacity range is requested.

Figure 25:
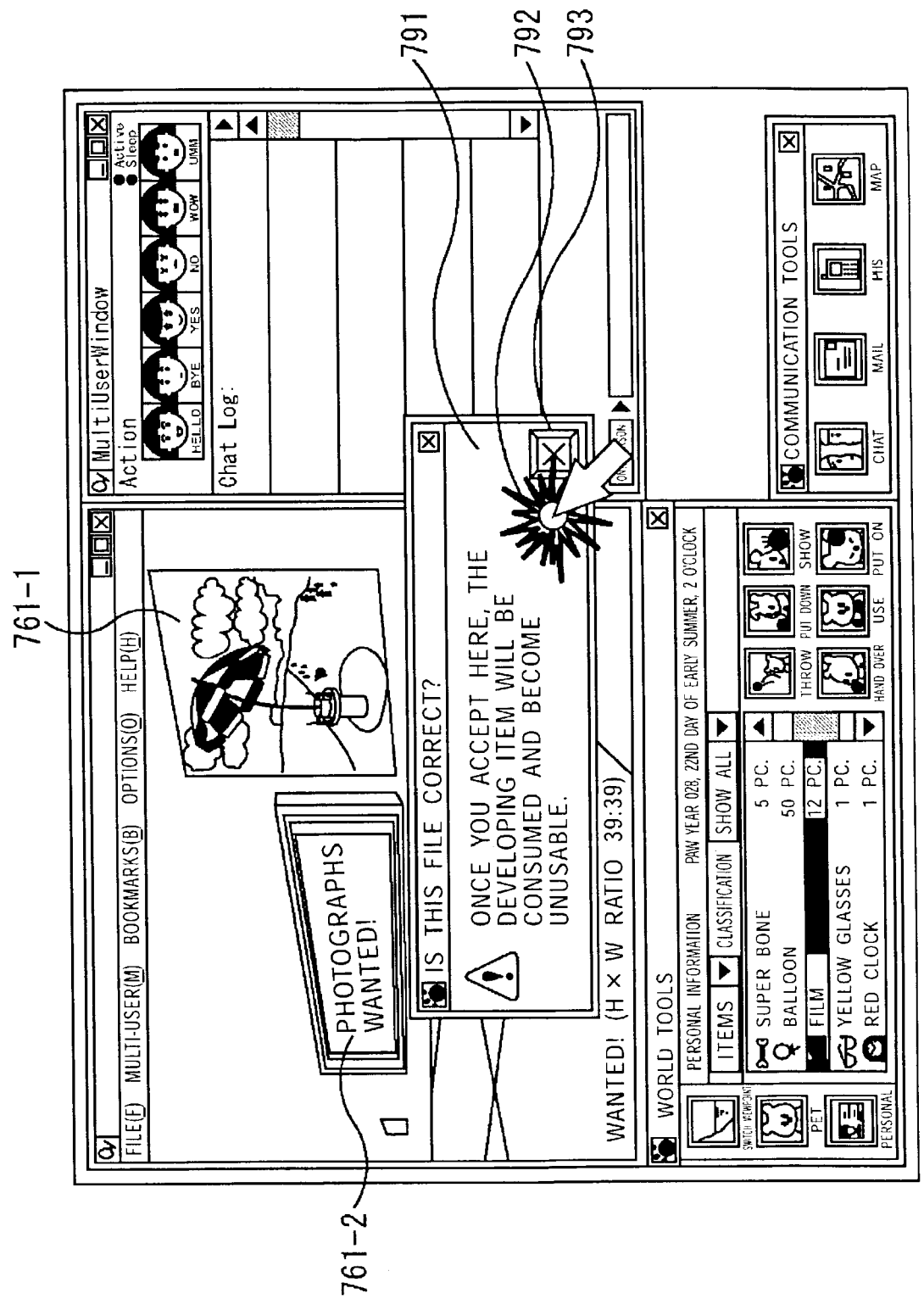
FIG. 25 is a diagram illustrating a an example of a display on the monitor of the client computer following that shown in FIG. 24.

Upon the uploaded image being exhibited in the frame 761-1, the confirmation screen 791 shown in FIG. 25 comes up. In the event that the user presses a circle button 792 meaning "OK", decision of the image exhibited in the frame 761-1 is finalized, and in the event that the user presses an X button 793 meaning "cancel", the operations for exhibiting the image are cancelled.

Figure 26:
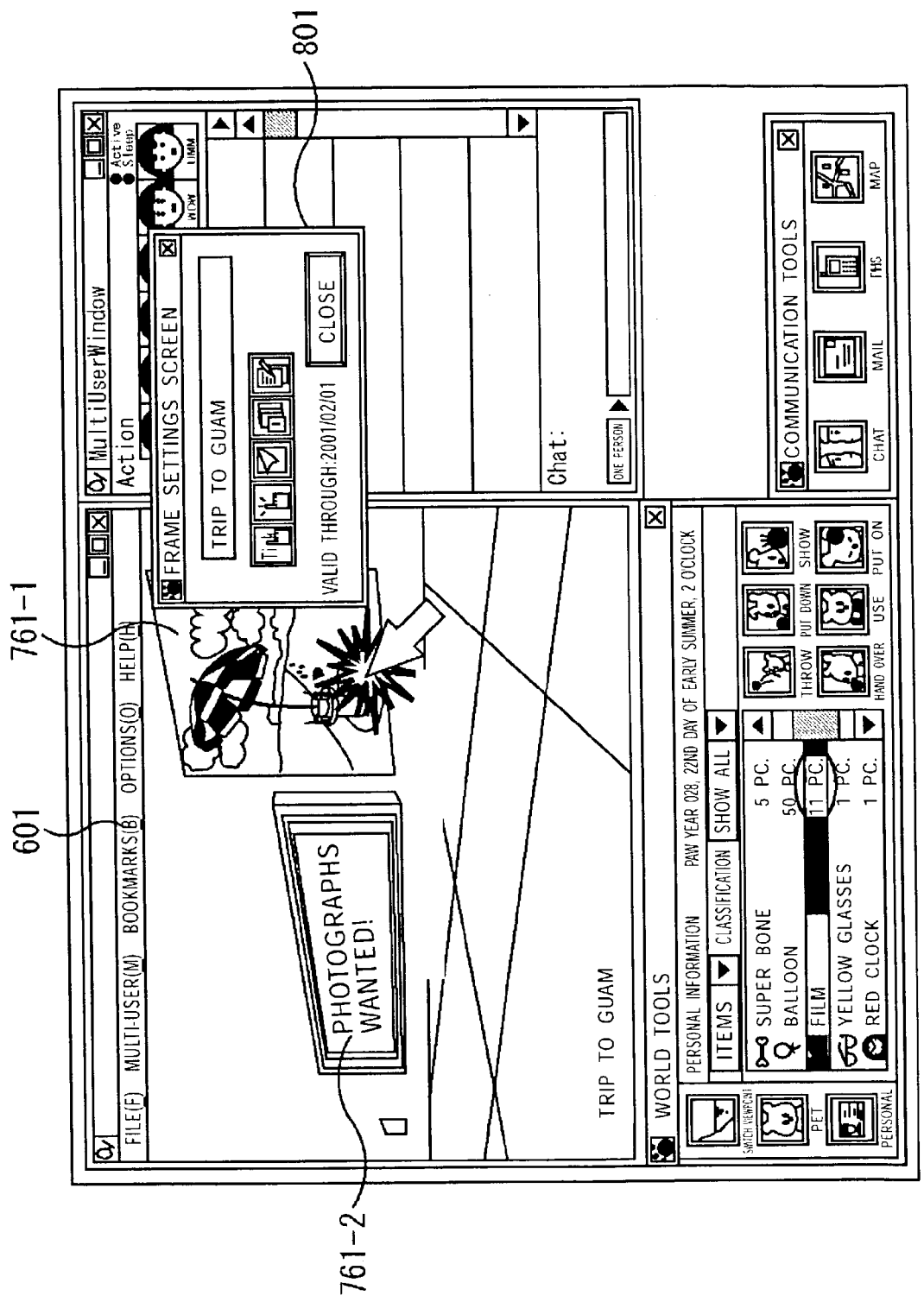
FIG. 26 is a diagram illustrating a an example of a display on the monitor of the client computer following that shown in FIG. 25.

Once decision of the image to exhibit is finalized, the frame 761-1 displayed in the landscape display area 601 in the basic operation screen shown in FIG. 26 displays the image which has been decided upon. The number of films displayed in the possession display area 614 in the basic operation screen shown in FIG. 26 is changed from twelve to eleven.

Next, in the event that the user clicks on the frame 761-1 displayed in the landscape display area 601 in the basic operation screen shown in FIG. 26, a frame settings screen 801 is displayed.

Figure 27:
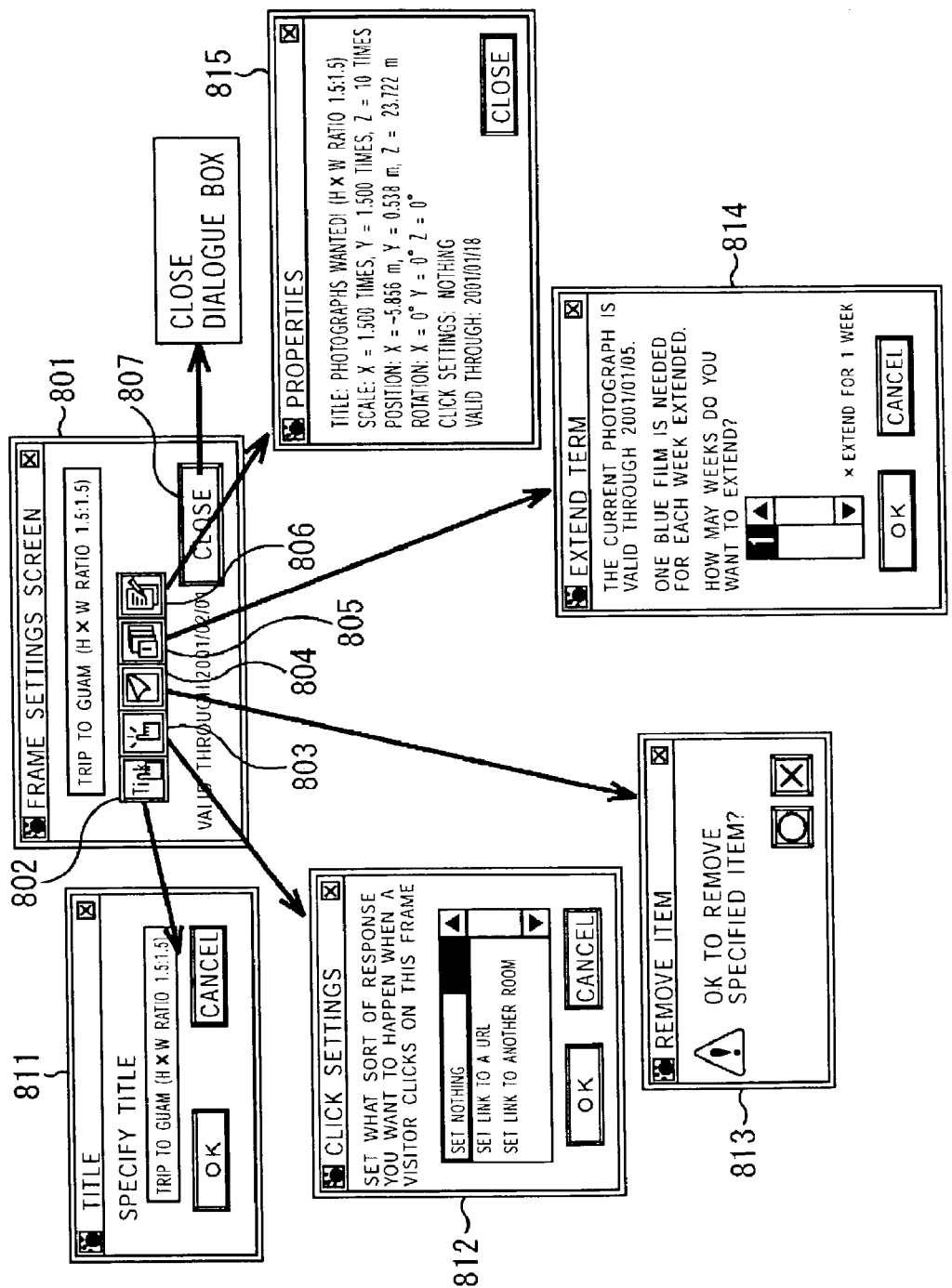
FIG. 27 is a diagram illustrating a screen for operating settings regarding a frame.

Now, the functions of the buttons in the frame settings screen 801 will be described with reference to FIG. 27. First, in the event that the user clicks on the title button 802 of the frame settings screen 801, a title changing screen 811 for changing the tile of the image displayed in the frame 761-1 comes up.

Upon the user inputting a new title in the input area of the title changing screen 811, and pressing the OK button, the title of the image displayed in the frame 761-1 is changed to the new title. Here, the title is displayed in a superimposed manner at the lower portion of the landscape display area 601 in response to a mouse over action (an action of placing the mouse directly over) on the image.

Also, in the event that the user clicks on the click settings button 803 of the frame settings screen 801, a click settings screen 812, for setting the processing which is executed in the event that the image displayed in the frame 761-1 is clicked by another user, is displayed. In the event that the user selects "do nothing" from the items displayed in the click settings list and presses the set button, no processing is executed in the event that the image is clicked by another user.

Also, in the event that the user selects "set URL link" from the items displayed in the click settings list and presses the set button, a screen for inputting a destination URL (not shown) is displayed, where the user inputs a URL and presses the OK button. Thus, in the event that another user clicks the image displayed in the frame 761-1, a Web page corresponding to this URL is displayed on the display screen of the client computer which the other user is operating.

Also, in the event that the user selects "set link to other room" from the items displayed in the click settings list and presses the set button, a screen for inputting information for identifying the room in the virtual space to link to (not shown) is displayed. The user inputs information for identifying the room in the virtual space from this input screen, and presses the OK button. Thus, in the event that another user clicks the image displayed in the frame 761-1, the room in the virtual space corresponding to the information for identifying the room is displayed on the display screen of the client computer 31 which the other user is operating.

Also, in the event that the user clicks on the image remove button 804 in the frame settings screen 801, an image remove screen 813 for removing the image displayed in the frame 761-1 from the frame 761-1. In the event that the user presses a circle button in the image remove screen 813 meaning "OK", the image exhibited in the frame 761-1 is removed from the frame 761-1, while clicking an "X" button closes the image remove screen 813.

Also, clicking on the period extension button 805 on the frame settings screen 801 brings up a period extension screen 814 for extending the period over which the image is displayed in the frame 761-1. Upon the user selecting the period of extension from the list of extension periods on the period extension screen 814 and pressing the OK button, the period over which the image is displayed in the frame 761-1 is extended by that period. With the present embodiment, one "film" (the item for exhibiting images) is required for each week the period is extended.

Also, in the event that the user clicks on the properties button 806 in the frame settings screen 801, the settings values 815 relating to the frame 761-1 are displayed. Examples of the settings values include the title of the image exhibited in the frame 761-1, image size information, image position information, image rotation information, click settings information, and image display period. Further, clicking the close button 807 in the frame settings screen 801 closes the frame settings screen 801. Thus, the user can exhibit an image in the frame 761-1.

Now, while the above-described arrangement in the embodiment has the billing information generated based on the usage fees set according to the image size, but the usage fees need not be set solely based on image size. For example, the usage fees may be set according to the position of the frame where the image is exhibited. More specifically, an arrangement may be made wherein the user is charged ¥200 per week for a position where the image is most readily viewed, ¥150 per week for a position where the image is not so readily viewed, and ¥100 per week for a position where the image is most difficult to view. That is to say, the more desirable the conditions for exhibiting the image are, the higher the usage fees are.

Figure 28:
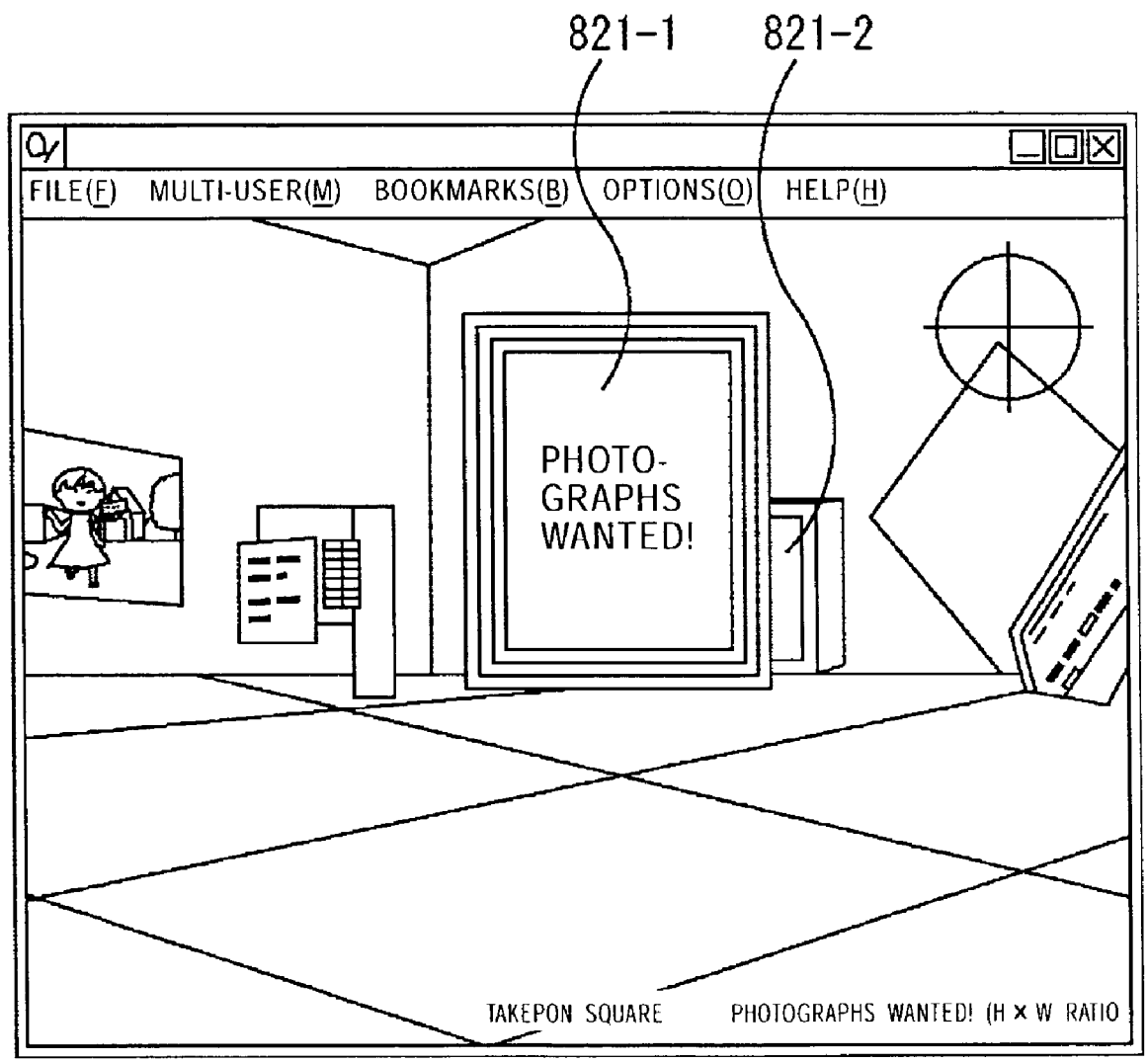
FIG. 28 is yet another diagram illustrating an example of a display on the monitor of the client computer.

This will be described in further detail with reference to FIG. 28. FIG. 28 illustrates images wherein the ease-of-viewing differences according to the position for exhibition. For example, the user may be charged ¥200 per week for an image 821-1 decorating the most readily viewed center position, and ¥100 per week for an image 821-2 decorating the position behind the image 821-1 which is not readily viewed.

Also, the usage fees may be set according to the period for exhibiting the image in the frame. Specifically, the usage fees for exhibiting the image may be set to ¥200 for one month, ¥150 for two weeks, and ¥100 for one week, for example. With this arrangement, the longer the period is, the higher the usage fees are, but the usage fees per week, for example, become increasingly inexpensive.

Further, the image size, the image position, and the period over which the image is exhibited, may be combined to set the usage charges. Thus, even small images can be charged high usage fees if exhibited in a readily viewable position, and even images exhibited in a position which is not readily viewable can be charged high usage fees if exhibited for a long time.

Moreover, with the present embodiment as described above, the settlement date of the usage charges is set at the day following the date on which the purchasing information and the credit card information is registered in the billing database, but the settlement date is by no means restricted to this. For example, the date following expiration of the period over which the image is exhibited may be used as the settlement date.

Figure 29:
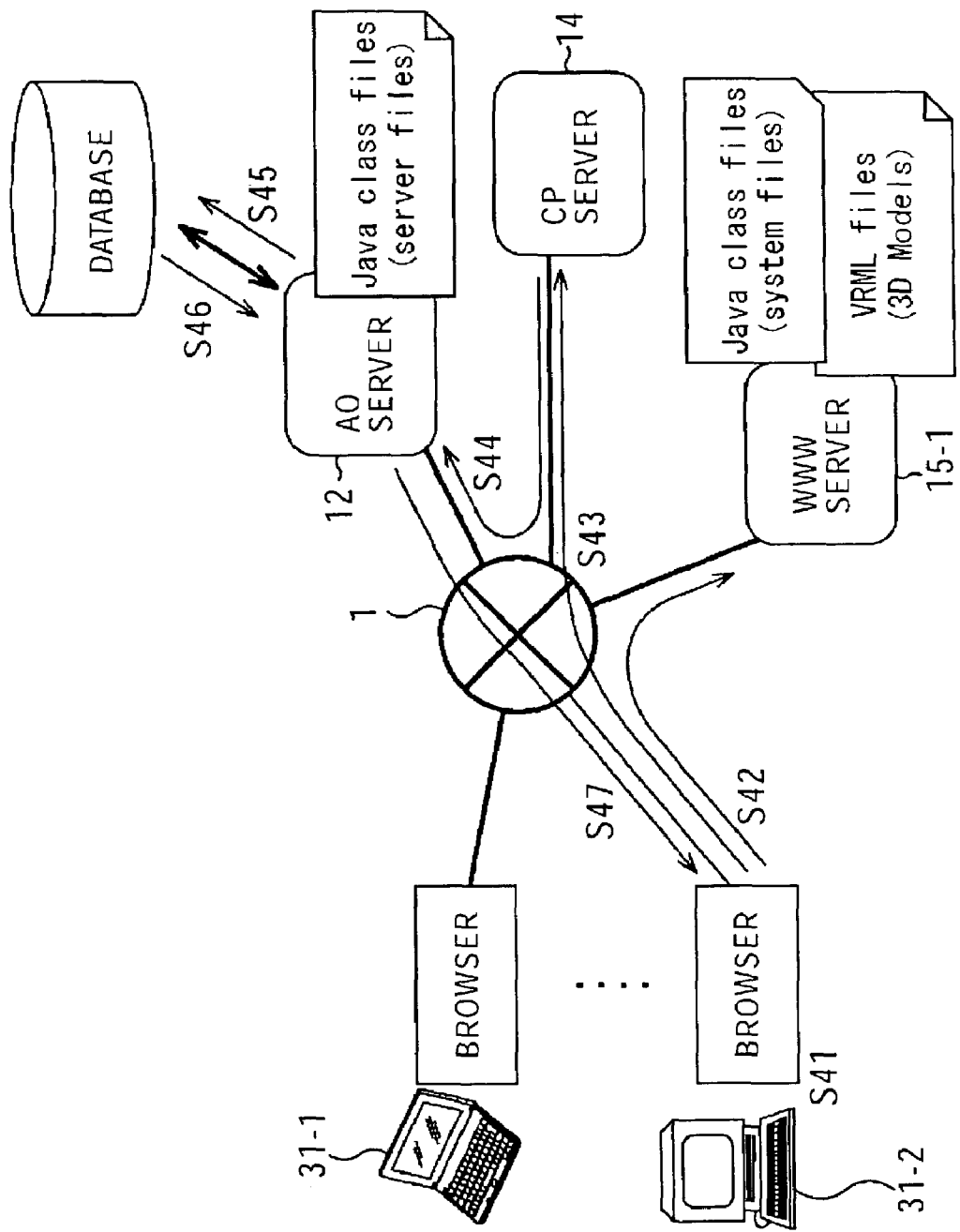
FIG. 29 is a diagram describing the processing for uploading an image from a client computer.

Next, the processing for the user to upload image data from the client computer 31-2 will be described with reference to FIGS. 29 and 30.

In step S41, the client computer 31-2 activates a predetermined browser program according to instructions from the user.

In step S42, the client computer 31-2 accesses the WWW server 15-1, and downloads data for the client computer from the WWW server 15-1.

In step S43, the client computer 31-2 connects to the CP server 14.

In step S44, the CP server 14 notifies the AO server that the client computer 31-2 has connected to the CP server 14.

In step S45, the AO server 12 searches whether or not image data to be displayed on the client computer 31-2 is stored, based on notification from the CP server 14.

In step S46, the AO server 12 reads out image data to be displayed on the client computer 31-2 which has been listed as a result of the search in step S45, and transmits this image data to the CP server 14. The CP server 14 transmits the image data received from the AO server 12 to the client computer 31-2.

In step S47, the client computer 31-2 displays the image data received from the CP server 14.

Figure 30:
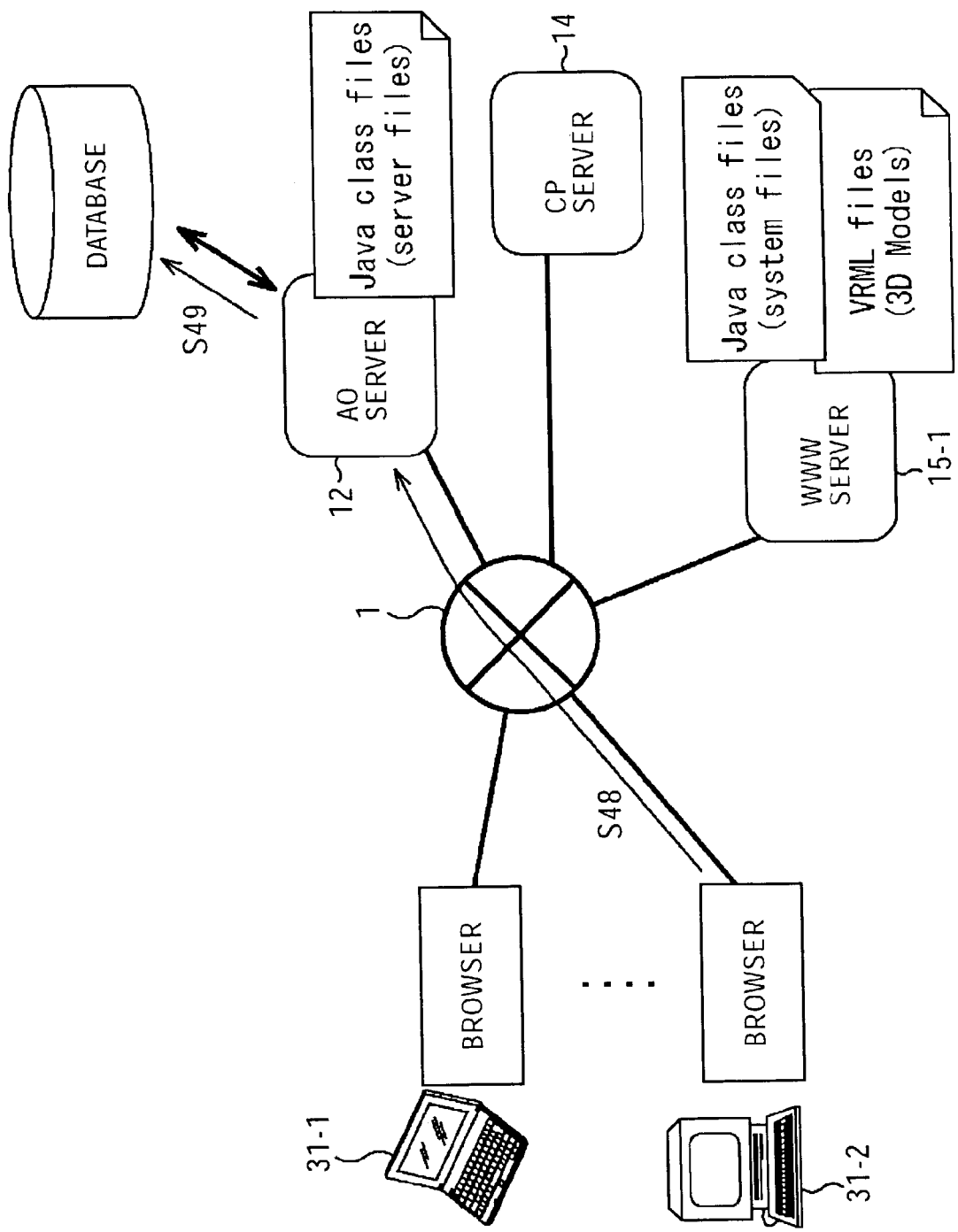
FIG. 30 is a continuation from FIG. 29.

Looking at FIG. 30 now, in step S48, upon the user instructing uploading of the image, the client computer 31-2 transmits the image data instructed by the user to the AO server 12 via the CP server 14.

In step S49, the AO server 12 receives the image data which the client computer 31-2 has transmitted in step S48 via the CP server 14, and stores this in the database.

Thus, the user can upload image data to the AO server 12 from the client computer 31.

Now, the processing for uploading image data from the client computer 31 which has been described with reference to FIGS. 29 and 30 will be described in detail with reference to the flowcharts in FIGS. 31 and 32.

Figure 31:
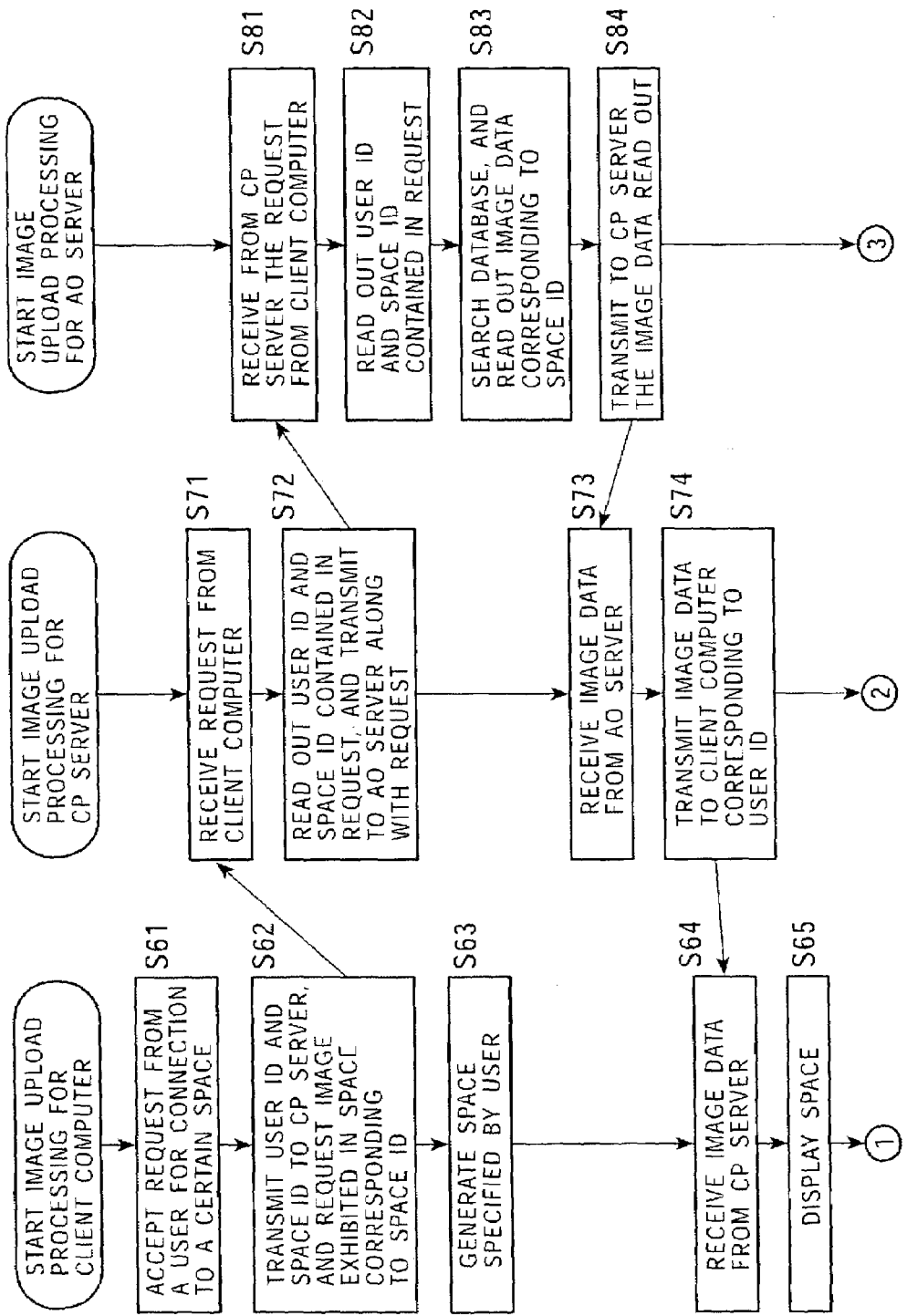
FIG. 31 is a flowchart describing the processing for uploading an image from a client computer to the shared virtual space.

In step S61 in FIG. 31, the CPU 501 of the client computer 31 accepts instructions from the user made from the input unit 506, to connect to a virtual space.

In step S62, the CPU 501 of the client computer 31 transmits the user ID and space ID to the CP server 14 from the communication unit 510, and requests an image to be exhibited in the space (an image already exhibited in the space) corresponding to the space ID.

In step S71, the CP server 14 receives the request from the client computer 31 via the communication unit 360.

In step S72, the CPU 351 of the CP server 14 reads out the user ID and space ID contained in the request received in step S71, and transmits the contents of the request from the client computer 31 (transmission request for an image to be displayed in the space corresponding to the space ID), the user ID, and space ID, to the AO server 12 from the communication unit 360.

In step S81, the AO server 12 receives from the CP server 14 the request contents, the user ID, and space ID from the client computer 31, via the communication unit 310.

In step S82, the CPU 301 of the AO server 12 reads out the user ID and space ID from the request contents, the user ID, and space ID, from the client computer 31.

In step S83, the CPU 310 of the AO server 12 searches the database within the storage unit 309, and reads out all image data to be displayed in the space corresponding to the space ID read out in step S82.

In step S84, the CPU 301 of the AO server 12 transmits the image data read out in step S83 to the CP server 14 from the communication unit 310.

Upon the CP server 14 receiving the image data from the AO server 12 via the communication unit 360 in step S73, in step S74 the CPU 351 of the CP server 14 transmits image data received in step S73 to the client computer 31 corresponding to the user ID from the communication unit 360.

In step S63, the CPU 501 of the client computer 31 computes the three-dimensional shared virtual space to which communication is going to be attempted. Also, the CPU 501 accordingly calls up necessary functions from the program.

In step S64, the client computer 31 receives the image data from the CP server 14 via the communication unit 510.

In step S65, the CPU 501 of the client computer 31 displays the virtual space wherein the image data received in step S64 has been fit in the three-dimensional shared virtual space computed in step S63, on a predetermined position on the monitor 308 (in the landscape display area 601).

Thus, the user can view the desired shared virtual space (including the images decorating the shared virtual space).

Figure 32:
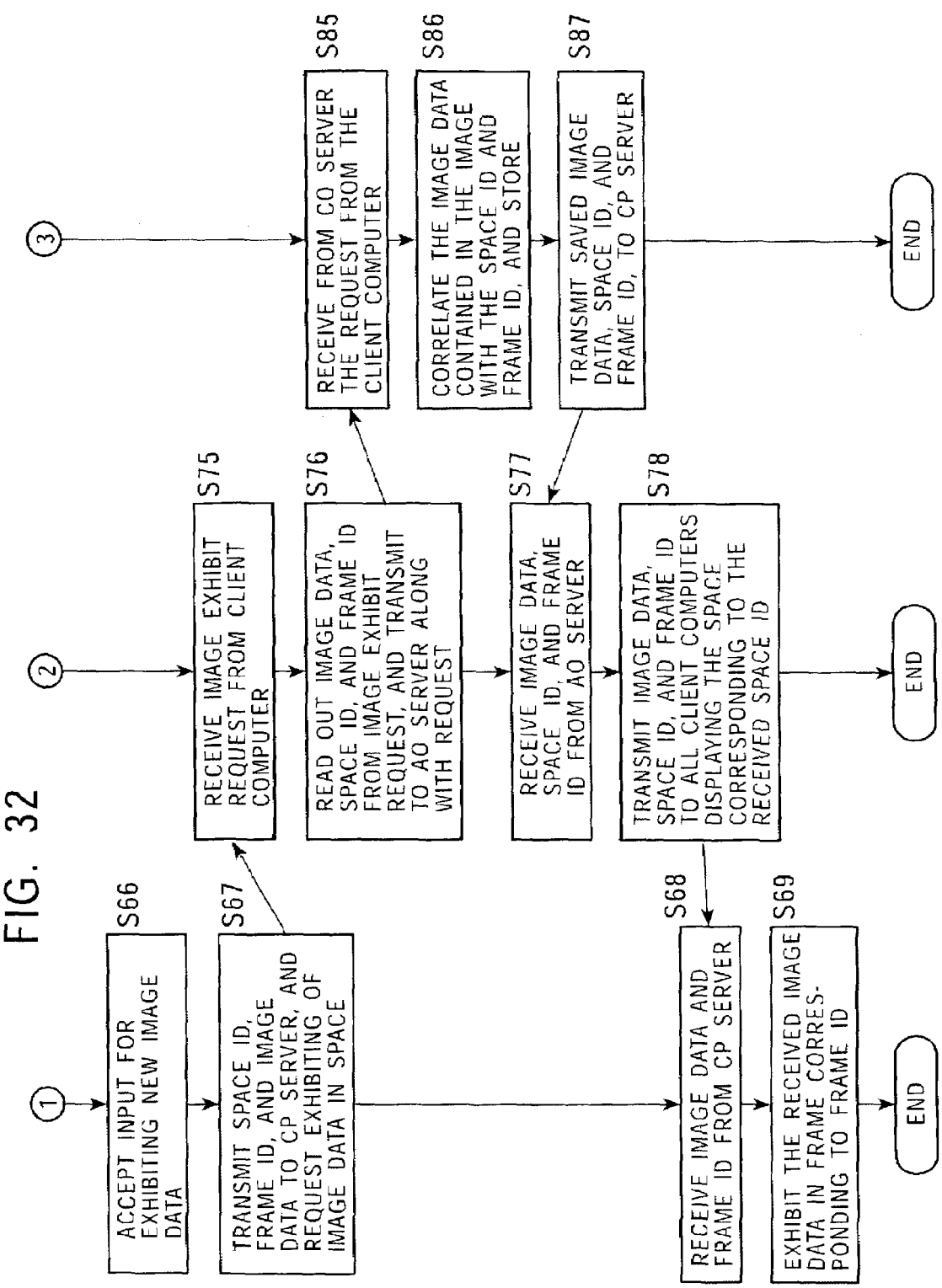
FIG. 32 is a continuation from FIG. 31.

Moving on to FIG. 32, in step S66, the CPU 501 of the client computer 31 accepts an instruction from the user via the input unit 506 to exhibit new image data in the shared virtual space.

In step S67, the CPU 501 of the client computer 31 transmits the space ID of the space to exhibit the image, the frame ID of the frame to exhibit the image, and the image data of the image to exhibit, to the CP server 14 from the communication unit 510, while requesting exhibition of the image in the shared virtual space.

In step S75, the CP server 14 receives the request to display the image in the shared virtual space, containing the space ID, frame ID, and image data, from the client computer 31 via the communication unit 360.

In step S76, the CPU 351 of the CP server 14 reads out the space ID, frame ID, and image data, from the request to display the image in the shared virtual space, and transmits the request contents (request to display the image in the shared virtual space), the space ID, frame ID, and image data, from the client computer 31 to the AO server 12 via the communication unit 360.

In step S85, the AO server 12 receives from the CP server 14 the request contents, space ID, frame ID, and image data from the client computer 31, via the communication unit 310.

In step S86, the CPU 301 of the AO server 12 stores the image data received in step S85 in the database within the storage unit 309, in a manner corresponded with the space ID and frame ID received along with the image data.

In step S87, the CPU 301 of the AO server transmits the image data, space ID, and frame ID, stored in the storage unit 309 in step S86, to the CP server 14 via the communication unit 310.

In step S77, the CP server 14 receives the image data, space ID, and frame ID from the AO server 12 via the communication unit 360.

In step S78, the CPU 351 of the CP server 14 transmits the image data, space ID, and frame ID to all client computers 31 displaying the space corresponding to the space ID received in step S77, via the communication unit 360.

In step S68, the client computer 31 receives the image data, space ID, and frame ID, from the CP server 14 via the communication unit 510.

In step S69, the CPU 501 of the client computer 31 displays the image data received in step S68 in the frame corresponding to the frame ID received along with the image data.

Thus, the user can use the client computer 31 to exhibit an image in the virtual space.

Now, with the communication system to which the present invention is applied, the user can exhibit images in the virtual space with portable devices such as a cellular telephone 53, portable terminal 54, digital camera 55, or video camera 56. Note however, that the portable device must have functions for connecting to a network and exchanging e-mail.

Next, the overview of the processing up to uploading image data from a portable device will be described with reference to FIG. 33.

Figure 33:
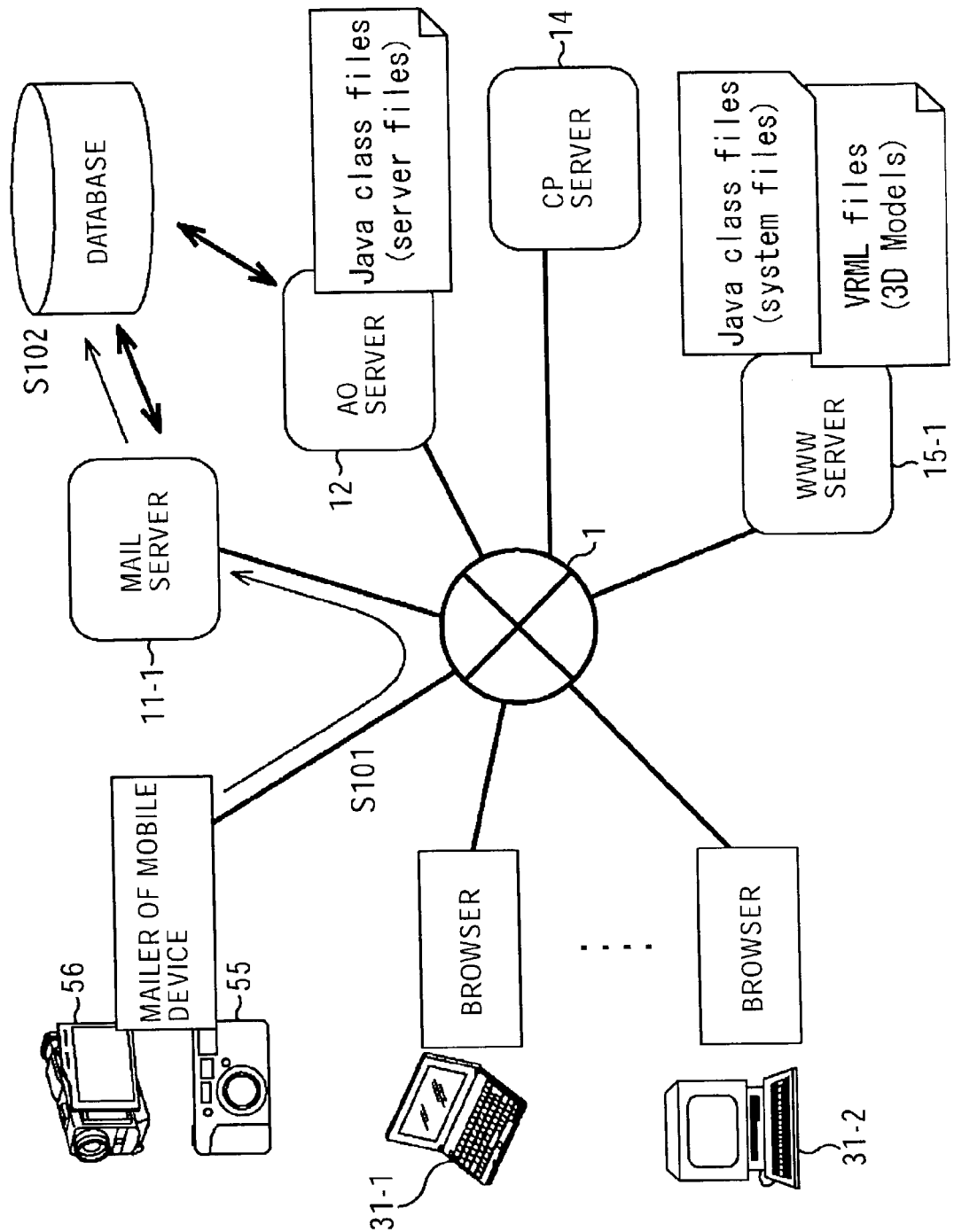
FIG. 33 is a diagram describing the processing for uploading an image from a cellular telephone.

In step S101 in FIG. 33, the portable device (a digital camera 55 or video camera 56 in FIG. 33) activates a mailer (client software for exchanging e-mail), attaches image data to text describing the user ID and space ID according to a predetermined format, and transmits this to the mail server 11-1. In step S102, the mail server 11-1 stores the received image data in the database of the AO server 12. Thus, the image data is uploaded from the portable device to the AO server 12.

Figure 34:
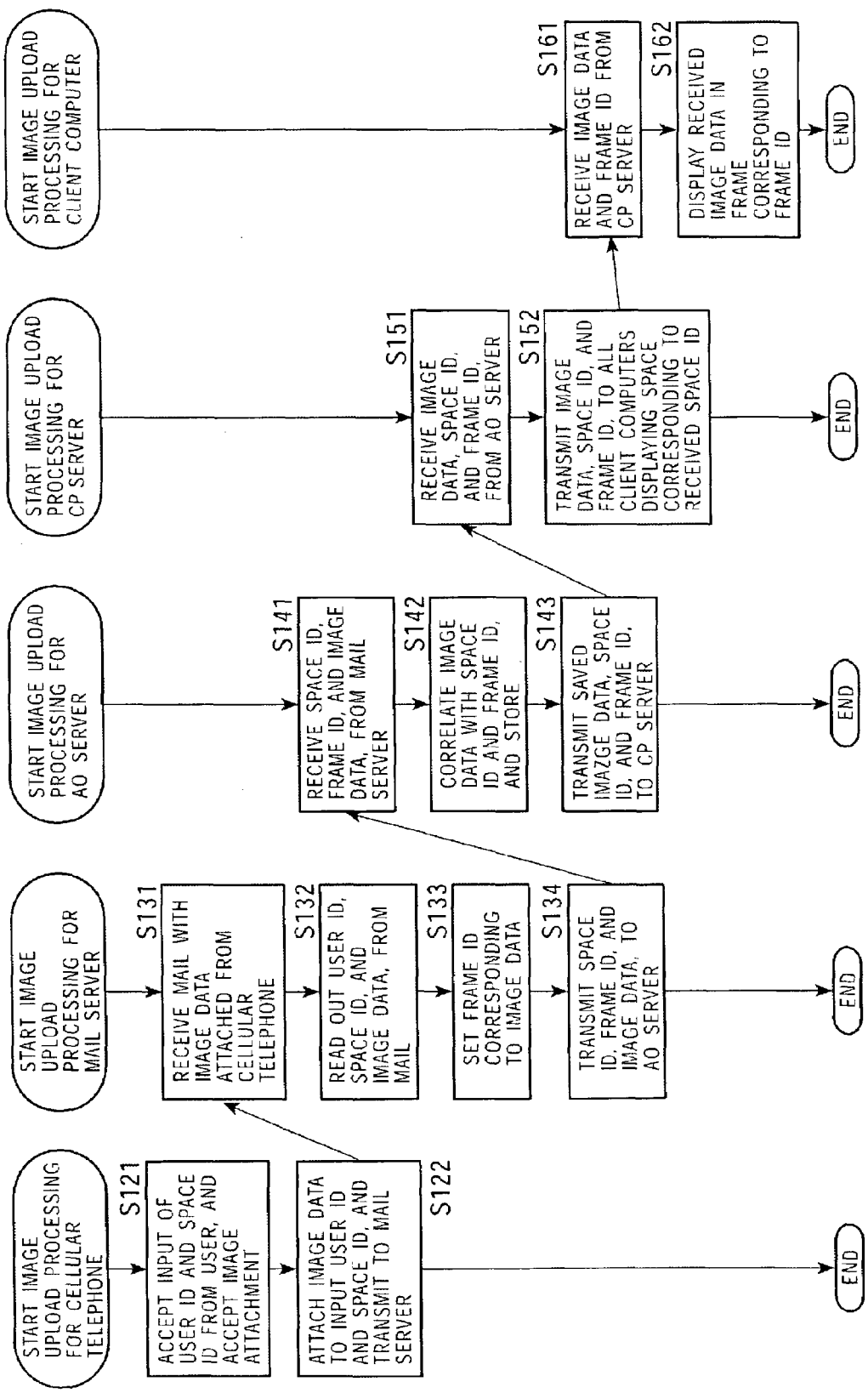
FIG. 34 is a flowchart describing the processing for uploading an image from a cellular telephone to the shared virtual space via electronic mail.

Next, the processing up to exhibiting the image in the shared virtual space from the portable device will be described in detail with reference to FIG. 34. Note that while the cellular telephone 53 is used for description of the portable device, the following description applies to other portable devices as well. Also, in the following description, an example is described wherein an image is exhibited in an individual space which the user owns.

Figure 35:
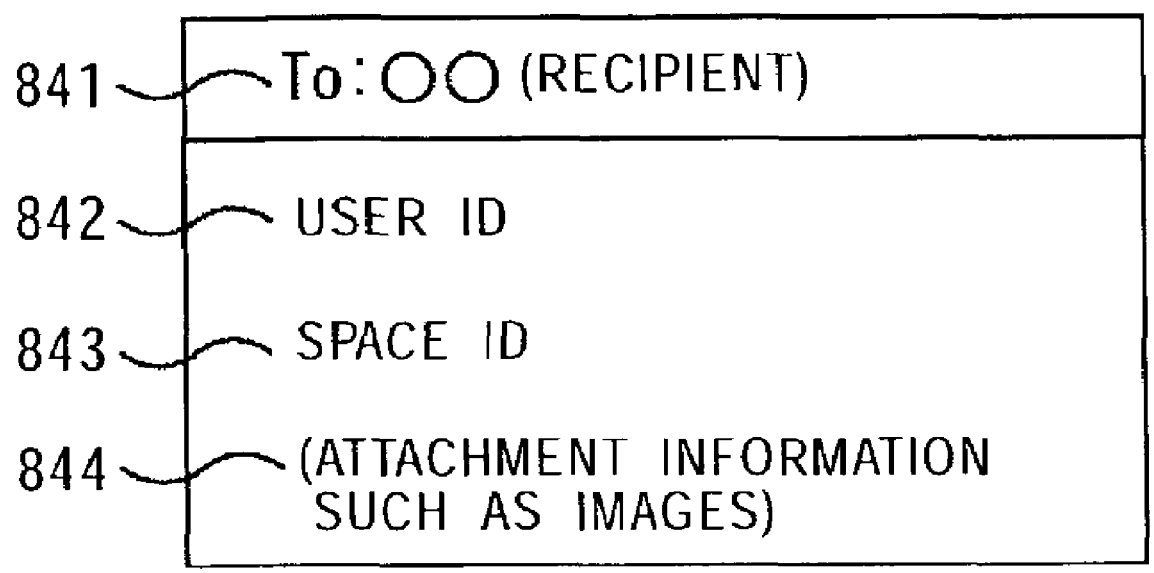
FIG. 35 is a diagram illustrating an example of a screen displayed on the liquid crystal display of the cellular telephone in step S121 in FIG. 34.

In step S121, the main control unit 200 of the cellular telephone 53 activates the mailer according to instructions from the user, and accepts input of the user ID and space ID, and attachment of the image, from the user, following a predetermined format. FIG. 35 illustrates the format of the text input by the user. In FIG. 35, the addressee of the mail, i.e., the mail address of the mail server 11-1 is input at the top. Below that are input the user ID 842, and space ID 843, on different lines. Also, upon the user attaching image data to the mail by inputting predetermined operations from the operating keys 108 and the jog dial 111, the attached image data name 844 is displayed at the bottom, as shown in FIG. 35.

In the event that the user desires to exhibit an image in an individual space which the user owns, for example, the user inputs the space ID of the individual space of the user. Thus, the image is exhibited in the predetermined position in the individual space which the user owns. In the event that an image is uploaded to the individual space of the user, a new frame is generated, and the image is exhibited in the generated frame. Also, the position for exhibiting the image uploaded from the portable device is initially at a predetermined position (wall) specified within the space beforehand, but the user can change the position and space for exhibiting the uploaded image when logging into the shared virtual space at a later time.

Now, the space ID which the user inputs can also be set as follows, for example.

Space ID: (Wall No.).(Room No.)

In the above example, the wall No. for specifying the wall to decorate with the image, and the room No. specifying the room (space) to decorate with the image are separated by a period. In the event that the user applies the image to a space belonging to the user, the user inputs the room No. of the space belonging to the user in the (Room No.) portion. Also, in the event of specifying which wall in the room to decorate with the image, the user inputs the wall No. of the wall to decorate with the image in the (Wall No.) portion. Thus, the user can exhibit an image on a desired wall in a space belonging to the user, within the shared virtual space.

Upon the user inputting the user ID and space ID following the predetermined format such as shown in FIG. 35 and attaching an image, and then performing operations for transmitting the mail, from the operating keys 108 (and/or jog dial 111), the flow proceeds to step S122, and the main control unit 200 of the cellular telephone 53 transmits the text data input in step S121 (including the user ID and space ID), and the attached image data, to the mail server 11-1 from the antenna 104.

In step S131, the mail server 11-1 receives the mail with the image data attached thereto from the cellular telephone 53, via the communication-unit 410.

In step S132, the CPU 401 of the mail server 11-1 reads out the user ID and space ID from the text data of the mail received in step S131, and reads out the image data attached to the mail.

In step S133, the mail server 11-1 sets the frame corresponding to the image data read out in the step S132, and generates a frame ID. Subsequently, the frame ID is always attached to this image data, and the image data is identified and managed by this frame ID.

In step S134, the mail server 11-1 transmits the space ID and image data received from the cellular telephone 53, and the generated frame ID, to the AO server 12.

In step S141, the AO server 12 receives the space ID, frame ID, and image data, from the mail server 11-1, via the communication unit 310.

In step S142, the CPU 301 of the AO server 12 stores the image data and frame ID received in step S141 in the database within the storage unit 309, correlated with the space ID.

In step S143, the CPU 301 of the AO server 12 transmits the image data, space ID, and frame ID, stored in the storage unit 309 in step S142, to the CP server 14, from the communication unit 310.

In step S151, the CP server 14 receives the image data, space ID, and frame ID, from the AO server 12 via the communication unit 360.

In step S152, the CPU 351 of the CP server 14 transmits from the communication unit 360 the image data, space ID, and frame ID received in step S151, to all client computers 31 displaying the space corresponding to the space ID received in step S151.

In step S161, the client computer 31 receives the image data, space ID, and frame ID from the CP server 14 via the communication unit 510.

In step S162, the CPU 501 of the client computer 31 displays the image data received in step S161 in the frame corresponding to the frame ID received along with the image data.

Thus, the user can exhibit the image in the virtual space using the cellular telephone 53. In this case, unlike the case of uploading an image from the client computer 31, there is no need to download information relating to the three-dimensional shared virtual space to the portable terminal beforehand, and accordingly, the image can be easily uploaded.

While the above description involves the frame ID being set in the mail server 11-1 (step S133), the frame ID may be set at the cellular telephone 53 instead.

Also, while the above description has been made regarding an example wherein an image is exhibited in space belonging to a user, images may be exhibited in shared space, as well. However, in the event of exhibiting an image in shared space, the image must be exhibited in frames set in the shared space beforehand (e.g., the frames 761-1 and 761-2 in FIG. 20). Accordingly, the user must transmit to the mail server 11-1 the frame ID of the frame in which the image is to be exhibited, along with the transmission of user ID, space ID, and image data, in step S122. In the event that another image is already exhibited in the frame which the user desired to exhibit the image, an error message is transmitted from the mail server 11-1 to the cellular telephone 53.

Also, though not noted in the flowcharts described above, at the point that the image is saved at the AO server 12, the AO server 12 reduces the number of films which the user possess by one. That is to say, the next time the user logs into the shared virtual space, the number of films displayed in the possession display area 614 is one less.

Also, in the above-described arrangement, the image transmitted from the cellular telephone 53 is automatically exhibited in the individual space of the user, but an arrangement may be made wherein the image transmitted from the cellular telephone 53 is exhibited at the time of the user later logging into the shared virtual space.

Now, while the above description has been made with regard to an arrangement wherein the image data is uploaded using e-mail, an arrangement may be made wherein the image data is uploaded to the AO server 12 from a cellular telephone having a Web browser via the WWW server 15-1.

Figure 36:
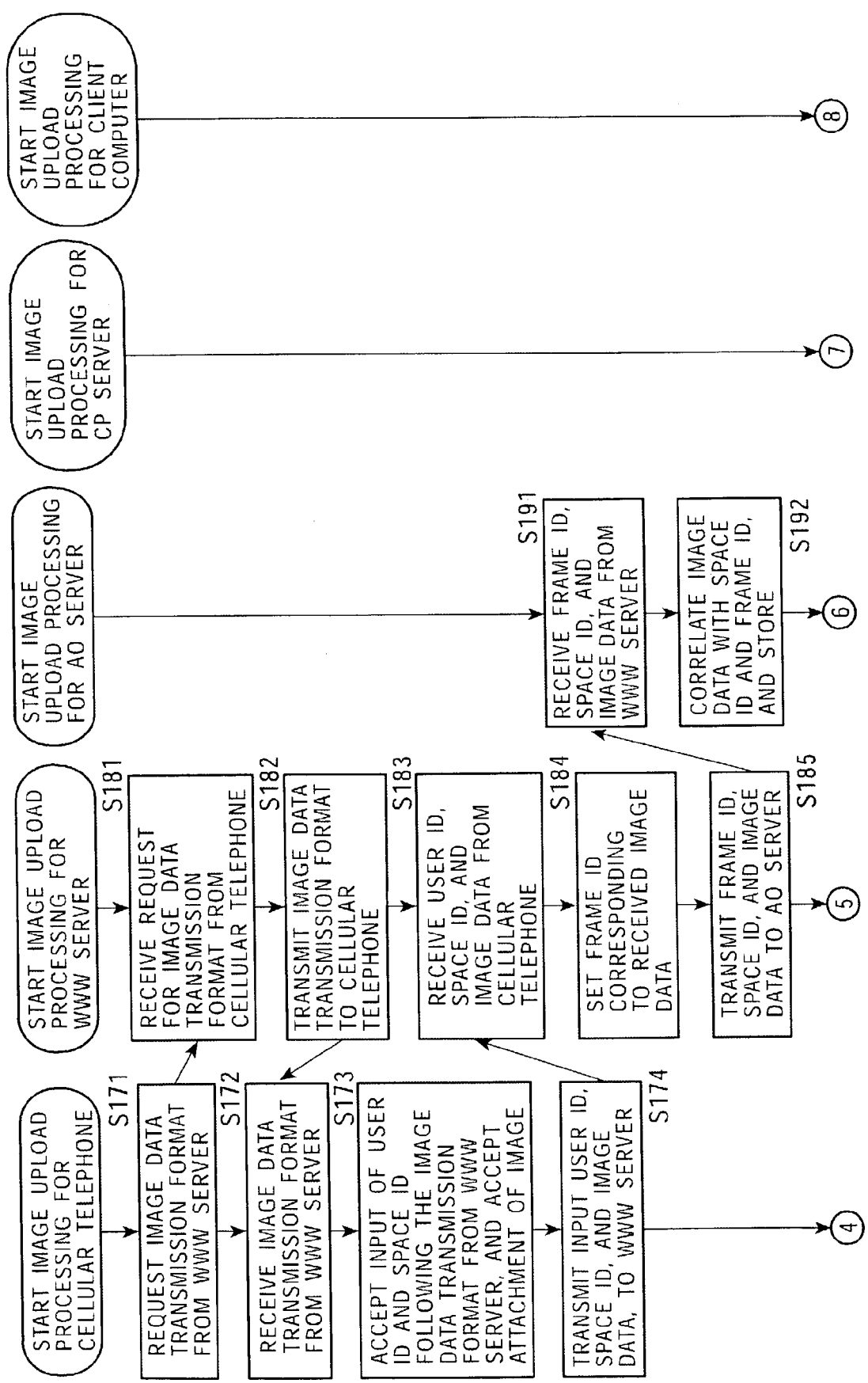
FIG. 36 is a flowchart describing the processing for uploading an image from a cellular telephone to the shared virtual space via a WWW server.

Next, the processing for uploading image data from a cellular telephone 53 via the WWW server 15-1 will be described with reference to the flowchart shown in FIG. 36.

In step S171, the main control unit 200 of the cellular telephone 53 receives predetermined operation input by the user with the operating keys 108 and/or jog dial 111, and requests the WWW server 15-1 to transmit a predetermined Web page for image data transmission.

In step S181, the WWW server 15-1 receives the Web page transmission request for image data transmission from the cellular telephone 53, via the communication unit 460.

In step S182, the CPU 451 of the WWW server 15-1 transmits the predetermined Web page for image data transmission to the cellular telephone 53 from the communication unit 460. Note that this Web page may be described in compact HTML.

In step S172, the cellular telephone 53 receives the predetermine Web page for image data transmission through the antenna 104.

Figure 38A:
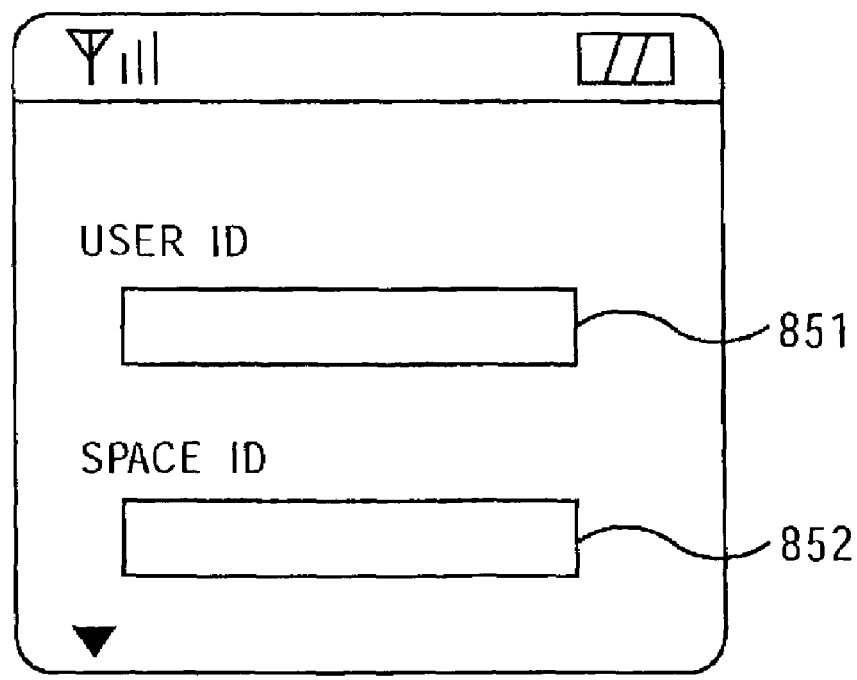
FIGS. 38A and 38B are diagrams illustrating an example of a screen displayed on the liquid crystal display of the cellular telephone in step S173 in FIG. 36.
Figure 38B:
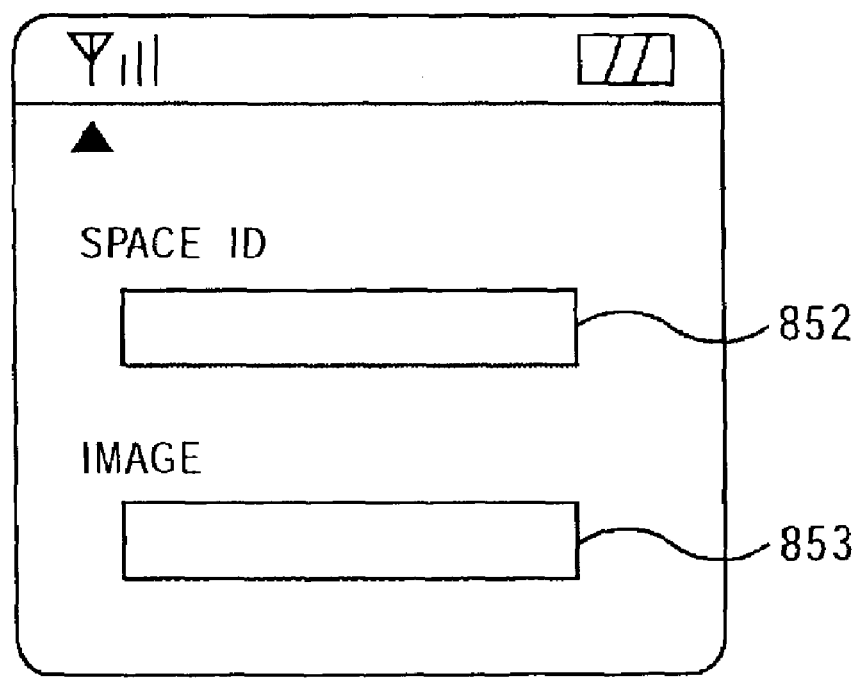

In step S173, the main control unit 200 of the cellular telephone 53 displays the received predetermine Web page for image data transmission on the liquid crystal display 107, and accepts input of user ID and space ID from the user, while also accepting selection of the image to be attached. FIGS. 38A and 38B shown an example of the image data transmission Web page displayed on the liquid crystal display 107.

In FIG. 38A, a user ID input space 851 for accepting input of the user ID and a space ID input space 852 for accepting input of the space ID are displayed on the liquid crystal display 107. In the state shown in FIG. 38A, in the event that the user rotates the jog dial 111 in the predetermined downward direction, the display of the liquid crystal display 107 scrolls upwards, until the screen shown in FIG. 38B is displayed on the liquid crystal display 107. In FIG. 38B, an attached image input space 853 where the name of the image to be attached is displayed, is displayed below the space ID input space 852.

The user operates the operating keys 108 and/or the jog dial 111 to input the user ID and space ID in the user ID input space 851 and the space ID input space 852, respectively, selects the image data to attach, and then inputs transmission instructions by predetermined operations, whereby the flow proceeds to step S174.

In step S174, the main control unit 200 of the cellular telephone 53 transmits the user ID and space ID input by the user and the image data selected by the user in step S173, to the WWW server 15-1 via the antenna 104.

In step S183, the WWW server 15-1 receives the user ID, space ID, and image data from the cellular telephone 53, via the communication unit 460.

In step S184, the CPU 451 of the WWW server 15-1 sets the frame corresponding to the image data received in step S183, and generates a frame ID.

In step S185, the WWW server 15-1 transmits the space ID and image data received from the cellular telephone 53, and the generated frame ID, to the AO server 12.

In step S191, the AO server 12 receives the space ID, frame ID, and image data from the WWW server 15-1, via the communication unit 310.

In step S192, the CPU 301 of the AO server 12 correlates the image data received in the step S191 with the space ID and frame ID, and stores this in the database within the storage unit 309.

Moving on to FIG. 37, in step S193, the CPU 301 of the AO server 12 transmits the image data, space ID, and frame ID, stored in the storage unit 309 in step S192, to the CP server 14, from the communication unit 310.

In step S201, the CP server 14 receives the image data, space ID, and frame ID, from the AO server 12, via the communication unit 360.

In step S202, the CPU 351 of the CP server 14 transmits the image data, space ID, and frame ID, received in step S201, to all client computers 31 displaying the space corresponding to the space ID received in step S201, from the communication unit 360.

In step S211, the client computer 31 receives the image data, space ID, and frame ID, from the CP server 14, via the communication unit 510.

In step S212, the CPU 501 of the client computer 31 displays the image data received in step S211 in the frame corresponding to the frame ID received along with the image data.

Thus, the user can exhibit the image in the virtual space using a cellular telephone 53 via the WWW server 15-1.

Now, while the description made above involves an arrangement wherein an image (including still images and moving images) is used as the information to be exhibited in the frame, the information exhibited in the frame is by no means restricted to this. For example, music data (audio region data) may be posted on a bulletin provided in the virtual space. In this case, music corresponding to the music data is played upon another user clicking on the bulletin where the music data has been posted.

Also, while the description made above involves an example wherein images are used to decorate a three-dimensional virtual space, it is needless to mention that images may be exhibited on a Web page, which is not a three-dimensional shared virtual space, from a portable device.

The following is a description of processing for exhibiting images on a Web page provided by the WWW server 15-2 from the cellular telephone 53 via the mail server 11-2, with reference to the flowchart in FIG. 39.

In step S231, the main control unit 200 of the cellular telephone 53 follows the instructions from the user to activate a mailer, display a mail compiling screen on the liquid crystal display 107, and accept input of the addressee of the mail (the mail server 11-2 in this case), the user ID, and the application location ID, and also accept selection of the image to attach. Note that the application location ID is an ID for determining which position on the Web page to display the image. For example, multiple divided regions may be provided within a Web page, with IDs (application location IDs) set for each region. In the event of exhibiting an image on the Web page from the cellular telephone 53, the user specifies this application location ID, which enables the display position on the Web page to be specified for the image.

Following accepting input of the mail addressee, user ID, and application location ID, along with accepting selection of the image to be selected, the flow proceeds to step S232 upon the user inputting instructions to transmit the mail.

In step S232, the main control unit 200 of the cellular telephone 53 transmits the text data containing the user ID and application position ID, and the image data selected for attachment, to the mail server 11-2, from the antenna 104.

In step S241, the mail server 11-2 receives the text data containing the user ID and application position ID, and the image data selected for attachment, from the cellular telephone 53, via the communication unit 410.

In step S242, the CPU 401 of the mail server 11-2 reads out the user ID and application position ID from the text data in the mail received in step S241, and also reads out the image data attached to the mail.

In step S243, the CPU 401 of the mail server 11-2 transmits the application position ID read out in step S242 and the image data to the WWW server 15-2 from the communication unit 410.

In step S251, the CPU 451 of the WWW server 15-2 receives the application position ID and image data from the mail server 11-2 via the communication unit 460.

In step S252, the CPU 451 of the WWW server 15-2 updates the HTML code so as to display the image data received in step S251 at the position corresponding to the application position ID, and stores the updated HTML code and image data in the storage unit 459.

Thus, following updating of the HTML code, in the event that the client computer 31 for example accesses the WWW server 15-2 and views the updated Web page, the image uploaded from the cellular telephone 53 is displayed on the Web page at the predetermined position determined by the application position ID. In this way, the user can apply images to Web pages from portable device.

Now, while the above-describe embodiment involves an arrangement wherein an image (including still images and moving images) is used as the information to be displayed on the Web page, the information displayed on the Web page is by no means restricted to this. For example, music data (audio region data) may be posted on a bulletin provided on the Web page. In this case, music corresponding to the music data is played upon another user clicking on the bulletin where the music data is posted.

As described above, a user which desires to upload information can upload the information without the trouble of connecting to the three-dimensional shared virtual space (or two-dimensional Web page), by uploading information using e-mail or a Web page of a predetermined format for uploading information.

Also, while the description made above involves an example of uploading information from a portable device, but in the event that a user wants to just upload an image from the client computer 31, for example, for the time being, the user can upload the information without the trouble of connecting to the three-dimensional shared virtual space (or two-dimensional Web page), by transmitting e-mail of a predetermined format with information attached or using a predetermined Web page for uploading information from the client computer 31, in the same manner as with the portable device described above.

The above-described series of processes can be executed by hardware, or by software as well. In the event that the series of processes are executed by software, a computer is arranged with built-in dedicated hardware storing a program or programs making up the software, or a general-purpose personal computer or the like capable of executing various types of functions by installing various types of programs has the program or programs making up the software installed therein from a network or recording media.

As shown in FIGS. 6 through 10, the recording media may be configured of packaged media storing the program, distributed separately from the device proper in order to provide the program to users, examples of which include magnetic disks (including flexible disks) 312, 362, 412, 462, and 512, optical disks (including CD-ROMs (Compact Disk Read Only Memory) and DVDs (Digital Versatile Disks)) 313, 363, 413, 463, and 513, magneto-optical disks (including MDs (Mini-Disks)) 314, 364, 414, 464, 514, and semiconductor memory 315, 365, 415, 465, and 515, as well as media storing the program, provided to the user in a state assembled into the device proper, examples of which include ROM 302, 352, 402, 452, and 502, the hard disk contained in the storage unit 309, 359, 409, 459, and 509.

Also, in the present specification, the steps describing the program recorded in the recording media includes processing executed in time-sequence following the order of description as a matter of course, but also includes processing not necessarily executed in time-sequence but in parallel or individually.

Further, with the present specification, the term "system" refers to the entirety of equipment made up of multiple devices.

What is claimed is:

1. An information processing device which receives presentation information provided from a portable terminal of a user via electronic mail and presents said presentation information on a virtual space shared by a plurality of users, said information processing device comprising:
    reception means for receiving said electronic mail with said presentation information attached thereto from said portable terminal;
    first storage means for storing said presentation information attached to said electronic mail received by said reception means;
    reading means for reading location identification information incorporated in said electronic mail for specifying a presenting region on said shared virtual space for said presentation information; and
    presenting means for presenting said presentation information stored in said first storage means at said presenting region on said virtual space specified by said location identification information read by said reading means;
    second storage means for storing information relating to a two-dimensional or three-dimensional space of said virtual space;
    wherein said presenting means presents said presentation information on said two-dimensional or said three-dimensional space based on information relating to said two-dimensional or said three-dimensional space stored in said second storage means.

2. An information processing device according to claim 1, wherein said information includes at least one of text, still images, moving images, and audio.

3. An information processing device according to claim 1, wherein said reading means reads user identification information for identifying said user described in said electronic mail with a predetermined format.

4. An information processing device according to claim 1, wherein said presenting region specified by said location identification information is a region selected from a predetermined region set on said virtual space.

5. An information processing device according to claim 4, further comprising:
    usage fee recording means for recording a usage fee set on a region of said virtual space;

obtaining means for obtaining a billing information from the usage fee recording means based on the presenting region of said virtual space identified by said location identification information; and a billing information transmission means for transmitting the billing information to said portable terminal.

6. An information processing device according to claim 5, wherein said usage fee is determined according to a size of the region set on said virtual space or a position on said virtual space.

7. An information processing method for an information processing device which received presentation information provided from a portable terminal of a user via electronic mail and presents said presentation information on a virtual space shared by a plurality of users, said method comprising:

a reception step for receiving said electronic mail with said presentation information attached thereto from said portable terminal;

a storage step for storing said presentation information attached to said electronic mail received by said reception step;

a reading step for reading location identification information incorporated in said electronic mail for specifying a presenting region on said shared virtual space for said presentation information; and a presenting step for presenting said presentation information stored by said storage step at said presenting region on said virtual space specified by said location identification information read by said reading step;

a second storage step for storing information relating to a two-dimensional or three-dimensional space of said virtual space:

wherein said presenting step presents said presentation information on said two-dimensional or said three-dimensional space based on information relating to said two-dimensional or said three-dimensional space stored in said second storage step.

8. A computer-readable medium encoded with a program for causing a computer to control an information processing device which receives presentation information provided from a portable terminal of a user via electronic mail and presents said presentation information on a virtual space shared by a plurality of users, said program when executed by said computer readable medium causes said information processing device to perform the steps of;

a reception step for receiving said electronic mail with said presentation information attached thereto from said portable terminal;

a storage step for storing of said presentation information attached to said electronic mail received by said reception step;

a reading step for reading location identification information incorporated in said electronic mail for specifying a presenting region on said shared virtual space for said presentation information; and a presenting step for presenting said presentation information stored by said storage step at said presenting region on said virtual space specified by said location identification information read by said reading step;

a second storage step for storing information relating to a two-dimensional or three-dimensional space of said virtual space;

wherein said presenting step presents said presentation information on said two-dimensional or said three-dimensional space based on information relating to said two-dimensional or said three-dimensional space stored in said second storage step.

9. An information processing device which receives presentation information provided from a portable terminal of a user via a predetermined Web page and presents said presentation information on a virtual space shared by a plurality of users, said information processing device comprising:

first storage means for storing an information transmission Web page used by said portable terminal transmitting said presentation information;

transmission means for transmitting to said portable terminal said information transmission Web page stored in said first storage means following a request for said portable terminal;

reception means for receiving said presentation information supplied from said portable terminal via electronic mail with said presentation information attached thereto;

second storage means for storing said presentation information received by said reception means;

reading means for reading location identification information incorporated in said electronic mail provided from said portable terminal for specifying a presenting region on said shared virtual space for said presentation information; and presenting means for presenting said presentation information stored in said second storage means at said presenting region on said shared virtual space specified by said location identification information read by said reading step;

third storage means for storing information relating to a two-dimensional or three-dimensional space of said virtual space;

wherein said presenting means presents said presentation information on said two-dimensional or said three-dimensional space based on information relating to said two-dimensional or said three-dimensional space stored in said third storage means.

10. An information processing device according to claim 9, wherein said information includes at least one of text, still images, moving images, and audio.

11. An information processing device according to claim 9, wherein said information transmission Web page contains a space for filling out said location identification information;

wherein said reception means receive said location identification information along with said presentation information;

and wherein said second storage means store said location identification information along with said presentation information.

12. An information processing device according to claim 9, wherein said information transmission Web page contains a space for filling out user identification information for identifying said user;

and wherein said reception means receive said user identification information along with said presentation information;

and wherein said second storage means store said user identification information along with said presentation information.

13. An information processing device according to claim 9, wherein said presenting region specified by said location identification information is a region selected from a predetermined region set on said virtual space.

14. An information processing device according to claim 13, further comprising:
  usage fee recording means for recording a usage fee set on a region of said virtual space;
  obtaining means for obtaining a billing information from the usage fee recording means based on the presenting region of said virtual space identified by said location identification information; and
  a billing information transmission means for transmitting the billing information to said portable terminal.

15. An information processing device according to claim 14, wherein said usage fee is determined according to a size of the region set on said virtual space or a position on said virtual space.

16. An information processing method for an information processing device which receives presentation information provided from a portable terminal of a user via a predetermined Web page and presents said presentation information on a virtual space shared by a plurality of users, said method comprising:
  a first storage step for storing an information transmission Web page used by said portable terminal transmitting said presentation information;
  a transmission step for transmitting to said portable terminal said information transmission Web page stored in said first storage step following a request for said portable terminal;
  a reception step for receiving said presentation information supplied from said portable terminal via electronic mail with said presentation information attached thereto;
  a second storage step for storing said presentation information received by said reception step;
  a reading step for reading location identification information incorporated in said electronic mail provided from said portable terminal for specifying a presenting region on said shared virtual space for said presentation information; and
  a presenting step for presenting said presentation information stored in said second storage step at said presenting region on said shared virtual space specified by said location identification information read by said reading step;
  a third storage step for storing information relating to a two-dimensional or three-dimensional space of said virtual space;
  wherein said presenting step presents said presentation information on said two-dimensional or said three-dimensional space based on information relating to said two-dimensional or said three-dimensional space stored in said third storage step.

17. A computer-readable medium encoded with a program for causing a computer to control an information processing device which receives presentation information provided from a portable terminal of a user via a predetermined Web page and presents said presentation information on a virtual space shared by a plurality of users, said program when executed by said computer readable medium causes said information processing device to perform the steps of:
  a first storage step for storing an information transmission Web page used by said portable terminal transmitting said presentation information;
  a transmission step for transmitting to said portable terminal said information transmission Web page stored in said first storage step following a request for said portable terminal;
  a reception step for receiving said presentation information supplied from said portable terminal via electronic mail with said presentation information attached thereto;
  a second storage step for storing said presentation information received by said reception step;
  a reading step for reading location identification information incorporated in said electronic mail provided from said portable terminal for specifying a presenting region on said shared virtual space for said presentation information; and
  a presenting step for presenting said presentation information stored in said second storage step at said presenting region on said shared virtual space specified by said location identification information read by said reading step;
  a third storage step for storing information relating to a two-dimensional or three-dimensional space of said virtual space;
  wherein said presenting step presents said presentation information on said two-dimensional or said three-dimensional space based on information relating to said two-dimensional or said three-dimensional space stored in said third storage step.

* * * * *

UNITED STATES PATENT AND TRADEMARK OFFICE
CERTIFICATE OF CORRECTION

PATENT NO. : 7,191,220 B2  
APPLICATION NO. : 10/347796  
DATED : March 13, 2007  
INVENTOR(S) : Tsunayuki Ohwa It is certified that error appears in the above-identified patent and that said Letters Patent is hereby corrected as shown below:

Column 3, line 56, change "a an example" to -- an example --;
          line 59, change "a an example" to -- an example --;
          line 62, change "a an example" to -- an example --;
          line 65, change "a an example" to -- an example --;

Column 4, line 1, change "a an example" to -- an example --;
          line 4, change "a an example" to -- an example --;

Column 8, line 44, after "state." begin new paragraph.

Column 12, line 44, change "the client computers 31-2" to
        -- the client computer 31-2 --;
       line 47, change "the client computers 31-2" to
        -- the client computer 31-2 --.

Column 14, line 2, change "so s to add" to -- so as to add --.

Column 15, line 22, change "bur" to -- but --.

Signed and Sealed this

Thirty-first Day of July, 2007

JON W. DUDAS  
*Director of the United States Patent and Trademark Office*